United States Patent [19]
Grossberg et al.

[11] Patent Number: 5,040,214
[45] Date of Patent: Aug. 13, 1991

[54] PATTERN LEARNING AND RECOGNITION APPARATUS IN A COMPUTER SYSTEM

[75] Inventors: Stephen Grossberg, Newton Highlands; Michael Cohen, Brookline, both of Mass.

[73] Assignee: Boston University, Boston, Mass.

[21] Appl. No.: 320,806

[22] Filed: Mar. 8, 1989

Related U.S. Application Data

[63] Continuation of Ser. No. 934,412, Nov. 24, 1986, abandoned, which is a continuation-in-part of Ser. No. 802,479, Nov. 27, 1985, abandoned.

[51] Int. Cl.$^5$ .......................... G10L 7/08; G01L 1/06
[52] U.S. Cl. ..................................... 381/43; 364/513
[58] Field of Search .................... 381/41, 47; 364/513, 364/513.5, 200 MS File, 900 MS File, 807; 382/14–15; 307/201

[56] References Cited

U.S. PATENT DOCUMENTS

| | | | |
|---|---|---|---|
| 3,103,648 | 9/1963 | Hartmanis | 364/900 |
| 3,191,149 | 6/1965 | Andrews | 340/146.3 |
| 3,273,125 | 9/1966 | Jakowatz | 364/900 |
| 3,287,649 | 11/1966 | Rosenblatt | 307/201 |
| 3,638,196 | 1/1972 | Nishiyama et al. | 364/900 |
| 3,701,095 | 10/1972 | Yamaguchi et al. | 340/146.3 |
| 3,950,733 | 4/1976 | Cooper | 340/172.5 |
| 3,993,976 | 11/1976 | Ginsburg | 340/146.3 |
| 4,044,243 | 8/1977 | Cooper | 235/152 |
| 4,254,474 | 3/1981 | Cooper | 364/900 |
| 4,319,331 | 3/1982 | Elbaum | 364/515 |
| 4,326,259 | 4/1982 | Cooper | 364/715 |
| 4,451,929 | 5/1984 | Yoshida | 382/15 |
| 4,479,241 | 10/1984 | Buckley | 364/513 |
| 4,591,980 | 5/1986 | Huberman et al. | 364/200 |
| 4,599,693 | 7/1986 | Denenberg | 364/513 |
| 4,660,166 | 4/1987 | Hopfield | 364/807 |

OTHER PUBLICATIONS

S. Grossberg, "A Theory of Human Memory: Self-Organization and Performance of Sensory—Motor Codes, Maps, and Plans", *Progress in Theoretical Biology*, vol. 5, pp. 233–374, 1978.
M. Cohen and S. Grossberg, "Neural Dynamics of Speech and Language Coding: Developmental Programs, Perceptual Grouping, and Competition for Short-Term Memory", *Human Neurobiology*, 5, pp. 1–22, 1986.

(List continued on next page.)

*Primary Examiner*—Gary V. Harkcom
*Assistant Examiner*—John A. Merecki
*Attorney, Agent, or Firm*—Hamilton, Brook, Smith & Reynolds

[57] ABSTRACT

A masking field network $F_2$, is characterized through systematic computer simulations serves or a content addressable memory. Masking field network $F_2$ receives input patterns from an adaptive filter $F_1 \rightarrow F_2$ that is activated by a prior processing level $F_1$. The network $F_2$ activates compressed recognition close that are predictive with respect to the activation patterns flickering across $F_1$, and competitively inhibits, or masks, codes which are unpredictive with respect to the $F_1$ patterns. The masking field can simultaneously detect multiple groupings within its input patterns and assign activation weights to the recognition codes for these groupings which are predictive with respect to the contextual information embedded within the patterns and the prior learning of the network. Automatic rescaling of sensitivity of the masking field as the overall size of an input pattern changes, allows stronger activation of a code for the whole $F_1$ pattern than for its salient parts. Network $F_2$ also exhibits adaptive sharpening such that repetition of a familiar $F_1$ pattern can tune the adaptive filter to elicit a more focal spatial activation of its $F_2$ recognition code than does an unfamiliar input pattern. The $F_2$ recognition code also becomes less distributed when an input pattern contains more contextual information on which to base an unambiguous prediction of the $F_1$ pattern being processed. Thus the masking field embodies a real-time code to process the predictive evidence contained within its input patterns. Such capabilities are useful in speech recognition, visual object recognition, and cognitive information processing.

37 Claims, 34 Drawing Sheets

OTHER PUBLICATIONS

M. Cohen and S. Grossberg, "Masking Fields: A Massively Parallel Neural Architecture for Learning, Recognizing, and Predicting Multiple Groupings of Patterned Data", *Applied Optics*, in press, 1986.

Henry Stark, "An Optical—Digital Computer for Parallel Processing of Images", *IEEE Transactions on Computers*, vol. C-24, No. 4, Apr. 1975, pp. 340–347.

I. Aleksander, E. H. Mamdani, "Microcircuity Learning Nets: Improved Recognition by Means of Pattern Feedback", *Electronics Letters*, vol. 4, No. 20, Oct. 4, 1968, pp. 425–426.

A. G. Ivakhnenko, "Self-Organizing Systems with Positive Feedback Loops", *IEEE Transactions on Automatic Control*, vol. AC-8, No. 3, Jul. 1963, pp. 247–254.

BEFORE

AFTER

BEFORE

AFTER

ITEM FIELD (F1)

TEMPORAL ORDER OVER ITEMS IN STM

MASKING FIELD (F2)
INPUT PATTERN

LIST CODE IN STM

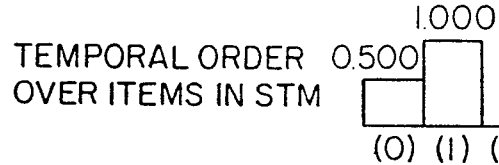
Fig. 10
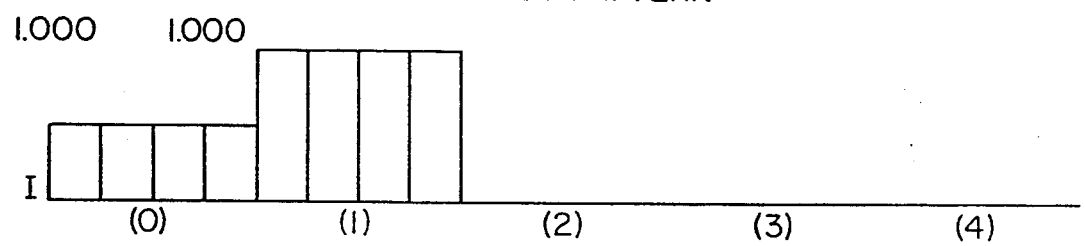
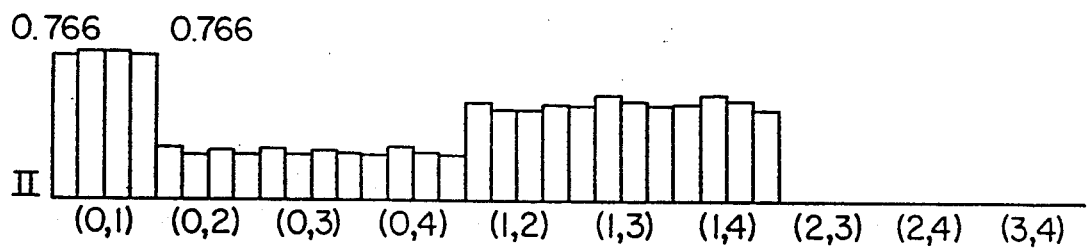
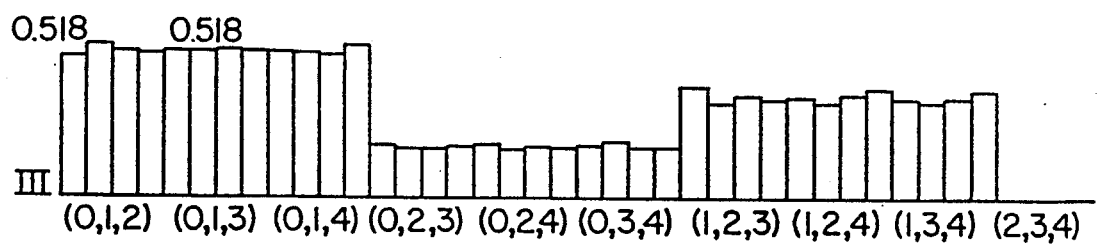
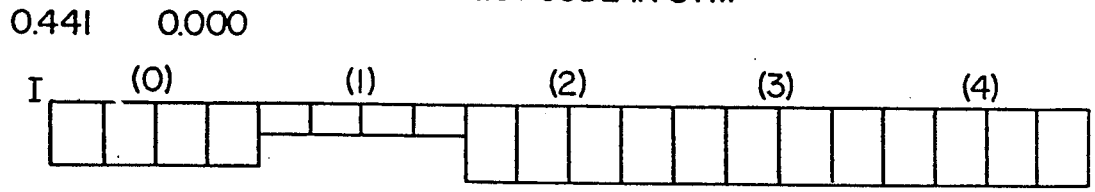
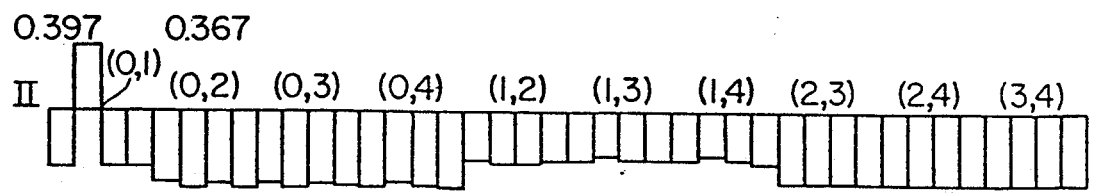
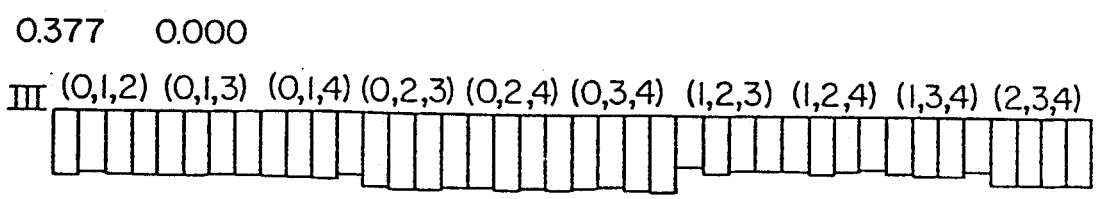

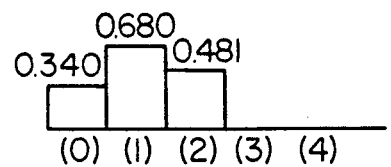
Fig. 12
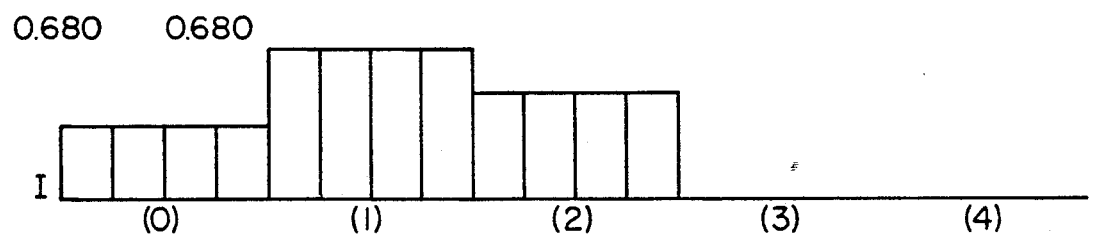
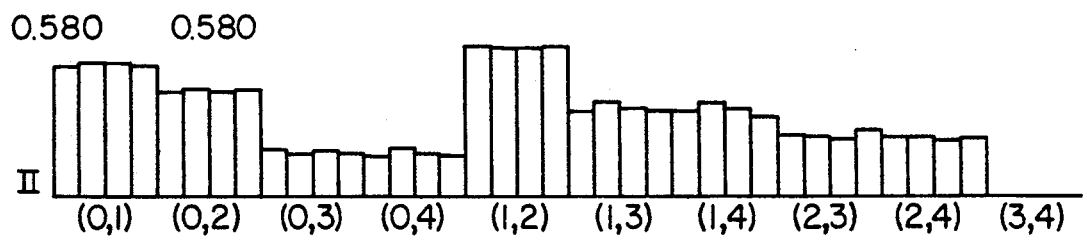
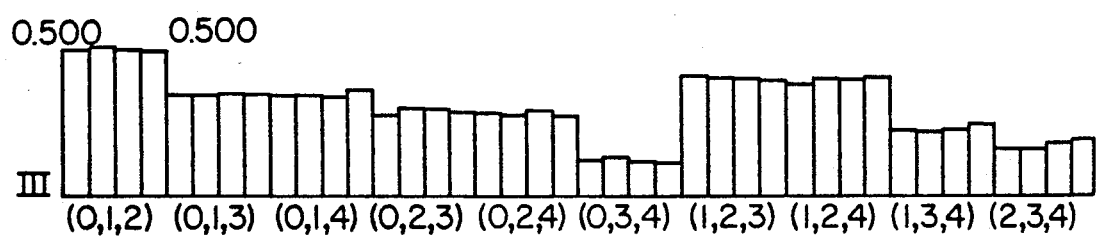
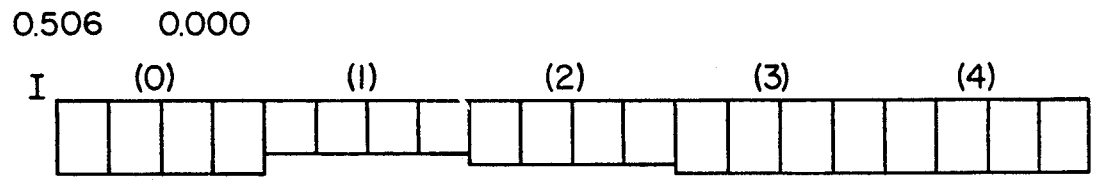
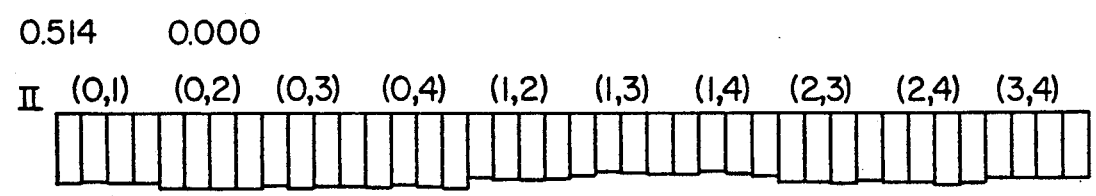
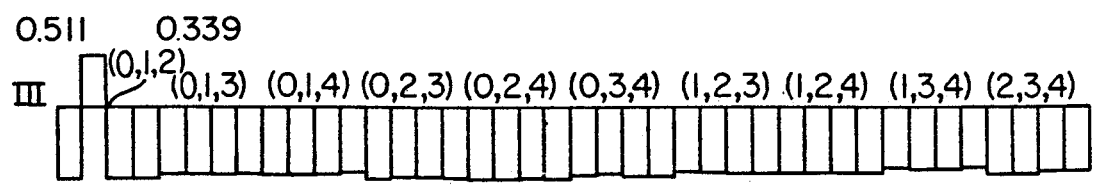

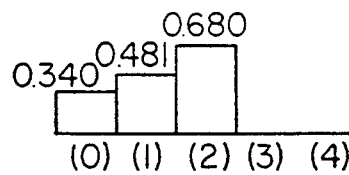
Fig. 13
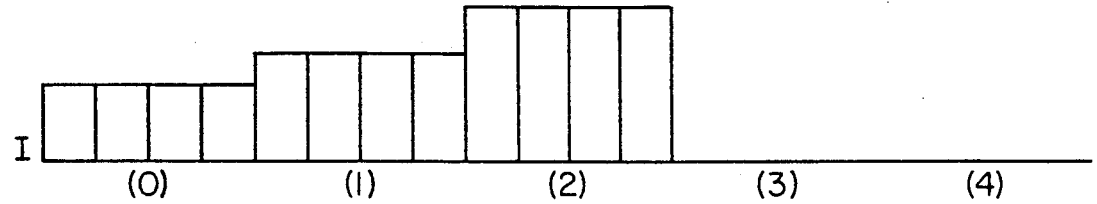
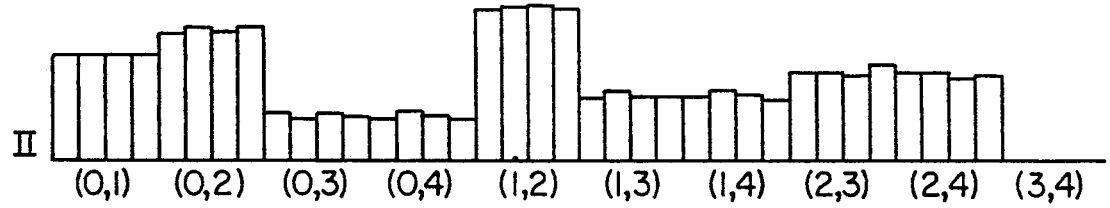
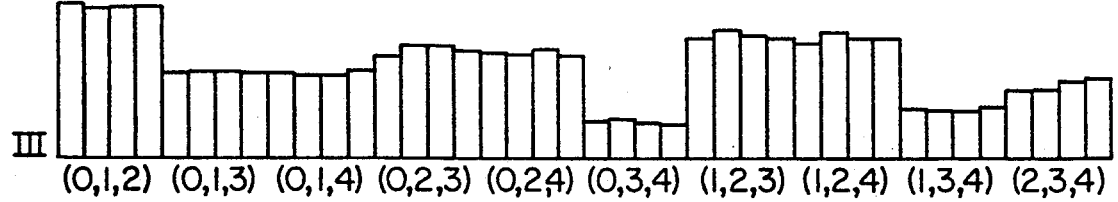
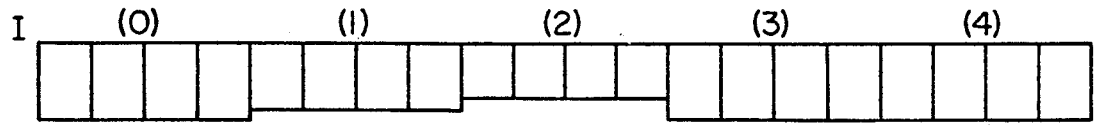
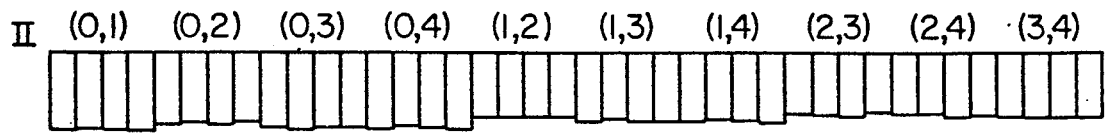
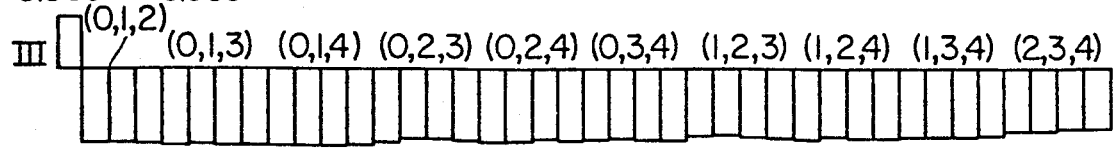

ITEM FIELD (F1)

TEMPORAL ORDER OVER ITEMS IN STM

MASKING FIELD (F2)
INPUT PATTERN

LIST CODE IN STM

ITEM FIELD (F1)

TEMPORAL ORDER OVER ITEMS IN STM

MASKING FIELD (F2)
INPUT PATTERN

LIST CODE IN STM

ITEM FIELD (F1)

TEMPORAL ORDER OVER ITEMS IN STM

MASKING FIELD (F2)
INPUT PATTERN

LIST CODE IN STM

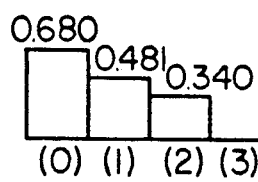
Fig. 20
ITEM FIELD (F1)
TEMPORAL ORDER OVER ITEMS IN STM
MASKING FIELD (F2)
INPUT PATTERN
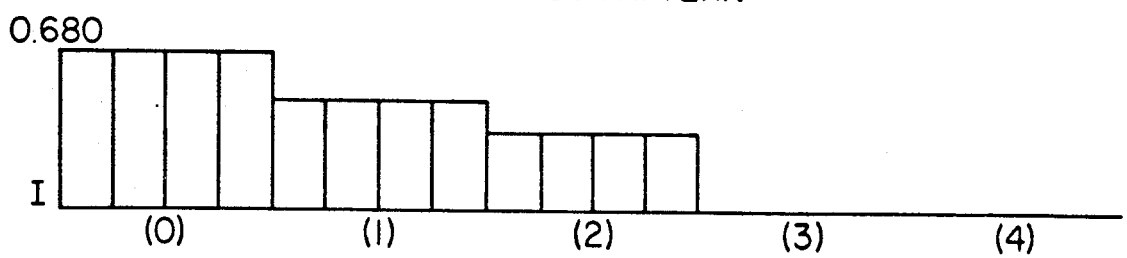
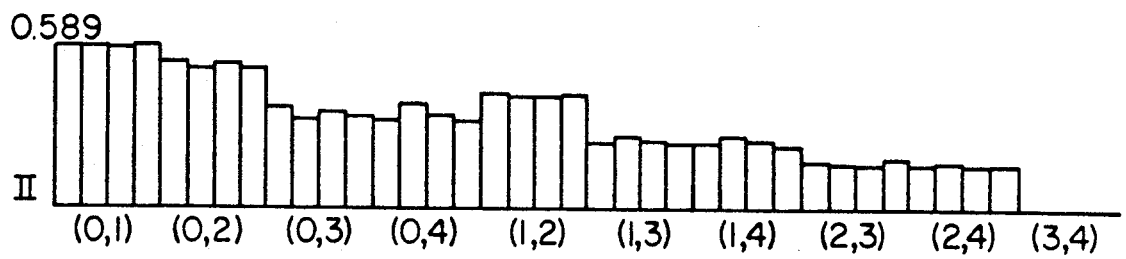
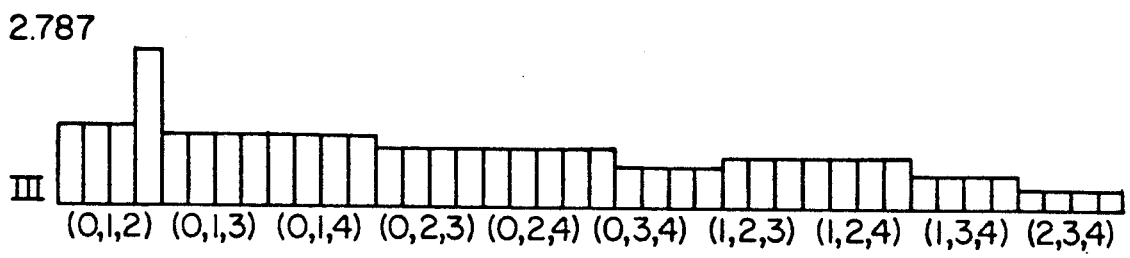
LIST CODE IN STM
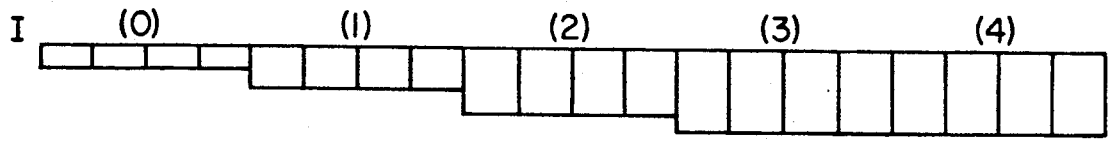
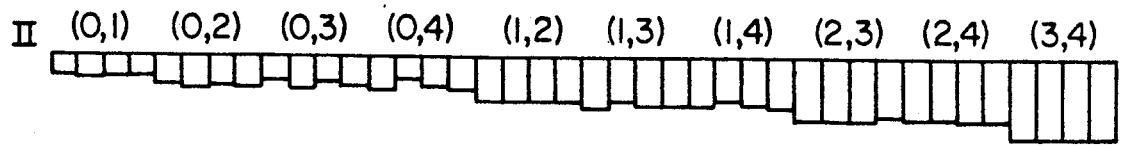
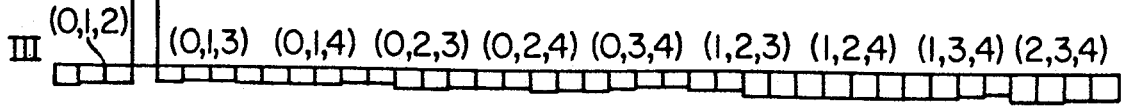

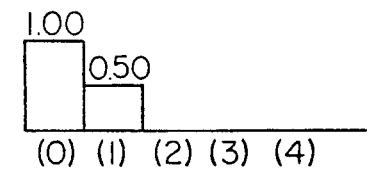
Fig. 23b
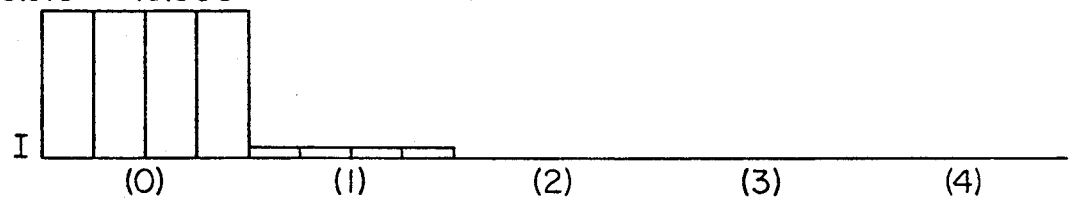
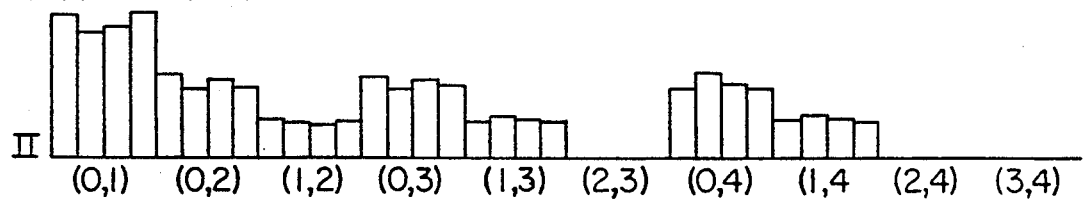
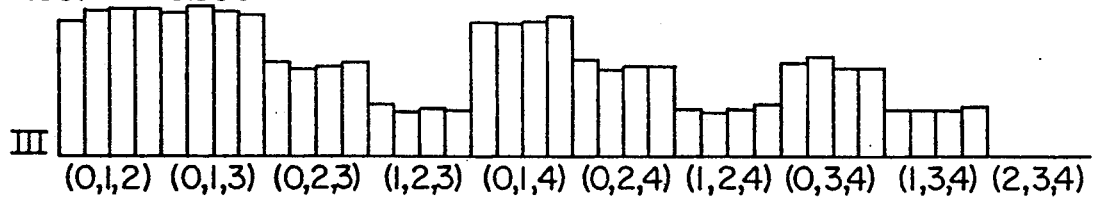
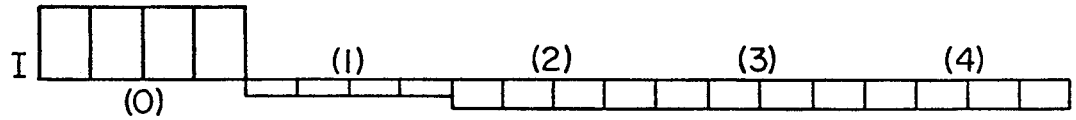
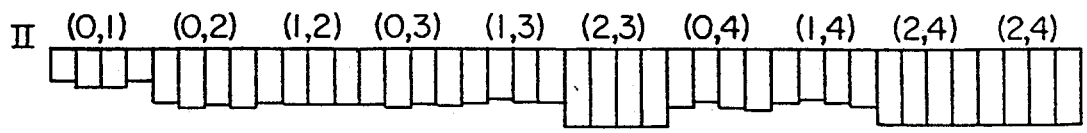
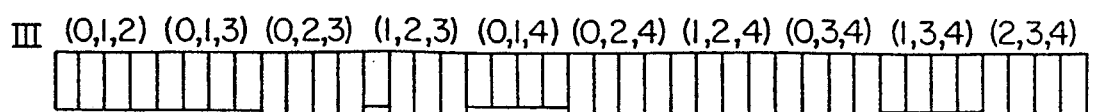

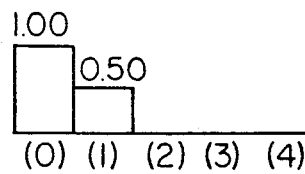
Fig. 23c
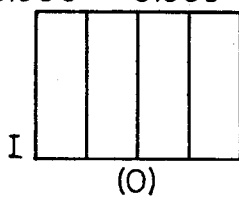
ITEM FIELD (F1)
ITEMS IN STM
MASKING FIELD (F2)
INPUT PATTERN
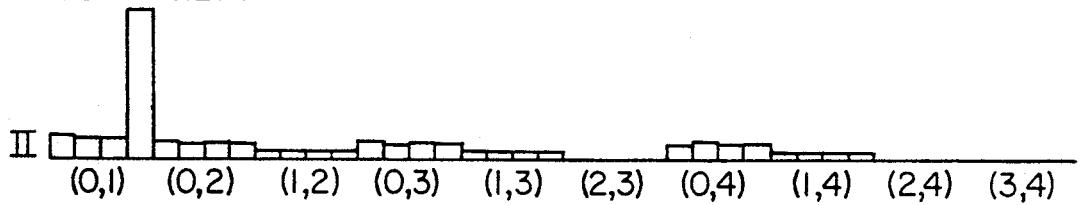
LIST CODE IN STM
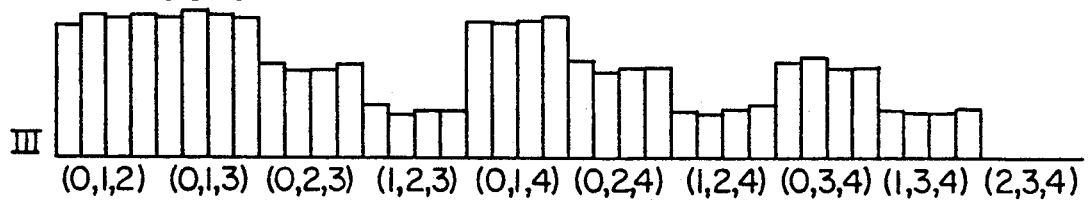
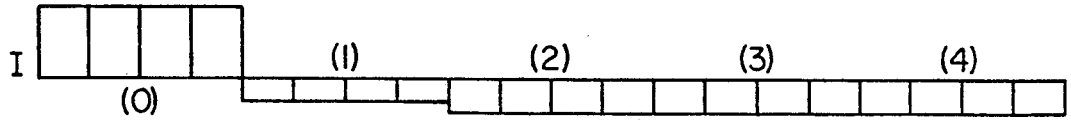
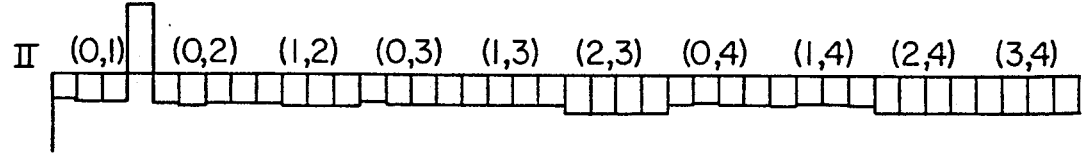
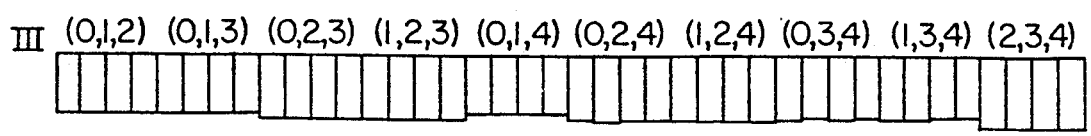

PATTERN LEARNING AND RECOGNITION APPARATUS IN A COMPUTER SYSTEM

GOVERNMENT SUPPORT

This invention was made with Government support under AFOSR-85-0149 awarded by the Air Force. The Government has certain rights in this invention.

RELATED APPLICATIONS

This is a continuation of co-pending application Ser. No. 06/934,412, filed on Nov. 24, 1986, now abandoned, which is a continuation-in-part of the U.S. application Ser. No. 802,479 filed Nov. 27, 1985 for NEURAL DYNAMICS OF SPEECH AND LANGUAGE CODING: DEVELOPMENTAL PROGRAMS, PERCEPTUAL GROUPING, AND COMPETITION FOR SHORT TERM MEMORY, now abandoned.

BACKGROUND OF THE INVENTION

One of the fundamental problem areas in speech and language research, particularly with regards to perception, cognition and artificial intelligence, concerns the characterization of the functional units into which speech sounds are grouped by a receiver (person or machine). A core issue concerns the context-sensitivity of these functional units, or the manner in which the perceptual grouping into functional units can depend upon the spatio-temporal patterning of the entire speech stream. Another core issue concerns the adaptive tuning of recognition mechanisms, and the manner in which such tuning can alter the groupings which emerge within a context of familiar elements. Adaptive tuning of recognition processes is one of the mechanisms whereby representations become unitized or chunked into coherent recognition codes through experience.

For example, a word such as "myself" is used by a person as a unitized verbal chunk. In different contexts, however, the components "my", "self", and "elf" of "myself" are all used as words in their own right. Moreover, although an utterance which ended with the term "my" would generate one grouping of the speech stream, an utterance which went on to include the entire word "Myself" could supplant this one grouping with one appropriate to the longer word. Thus in order to understand how context-sensitive language units are perceived by a receiver, an analysis must be made of how all possible groupings of the speech stream are analyzed through time and how certain groupings are chosen in one context without preventing other groupings from being chosen in a different context.

A similar problem is solved during visual object recognition and figure-ground segmentation, and cognitive information processing. For example, letters such as E contain as parts, letters such as L and F.

Furthermore, the functional units into which an observer groups a speech or visual stream of data are dependent upon the observer's prior language experiences. For example, a unitized representation for the word "myself" does not exist in the brain of an observer who is unfamiliar with this word. Thus an adequate theory of how an observer parses and adaptively groups a speech stream into context sensitive language units needs to analyze how developmental and learning processes bias the observer to experience some perceptual groupings above others. Such developmental and learning process are often called processes of "self-organization" in theoretical biology and physics (Synergetics of the Brain. E. Basar, H. Flohr, H. Haken, and A. Mandell, (Eds.), New York: Sprunger-Verlag, 1983). B. Lindstom, P. MacNeilage, and M. Studdert-Kennedy in 1983 have recently suggested the importance of self-organizing processes in speech perception ("Self-Organizing Processes and the Explanation of Phonological Universals", *Explanations of Linguistic Universals*. Butterworth, Comrie and Dahl (Eds.) The Hague: Mouton.

Stephen Grossberg introduced the "Adaptive Resonance Theory" in "Adaptive Pattern Classification and Universal Recoding, I: Paralleled Development and Coding of Neural Feature Detectors", *Bioligical Sybernetics,* 1976. The theory has since undergone extensive development and application. One such development is a theory of speech and language perception which arose from an analysis of how a language system self-organizes in real-time in response to its complex input environment. Stephen Grossberg, "A Theory of Human Memory: Self-Organization and Performance of Sensory-Motor Codes, Maps, and Plans", *Progress in theoretical Biology*. R. Rosen and F. Snell (Eds.), New York: Academic Press, 1978; and Stephen Grossberg, "Studies of Mind and Brain: Neural Principles of Learning, Perception, Development, Cognition, and Motor Control", Reidel Press, Boston 1982. This approach emphasized the moment-by-moment dynamical interactions that control language development, learning, and memory, and introduced a neural model called a masking field.

The present invention quantitively analyzes and further develops the masking field as the core process within the theory of speech and language perception which solves the adaptive grouping problem in the Adaptive Resonance Theory, and more particularly shows how internal language representations encode a speech stream in a context-sensitive fashion. In addition, a masking field solves a similar grouping problem in applications to visual object recognition and cognitive information processing.

SUMMARY OF THE INVENTION

The present invention discloses a massively parallel cooperative-competitive network, called a masking field for pattern recognition. The masking field simultaneously detects, through direct access, both whole input patterns and partial groupings of their subpatterns, and assigns activity weights to the codes of the groupings. The weights predict how informative these subpatterns are based upon their spatial scale and past experience of the network. When the input patterns are spatial encodings of a time series such as a speech or radar stream, the masking field parses the speech stream into context-sensitive language representations. The masking field enables temporal lists of events to be grouped, or chunked, into unitized representations, reorganizes perceptual groupings of past item sublists based on information carried by newly occurring items, and binds together information (which speech units) and temporal order information (when they occurred) into context-sensitive codes. These language units are emergent properties due to the masking field automatically rescaling its sensitivity as the overall size of the input pattern changes yet remaining sensitive to the microstructure within each input pattern. The masking field network obeys simple rules of neuronal development: random growth of connections along spatial gradients, activity-dependent self-similar cell growth, and competition for conserved synaptic sites. These growth rules generate a network architecture whose parallel interactions can directly activate correct sublist groupings or chunks without the need for prior search.

In accordance with the present invention, the network accomplishes direct access by performing a multiple scale analysis of temporally evolving input patterns. This analysis enhances correct subpattern and pattern encodings and competitively masks unappropriate list encodings in short term, or working memory. The enhanced short term memory activities embody a hypothesis, or code, which represents the input stream. This code can predict, or anticipate, subsequent events by assigning activities to groupings which have not yet fully occurred, based on the available evidence. Thus the masking field has a predictive priming capability with which it anticipates the larger groupings of which an input may form a part during the next time interval. No serial programs or cognitive rule structures exist within the network to accomplish these properties, and nodes of the network obey membrane equations undergoing mass action, feedback, cooperative-competitive interactions.

The masking field exhibits an adaptive sharpening property whereby a familiar input pattern causes a more focal spatial activation of its recognition code than an unfamiliar input pattern. The recognition code also becomes less distributed and includes fewer predictive groupings when an input pattern contains more information on which to base an unambiguous prediction of the input pattern. The masking field thereby solves the credit assignment problem by embodying a real-time code for the predictive evidence contained within its input patterns.

Further design principles are embodied by the network which are called the sequence masking principle, and the principle of self-similar growth. The network design suggests how associative mechanisms, multiple-scale competitive interactions, and modulatory gating signals can be joined together to regulate the learning of unitized recognition codes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6-16 illustrate masking field properties through computer simulations.

FIG. 6 is an illustration of the $F_2$ list coding for the single item (0) in $F_I$ which is stored in STM of a simulated masking field $F_2$.

FIG. 7 is an illustration of the $F_2$ list coding for the single item (1) in $F_I$.

FIG. 8 is an illustration of the $F_2$ list coding for the single item (2) in $F_I$.

FIG. 9 is an illustration of the $F_2$ list coding across two $F_1$ items (0,1) in decreasing order of activation size.

FIG. 10 is an illustration of the $F_2$ list coding across two items (0,1) in increasing order in $F_1$ showing that the masking field distinguishes between different orderings of the same items.

FIG. 11 is an illustration of the $F_2$ list coding for three $F_1$ items (0,1,2) in decreasing order.

FIG. 12 is an illustration of the $F_2$ list coding for three $F_1$ items (0,1,2) with order (1), (2), (0) in item size.

FIG. 13 is an illustration of the $F_2$ STM list coding for three $F_1$ items (0,1,2) in increasing order of activation size.

FIG. 14 is an illustration of the $F_2$ list coding updated through LTM learning showig sublist groupings for the input item (0).

FIG. 15 is an illustration of the $F_2$ list coding updated through LTM learning showing sublist groupings for the $F_1$ item (0,1).

FIG. 16 is an illustration of the $F_2$ list coding updated through LTM showing sublist groupings for the $F_1$ item (0,1,2).

FIG. 20 is an illustration of computer simulated adaptive sharpening in response to the input items of FIG. 16.

FIGS. 23a-23d are illustrations of computer simulations showing the list codes stored in STM at $F_2$ under different learning rates.

DESCRIPTION OF THE PREFERRED EMBODIMENTS

Figure 1:
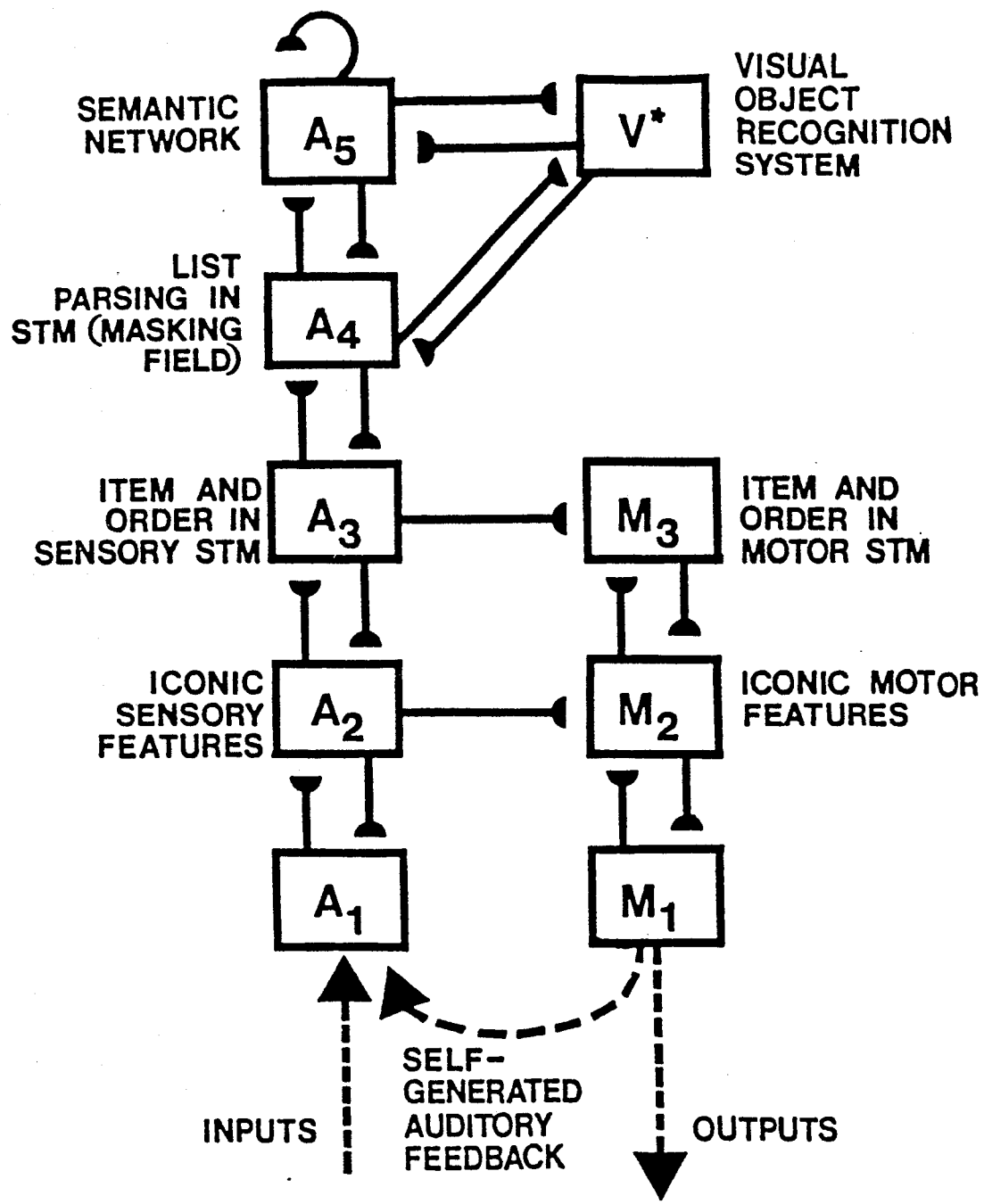
FIG. 1 is a block diagram of the adaptive resonance theory which provides one application area in which the process of the present invention takes place.

The present invention is a further development of a real-time neural network model, called a masking field.

The masking field is a multiple-scale, self-similar, automatically gain-controlled cooperative-competitive feedback network. It acts like a content-addressable memory whose properties are useful for understanding how a large class of compressed recognition codes are established during real-time speech recognition, visual object recognition, and cognitive information processing.

One example in which the compressed encoding or chunking process to which the masking field is directed takes place within the macrocircuit of S. Grossberg's Adaptive Resonance Theory depicted in FIG. 1. This macrocircuit governs self-organization of language recognition and recall processes via a combination of auditorily-mediated language processes (the levels $A_i$), visual recognition processes (level $V^*$), and motor control processes for language production (the levels $M_j$). These stages interact internally via conditionable pathways (black lines) and externally via environmentally-mediated auditor feedback of self-generated sounds (dotted lines).

All the stages $A_i$ and $M_j$ within the theory obey similar general network laws. These laws describe cooperative and competitive interactions among nodes that exist at each level. Such cooperative-competitive interactions endow the network levels with properties of cellular activation and short term memory (STM). Different levels exhibit specialized properties of STM due to two types of factors: differences in the interconnections and other parameters of the cells at each level; and the fact that the different levels, by occurring within different locations of the total network heiarchy, receive different types of inputs. One task of the theory is to show how a wide variety of STM properties can be generated from a small number of STM laws by choosing specialized intercellular wiring diagrams.

All of the learning and long term memory (LTM) processes within the theory occur in its inter-level pathways. All of these learning processes also obey similar dynamical laws. They encode different types of information due to their different parameter choices and their different locations within the total network heiarchy.

The present invention focuses on the design level $A_4$ of this network heiarchy. Level $A_4$, which is called a masking field, generates a context-sensitive encoding of the activation patterns that flicker across Level $A_3$ through time. The activation patterns across $A_3$ influence $A_4$ via the adaptive filter, or conditionable pathways, from $A_3$ to $A_4$. It will be described how developmental growth rules of connections from $A_3$ to $A_4$ and growth rules of connections within $A_4$ enable $A_4$ to achieve a context-sensitive parsing of $A_3$'s activity patterns. First, a brief review is given on the properties of Levels $A_1$, $A_2$, and $A_3$ to clarify the meaning of the activity patterns across $A_3$ that $A_4$ can encode.

At an early stage of development, environmentally activated auditory patterns at stage $A_1$ in FIG. 1 start to tune the adaptive weights, or long-term memory (LTM) traces, within the pathways from $A_1$ to $A_2$. This also starts the altering of the patterning of short-term memory (STM) auditory "Feature Detector" activation across $A_2$. After the LTM tuning process begins, it can be supplemented by a "babbling" phase. It is during this "babbling" phase that endogenous activations of the motor command stage $M_1$ can elicit simple verbalizations. These verbalizations generate environmental feedback from $M_1$ to $A_1$ which can also tune the $A_1 \rightarrow A_2$ pathways. The learning within the feedback pathway $M_1 \rightarrow A_1 \rightarrow A_2$ helps to tune auditory sensitivities to articulatory requirements.

Just as the auditory patterns across $A_1$ tune the $A_1 \rightarrow A_2$ LTM traces, the endogenously activated motor command patterns across $M_1$ tune the $M_1 \rightarrow M_2$ LTM traces. The activation patterns across $M_2$ encode the endogenously activated motor commands across $M_1$, into "motor features" using the same mechanisms that the activation patterns across $A_2$ use to encode the exogenously activated auditory patterns across $A_1$ into "auditory features".

The flow of adaptive signalling is not just bottom-up from $A_1$ to $A_2$ and from $M_1$ to $M_2$. Top-down conditionable signals from $A_2$ to $A_1$, and from $M_2$ to $M_1$ also exist. These top-down signal patterns represent learned expectations. Their most important role is to stabilize the learning that proceeds within the adaptive pathways $A_1 \rightarrow A_2$ and $M_1 \rightarrow M_2$. In so doing these top-down signal patterns also constitute the read-out of optimal expectations in response to ambiguous or novel bottom-up signals. These optimal expectations predict the patterns that the system expects to find at $A_1$ or $M_1$ based on past experience. The predicted and actual patterns merge at $A_1$ and $M_1$ to form completed composite patterns which are a mixture of actual and expected information.

Auditory and motor features are linked via an associative map from $A_2$ to $M_2$. When $M_1$ is endogenously activated, it activates a motor representation at $M_2$ via the adaptive pathway $M_1 \rightarrow M_2$ and it activates an auditory representation at $A_2$ via environmental feedback $M_1 \rightarrow A_1$ plus adaptive pathway $A_1 \rightarrow A_2$. Since $A_2$ and $M_2$ are then simultaneously active, the associative map $A_1$-$M_2$ can be learned. This map also links auditory articulatory features.

The associative map $A_2 \rightarrow M_2$ enables the imitation of novel sounds, in particular, of non self-generated sounds to get underway. It does so by analyzing a novel sound via the bottom-up auditory pathway $A_1 \rightarrow A_2$, mapping the activation patterns of auditory feature detectors via the associative map $A_2 \rightarrow M_2$, and then synthesizing the motor feature pattern into a net motor command at $M_1$ via the top-down motor template $M_2 \rightarrow M_1$. The motor command or synergy, that is synthesized in this way generates a sound that is closer to the novel sound than are any of the sounds currently coded by the system. Also, the environmental feedback from $M_1$ to $A_1$ followed by the learned map $A_1 \rightarrow A_2 \rightarrow M_2 \rightarrow M_1$ defines a closed feedback loop, or "circular reaction" (See Piaget, J. "The Origins of Intelligence in Children", New York: Norton, 1963).

The stages $A_2$ and $M_2$ can each process just one spatial pattern of auditory or motor features at a time. Thus $A_2$ can process an auditory "feature code" that is derived from a narrow time slice of a speech spectrogram, and $M_2$ can control a simple motor synergy of synchronously coordinated muscle contractions. These properties are consequences of the fact that spatial patterns, or distributed patterns of activity across a field of network nodes, are computational units of the real-time network. These computational units are a mathematical consequence of the associative learning laws that govern the network as detailed in Grossberg's, S., "Studies of Mind and Brain: Neural Principles of Learning, Perception, Development, Cognition, and Motor Control", Boston: Reidel Press, 1982. The later levels $A_i$ and $M_j$ in FIG. 1 are all devoted to building up recognition and recall representations for temporal groupings, or lists, of spatial pattern building blocks.

A spatial pattern of activity across $A_2$ encodes the relative importance of all the "feature detectors" of $A_2$ which represent the auditory pattern that is momentarily activating $A_1$. Each spatial pattern across $A_2$ activates an adaptive pathway from $A_2$ to $A_3$ in addition to activating the associative map from $A_2$ to $M_2$. Although all the adaptive pathways of the theory obey the same laws, each pathway learns different information depending on its location in the network. Since the $A_2 \rightarrow A_3$ pathway is activated by feature patterns across $A_2$, the pathway builds up learned representations in the form of compressed recognition codes, or chunks, of these feature patterns. Each such representation is called an item representation. The item representations include the representations of phonemes.

All new learning about item representations is encoded within the LTM traces of the $A_2 \rightarrow A_3$ adaptive pathway. Although each item representation is expressed as a pattern of activation across $A_3$, the learning of these item representations does not take place within $A_3$. For example, as a sequence of sound patterns activates $A_1$, the patterns of "auditory feature" activation across $A_2$ can build up and rapidly decay, via a type of iconic memory (Sperling, G., "The information Available in Brief Visual Presentations", *Psychological Monographs*, 1960). These $A_2$ activation patterns, in turn, lead to activation of item representations across $A_3$. The item representations are stored in STM as a type of "Working Memory" (Levels of Processing in Human Memory. Cermak, L. S. and Craik, F. (Eds.)), Hillsdale, N.J.: Erbaum, 1979), due to the feedback interactions within $A_3$. As a succession of item representations across $A_3$ is stored in STM, the spatial pattern of STM activity across $A_3$ represents "Temporal Order Information" across the item representations of $A_3$.

As more items are presented, the evolving spatial patterns of activity across $A_3$ include larger regions of the item field, up to some maximal length. Thus, the temporal processing of items is converted into a succession of expanding spatial patterns in $A_3$. This is the main reason why spatial mechanisms that are applicable to visual processing can also be used to design a masking field $A_4$ for speech processing.

Each activity pattern across $A_3$ is a context-sensitive computational unit in its own right. In such a representation, changing any one activity changes the coded meaning of the entire list of items. Hence, the activity pattern "is" the code, and no further labels or algorithms are needed to define it. There are, however, three sets of laws by which the code operates.

First are the laws whereby items can reliably represent temporal order information via the spatial patterning of activation across $A_3$. Stephen Grossberg in "A Theory of Human Memory: Self-Organization and Performance of Sensory-Motor Codes, Maps, and Plans", *Progress in Theoretical Biology*, R. Rosen and F. Snell (Eds.), Vol. 5, New York: Academic Press, 1978, and in "Behavioral contrast in short-term memory: Serial Binary Memory Models or Parallel Continuous Memory Models", *Journal of Mathematical Psychology*, 1978, introduced the "LTM Invariance Principle" in order to derive STM laws for $A_3$ that are compatible with stable LTM encoding. This principle shows how to alter the STM activities of previous items in response to the presentation of new items so that the repatterning of STM activities that is caused by the new items does not inadvertently obliterate the LTM codes for old item groupings. For example, consider the word "myself". The LTM codes for "my", "self", and "elf" should not be obliterated just because the network is learning the new word "myself". On the other hand, the predictive importance of the groupings "my", "self", and "elf" may be reduced by their temporal embedding within the list "Myself". Therefore, $A_3$ is designed to satisfy the *LTM Invariance Principle* which states:

The spatial patterns of temporal order information in STM are generated by a sequentially presented list in such a way as to leave the $A_3 \rightarrow A_4$ LTM codes of past event groupings invariant, even though the STM activations caused by these past groupings may change markedly across $A_4$ as new items activate $A_3$.

Suitably, designed cooperative-competitive interaction across $A_3$ mechanistically realizes this principle. For present purposes, different STM activity patterns across the same set of item representations within $A_3$ encode different temporal orderings of these items. The $A_3$ design based on the LTM Invariance Principle has also been used to analyze and predict various other data (see Grossberg, S., "A Theory of Human Memory: Self-Organization and Performance of Sensory-Motor Codes, Maps, and Plans", *Progress in Theoretical Biology*, R. Rosen and F. Snell (Eds.), Vol 5. New York: Academic Press, 1978; "Behavioral Contrast in Short-Term Memory: Serial Binary Memory Models or Paralleled Continuous Memory Models", *Journal of Mathematical Psychology*, 1978; "The Adaptive Self-Organization of Serial Order in Behavior: Speech, Language, and Motor Control", *Pattern Recognition by Humans and Machines, Vol I: Speech Perception* E. C. Schwab and H. C. Nusbaum (Eds.), New York: Academic Press, 1986; and Grossberg, S. and Stone, G. O. "Neural Dynamics of Attention Switching and Temporal Order Information in Short Term Memory", *Memory and Cognition*, in press 1986).

Described next are the second and third sets of laws by which the code operates. These laws govern, respectively, how a compressed, or unitized, representation of an entire list, such as a word, is learned and performed, and how items are rehearsed and recalled before and after they are unitized by $A_4$. By way of background for these laws suppose that an analysis-by-synthesis of a novel sound has been accomplished by the composite map $A_1 \rightarrow A_2 \rightarrow M_2 \rightarrow M_1$. Such a map generates a novel pattern of auditory features across $A_2$ and a novel pattern of motor features across $M_2$. These feature patterns can then trigger learning of unitized item representations at $A_3$ and $M_3$. These unitized representations can be learned even though the network never endogenously activated these feature patterns during its "babbling" phase. In this way, the network's learned item codes can continue to evolve into ever more complex configurations by a combination of imitation, self-generated vocalization, STM regrouping, and LTM unitization. An associative map $A_3 \rightarrow M_3$ between new unitized item representations also continues to be learned.

As the network processes a speech stream, it establishes an evolving STM pattern of temporal order information across the item representations of $A_3$. Since every sublist of a list is also a list, the conditionable pathway from $A_3$ to $A_4$ simultaneously "looks at", or filters, all the sublist groupings to which it is sensitive as the speech stream is presented through time. The masking field within $A_4$ then determines which of these sublist groupings will represent the list by being stored in STM at $A_4$.

These sublist representations contribute to the recognition of words (Grossberg S. and Stone, G. O., "Neural Dynamics of Word Recognition and Recall: Attentional Priming, Learning, and Resonance," *Psychological Review*, in press, 1986), but cannot, by themselves, elicit recall. This raises the issue of how short novel lists of familiar items can be recalled even before they are unitized. First note that a verbal unit can have both an item representation and a list representation. Next, note that recall of a short novel list of familiar items is triggered by a nonspecific rehearsal wave to $A_3$ (Grossberg S. "A Theory of Human Memory" Self-Organization and Performance of Sensory: Motor Codes, Maps, and Plans", *Progress in Theoretical Biology*. R. Rosen and F. Snell (Eds.), Vol 5. New York: Academic Press, 1978, and Serial Binary Memory Models or Parallel Continuous Memory Models", *Journal of Mathematical Psychology*, 1978. Such a wave opens an output gate that enables output signals of active items to be emitted from $A_3$ to $M_3$, with the most active item representations being read-out before less active item representations. As each item is read-out, it activates a negative feedback loop to itself that selectively inhibits its item representation, thereby enabling the next item representation to be read-out. Each item representation is recalled via the learned $A_3 \rightarrow M_3 \rightarrow M_2 \rightarrow M_1$ sensory-motor map.

This type of recall is immediate recall from STM, or working memory, of a list of unitized item representations. It is a type of "controlled" process, rather than being an "automatic" unitized recall out of LTM. In order for a unitized list chunk in $A_4$ to learn how to read-out its list of motor commands from LTM, the chunk must remain active long enough during the learning process to sample pathways to all of these motor commands, In the simplest realization of how temporal order information across item representations is encoded in and read-out of LTM, the top-down template from $A_4$ to $A_3$ learns this information while the conditionable pathway from $A_3$ to $A_4$ is being tuned. Later activation of a list chunk in $A_4$ can read this LTM temporal order information into a pattern of STM temporal order information across the item representations of $A_3$. Activation of the rehearsal wave at this time enables the list to be read-out of STM. Unitized recall can hereby occur via the learned $A_4 \rightarrow A_3 \rightarrow M_3 \rightarrow M_2 \rightarrow M_1$ sensory-motor map.

With this background, the design of the masking field $A_4$ can now be described in detail. Mathematical relationships used in computer simulations of the masking field follow the conceptual description. The masking field is a real-time network model for solving the adaptive grouping problem. As a sequence of items is temporally processed, the masking field updates its choice of list representations, parsing the item sequence into a predictive grouping of content-addressable, compressed sublist choices based on a combination of a priori parameter choices and past learning. A spatial pattern of STM activity across the item representations of $A_3$ provides inputs which are grouped by $A_4$. As more items are presented, new spatial patterns are registered that include larger regions of the $A_3$ item field, up to some maximum list length. Thus, the temporal processing of items is converted by $A_3$ into a succession of expanding spatial patterns.

Figure 2:
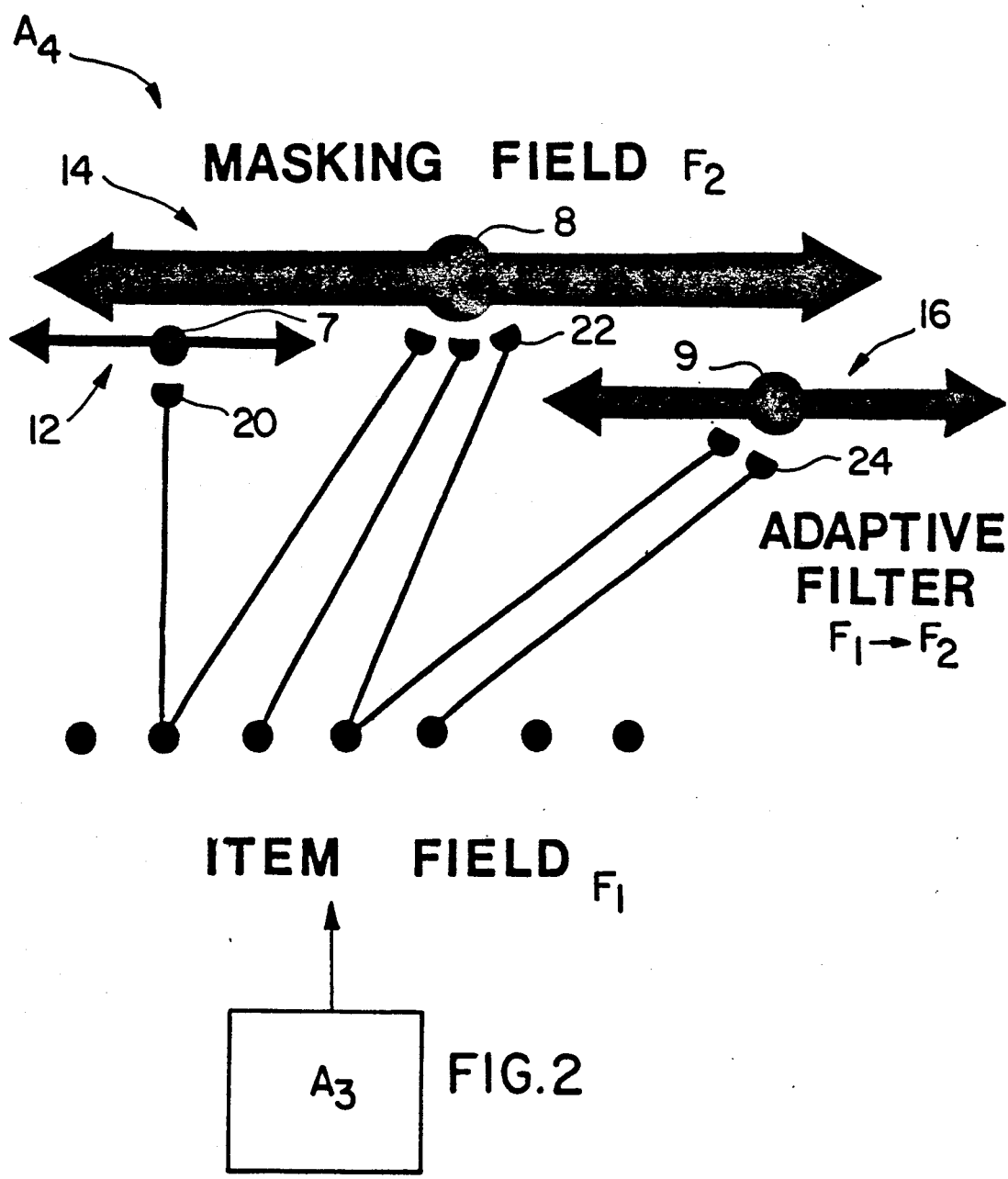
FIG. 2 is a schematic view of the pattern encoding process of the present invention.

This is pictorally shown in FIG. 2. An item field $F_1$ is received by masking field $F_2$ from a spatial pattern of STM activity across the item representations of $A_3$. The masking field $F_2$ simultaneously detects multiple groupings within the item field $F_1$ and assigns weights 20, 22, 24 to the compressed representations or codes for these groupings. The groupings with their respective weights are predictive of the input pattern with respect to the context of the item field and the prior learning of the system.

The example of the word "myself" is illustrative here, where the words "my", "self", and "elf" are the multiple groupings within an item field consisting of the word "myself". Greater weights are assigned to the part "my" and "self" than to the word "elf" because it is predicted that the part "my" and "self" are more salient parts of the word "myself" than "elf". This prediction is based on the context of the item field "myself" and prior learning or familiarity with similar words and contexts. Further, an item field which ends in the word "my" would generate one set of groupings and an item field which goes on to include the entire word "myself" would generate a set of groupings which supplant the former grouping.

The same is true when words such as "myself" are presented visually rather than auditorily. Then the problem becomes one of visual object recognition and of figure-ground segmentation. The problem exists also on a finer level of visual or auditory processing, since letters such as E contain, as items in a visual item field, letters such as "L" and "F". The masking field is capable of sensing multiple pattern groupings, which subtend multiple spatial scales, and assigns each of these groupings a proper coding weight in its short-term memory (STM) representation or code of these groupings.

Given this property, a principle of the masking field design can be stated which relates the item field $F_1$ to the masking field $F_2$ via the adaptive filter $F_1 \rightarrow F_2$.

The masking field $F_2$ receives the input pattern from the adaptive filter $F_1 \rightarrow F_2$ in a manner that obeys the sequence masking principle. The *Sequence Masking Principle* states: Broader regions of the item field $F_1$ are filtered by the $F_1 \rightarrow F_2$ pathways in such a way that the broader regions selectively excite nodes in $F_2$ with stronger masking parameters.

In other words, the masking field $F_2$ is sensitive to the spatial frequency or scale of the item fields that it receives from $A_3$. The term spatial frequency is also meant to mean multiple scale as well as spatial scale. Nodes in the masking field (FIG. 2) such as 7, 8, 9, which are selectively sensitive to a prescribed spatial scale range define masking subfields 12, 14, 16, respectively. Each masking subfield is characterized by a different choice of numerical parameters, which are determined by simple neuronal growth rules to be discussed. Subfields whose cell populations have broader spatial scales and/or more coding sites such as subfield 14 can competitively mask STM activities of subfields with narrower spatial frequency scales and fewer coding sites such as subfields 12 and 16.

The rules of neuronal growth which the masking field $F_2$ obeys for the connections between the item field $F_1$ and its own nodes 7, 8, and 9 include:

Random growth of connections along spatial gradients from $F_1$ to $F_2$;

Self-simular activity-dependent node growth within $F_2$; and

Intercellular interactions among $F_2$ nodes which compete for conserved synaptic sites.

Because these growth rules can be obeyed by any number of network levels, masking fields can be linked into a coding heirarchy $F_1 \rightarrow F_2 \rightarrow F_3 \rightarrow \ldots F_n$ whose successive levels are able to detect and manipulate even more abstract groupings of the item field $F_1$.

For clarity throughout this discussion, the item field $F_1$ is called the "item" level and the masking field $F_2$ is called the "list" level. These abstract terms are consistent with the dynamical properties of the two levels $F_1$ and $F_2$, and avoid pitfalls of alternative nomenclatures—such as "word level" and "letter level"-which do not adequately deal with the context-sensitivity of code reorganizations that occur during perceptual and cognitive processing.

In understanding the growth rules several properties are implicit, namely:

(A) Sequence Representation: All realizable item sequences, up to a maximal sequence length, can initially generate some differential reaction, however weak, in the masking field.

(B) Masking Parameters Increase with Sequence Length: Critical masking parameters of masking field nodes increase with the length of the item sequences that activate them. This rule holds until an optimal sequence length is reached.

(C) Masking Hierarchy: Nodes that are activated by a given item sequence can mask nodes that are activated by subsequences of this sequence.

(D) Sequence Selectivity: If a node's trigger sequence has length n, it cannot be supraliminally activated by sequences of length significantly less than n.

Properties (A) and (B) suggest that the $F_1 \rightarrow F_2$ pathway contains a profusion of connections that are scattered broadly over the masking field. Property (C) suggests that closely related sequences activate nearby cells in the masking field. Postulate (D) says that, despite the profusion of connections, the tuning of long-sequence cells prevents them from responding to short subsequences.

The main problem is to resolve the design tension between profuse connections and sequence selectivity. This tension must be resolved both for short-sequence nodes and long-sequence nodes. Applicant has found that a balanced combination of the random growth rules in $F_1 \rightarrow F_2$ and activity-contingent self-similar growth rules within $F_2$ solves this design tension. The interaction of these growth rules can best be understood by the following.

Suppose that each item node in $F_I$ sends out a large number of randomly distributed pathways towards the list nodes in $F_2$. Suppose that an item node randomly contacts a sequence node with a small probability P. This probability is small because there are many more list nodes than item nodes. Let x be the mean number of such contacts across all of the sequence nodes. Then the probability that exactly k pathways contact a given sequence node is given by the Poisson distribution $$P_k = \frac{\lambda^k e^{-\lambda}}{k!}$$

If K is chosen that $K < \lambda < K+1$, then $P_k$ is an increasing function of k if $1 \leq k \leq K$ and a decreasing function of k if $k \geq K$. If $\lambda$ is sufficiently small (approximately 4), then (1) implies that sequences of length $k \leq K$ will be represented within the masking field, thereby satisfying properties (A) and (B). Related random growth rules such as the hypergeometric distribution, also have analogous properties.

Due to the broad and random distribution of pathways, list nodes will tend to be clustered near nodes corresponding to their sublists, thereby tending to satisfy property (C). A further property is also needed to satisfy property (C). Since a long-list node tends to mask all of its sublists, such a node must be able to send inhibitory signals to all the nodes which code these sublists. Thus the interaction range (the of axons) an $F_2$ node should increase with the length of the list to which it is maximally sensitive as shown in FIG. 2. This is called the Principle of Self-Similar Growth In order to realize property (D), an $F_2$ node that receives k pathways from F dilutes the input in each pathway so that almost all k pathways must be active to generate a suprathreshold response. As k increases, the amount of dilution also increases. This property suggests that long-list cells may have larger cellular volumes, since a larger volume can more effectively dilute a signal due to a single output pathway. Larger volumes also permit more pathways to reach the cell's surface, other things being equal. The constraint that long-list nodes are associated with larger parameters, such as number of sites and spatial scales, is hereby extended to include larger surface areas. This conclusion reaffirms the importance of the self-similarity principle in designing a masking field: A node has longer interactions (axons) because it has a larger node body to support these interactions.

As a result, the four formal properties (A)–(D) are realized in the design of the masking field by a combination of simple rules of neuronal growth where profuse random growth occurs along spatial gradients from $F_1$ to $F_2$ which induces activity-dependent self-similar growth within $F_2$ that is constrained by competition for synaptic sites.

Figure 3:
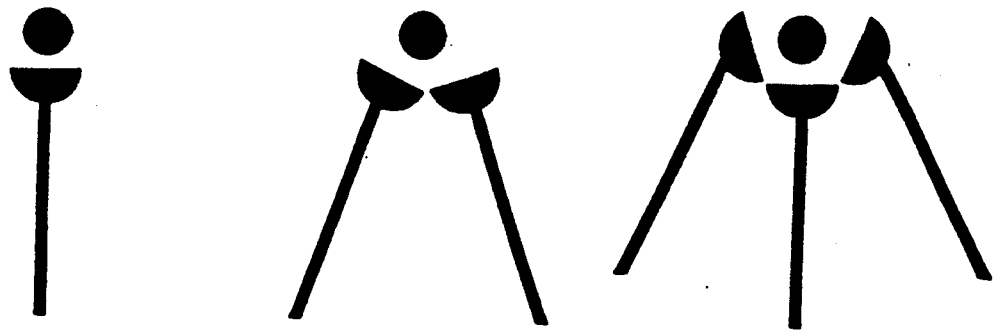
FIGS. 3a and 3b illustrate a volume dependent membrane receptor scheme embodied in the process of the invention.
Figure 3:
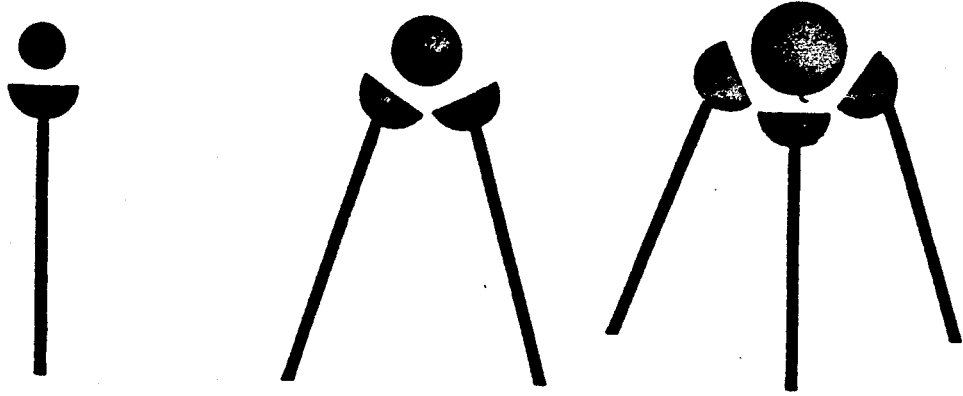
Figure 4:
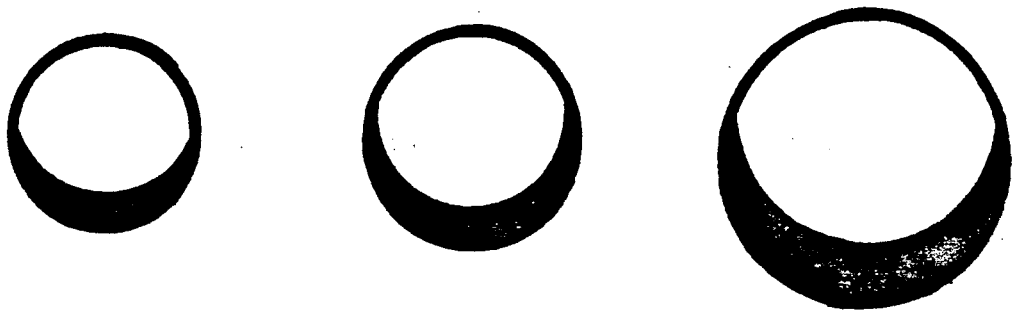
FIGS. 4a-4b illustrate an activity-dependent self similar cell growth scheme embodied in the process of the invention in lieu of the scheme in FIG. 3.
Figure 4:
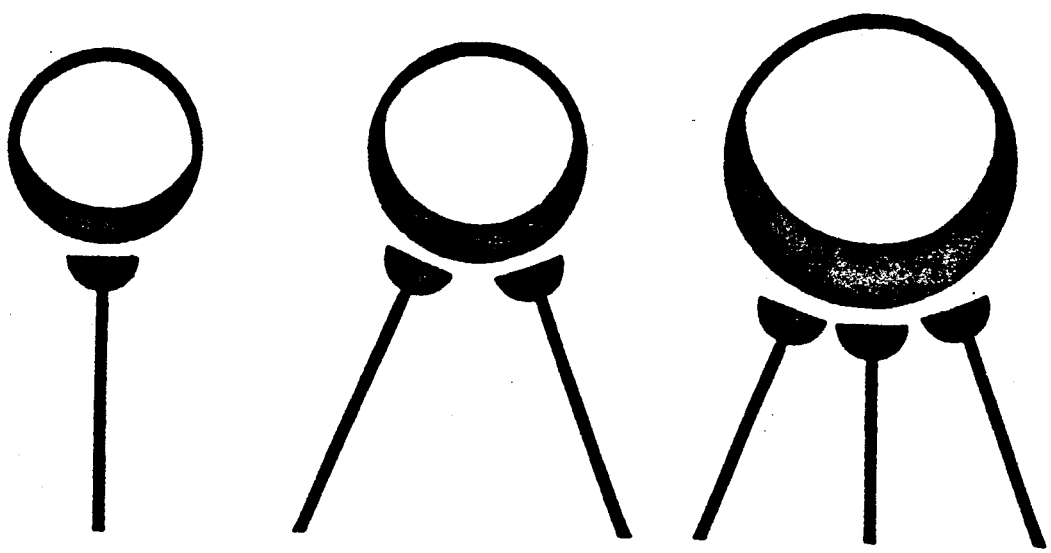

Two main ways to accomplish this property which have not yet been experimentally tested are described by Cohen, M. A., and Grossberg, S. "Neural Dynamics of Speech and Language Coding: Developmental Programs, Perceptual Grouping, and Competition for Short-Term Memory", *Human Neurobiology*, 1986. A combination of the two ways is also possible. One way relies on $F_2$ nodes which originate at about the same size and grow as pathways randomly grow from $F_I$ to $F_2$ as shown in FIG. 3. The $F_I \rightarrow F_2$ pathways generate variable levels of $F_2$ node activation which cause variable amounts of node growth. The second scheme depends on $F_2$ having volume-dependent membrane receptors as shown in FIG. 4. The nodes of $F_2$ are of various sizes and the number of membrane synaptic sites covaries with node size to prevent over excitation of the nodes.

The masking field $F_2$ selects its codes or unitized representations of the groupings of the item field $F_1$ by performing a multiple spatial scale or spatial frequency analysis of the activity patterns in the item field $F_I$. This analysis enhances correct groupings and competitively inhibits, or masks, unappropriate groupings of $F_1$ items. In particular, the masking field $F_2$ does not confuse "wholes" with their "parts", yet it enables familiar "parts" to emerge as "wholes" in their own right in an appropriate input context. For example, the words "my" and "self", may be processed as "wholes" if they are presented separately or processed as "parts" within "myself" when presented together.

The spatial pattern of enhanced $F_I$ STM activities across $F_2$ embodies the unitized code, or hypothesis, which represents the input stream (the item field). As will be described in greater detail below, this code can predict, or anticipate, subsequent events by assigning activities to groupings which have not yet fully occurred, based on the available evidence. Thus, the masking field acts like a real-time prediction, or evidence gathering, content-addressable memory machine indicated by the rectangle referenced by $A_4$ in FIG. 2. No serial programs or cognitive rule structures exist within the masking field network to accomplish these properties. Instead, the masking field nodes obey membrane equations undergoing shunting (mass action), on-center off-surround (cooperative-competitive) recurrent (feedback) interactions shown in FIG. 17. The STM code of the masking field $F_2$ is an emergent property of these interactions.

Figure 17:
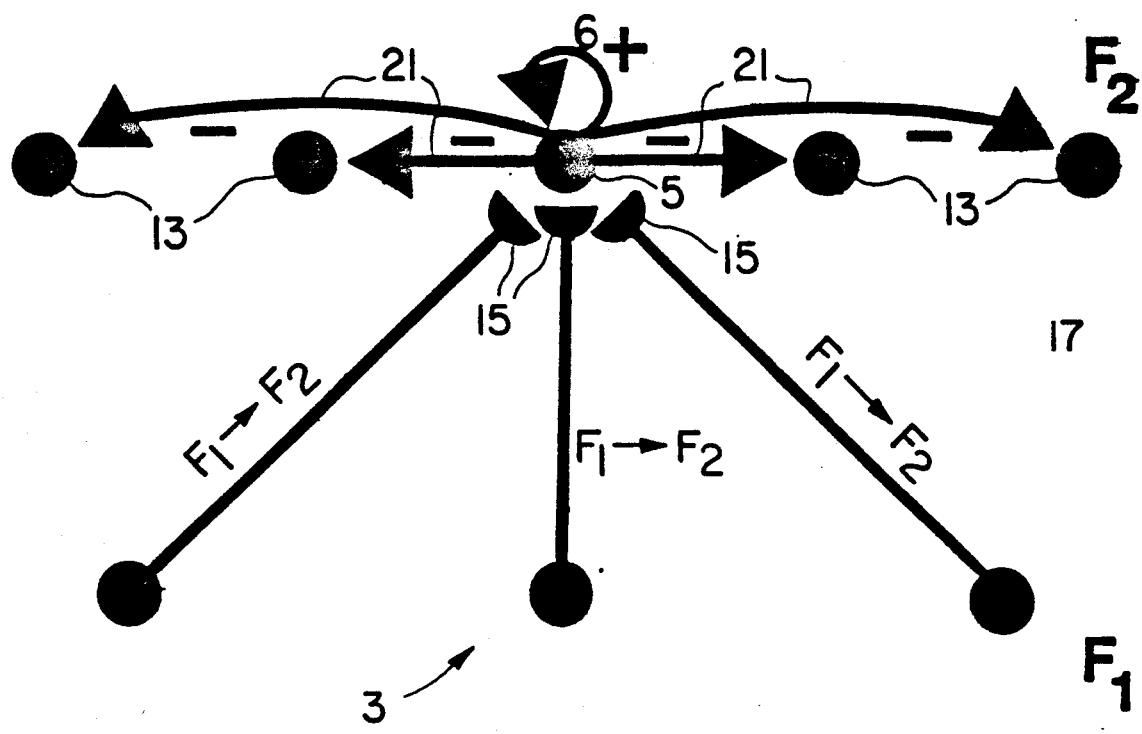
FIG. 17 is an illustration of the interactions amongst the $F_2$ nodes of a masking field.

In FIG. 17, a list node 5 of $F_2$ receives a code or unitized representation of a grouping 3 of item nodes of the item field $F_I$. List node 5 is linked with itself by a positive feedback interaction 6 and with other list nodes 13 of masking field $F_2$ by negative feedback lines 21. These interactions are recurrent on-center off-surround interactions due to their feedback and cooperative-competitive design. Between list node 5 and item nodes 3 is an adaptive filter 17 of the masking fields $F_2$ long-term memory. The adaptive filter 17 enables proper weights 15 to be assigned to each signal crossing pathways $F_I \rightarrow F_2$. These weights 15 multiply the signal with an amount indicative of the signals predictive importance based on past learning. The product is a part of the spatial activity pattern across $F_2$ and part of the unitized code.

Figure 5A:
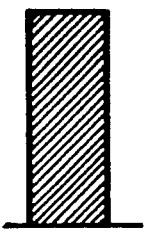
FIGS. 5a-5f illustrate the two types of sensitivities possessed by a masking field embodying the present invention.

The multiple spatial scale analysis performed by the masking field $F_2$ is sensitive to two different types of pattern changes. As a list/word like "myself" is processed, a subword such as "my" occurs before the entire list/word "myself" is experienced. FIG. 5a schematizes this type of informational change. As the list/word is presented, earlier STM activities within $F_1$, shown in FIG. 5a as the tall dark bar element, are modified and supplemented by later STM activations shown as the shorter, lighter colored bars. The STM pattern across $F_1$ expands (shown left to right) as the list word is presented. After the word "myself" is fully stored within $F_1$ parts such as "my", "self", and "elf" are still present within the whole. The masking field $F_2$ then automatically rescales its initial response to "my" as the remainder of "myself" is presented. In this way, the masking field is able to favor the whole list/word rather than its parts.

The masking fields ability to favor a representation of a whole list rather than its parts derives from its sensitivity to the overall scale of each of the groupings within the whole list which it can detect. This automatic scaling property allows the masking field to favor a whole pattern rather than its parts yet does not continue to favor the same whole pattern code when only a part of the pattern is presented. Further, the marking field sensitivity responds to the part as a new whole in its own right so that larger pattern codes are favored when the larger patterns actually occur and smaller pattern codes are favored when the smaller patterns occur.

Figure 5B:
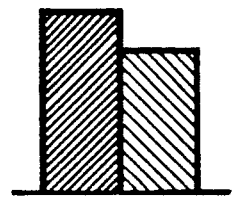
Figure 5C:
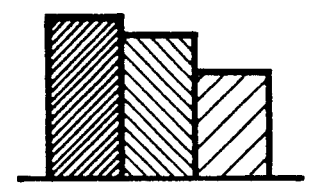
Figure 5D:
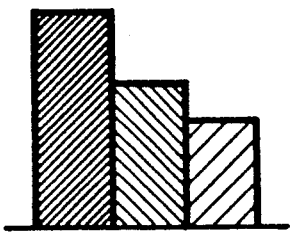
Figure 5E:
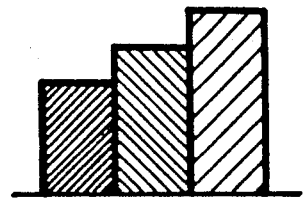
Figure 5F:
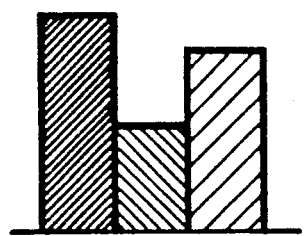

The second sensitivity of the masking field analysis is sensitivity to internal pattern microstructure. This is illustrated by the two words "LEFT" and "FELT". The two words illustrate the issue that the same set of item representations —e.g. codes for the letters "L", "E", "F", and "T", may be activated by different item orderings—e.g. L-E-F-T and F-E-L-T. To distinguish two such activity patterns across item field $F_1$, sensitivity within masking field $F_2$ to different spatial patterns of $F_1$ is insufficient because groupings within both "left" and "felt" may activate the same spatial patterns of $F_1$. Instead sensitivity to different items in an STM pattern which excite the same set of item codes (i.e. letters "F", "E", "L", and "T") is required, as shown in FIG. 5b. The same set of items is shown by a triplet having one dark, one medium and one light bar component. The sensitivity to the pattern microstructure allows each bar of the triplet to have its own intensity or height in the three different whole patterns shown. Through such sensitivity the individual item intensities are acknowledged and considered by the masking field.

The automatic rescaling and microstructure detection properties follow from the manner in which nonlinear feedback interactions among $F_2$ nodes automatically transform the inputs received by $F_2$ into compressed activation codes of $F_2$. This type of non-linear feedback is absent from many alternative grouping algorithms of the prior art. In recent contributions to developing such algorithms, a central problem is to discover how to use "negative votes" to cancel "off-peak positive votes in parameter space" (Brown, c.m. "Inherent Bias and Noise in the Hough transform", *IEEE Transactions on Pattern Analysis and Machine Intelligence*, 1983). A related type of problem is solved by the masking field. The masking field replaces algorithms for positive and negative "voting" with a real-time network undergoing positive and negative feedback interactions. Hence, the present invention combines the design of nonlinear feedback within $F_2$ with the proper type of nonlinear learning in the $F_1 \rightarrow F_2$ adaptive filter to generate stable learning of the unitized groupings with environmentally predictive properties.

The masking field $F_2$ is also capable of simultaneously discriminating more than one grouping within a list of events that activates $F_1$. For example, a masking field $F_2$ might respond to the $F_1$ representation of the word "myself" by strongly activating an $F_2$ node population that is sensitive to the whole word and weakly activating $F_2$ node populations that are sensitive to the word's most salient parts. More generally, it might react to a pair of events A and B by representing the events singularly and as a unitized configuration. In such representation, the total STM pattern across $F_2$ represents the $F_I$ STM pattern. The relative sizes of $F_2$'s STM activities weight the relative importance of the unitized groupings which are coded by the respective $F_2$ node populations.

The suprathreshhold STM activities across $F_2$ are approximately normalized, or conserved, due to the fact that its feedback interactions are competitive between positive and negative feedback shown in FIG. 17. The STM activities across $F_2$ thus function like a real-time probablistic logic, or hypothesis-testing algorithm or model of the evidence which the masking field $F_2$ has about the pattern across $F_1$.

Further, the masking field possesses a predictive, anticipatory or priming capability. In response to a single item across the item field $F_1$, the masking field $F_2$ node population which is most vigorously activated encodes that item. In addition, less vigorous activations may arise at these $F_2$ nodes which represent the most salient larger groupings of which the item forms a part.

The masking field then anticipates, or predicts, the larger groupings that may occur of which the item may form a part during the next time interval.

As more items are stored by $F_1$, $F_2$'s uncertainty concerning the information represented at $F_1$ decreases due to the emergence of a more predictive overall pattern. As $F_2$'s uncertainty decreases, the spatial distribution of STM activity across $F_2$ becomes more focused, or spatially localized, and includes fewer predictive groupings. This type of spatial sharpening measures the degree of informational uncertainty within the $F_2$ code.

Results of computer simulations of the masking field are shown in FIG. 6-16. The masking field sensitivities to multiple pattern scales and internal pattern microstructure are illustrated in simulations of FIG. 6-13. These figures depict the simplest type of grouping by a masking field of the present invention. In this example, each distinct STM activity pattern across $F_1$ activates a unique node or population of nodes in $F_2$ for STM storage within $F_2$. That is, the masking field globally groups activity patterns across $F_1$ into STM choices within $F_2$. Distinct choices are made in response to $F_1$ patterns which vary in overall scale as well as in microstructure, thereby demonstrating the properties summarized above. The same numerical parameters were used in all these simulations; only the input pattern varied. No learning was allowed to occur within the long-term memory (LTM) traces or adaptive weights that multiply the signals in $F_1 \rightarrow F_2$ pathways.

Figure 14:
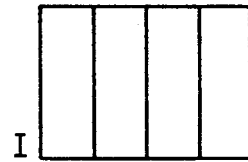
Figure 14:
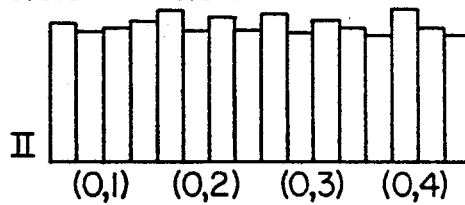
Figure 14:
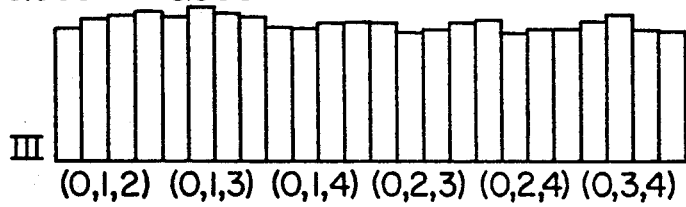
Figure 14:
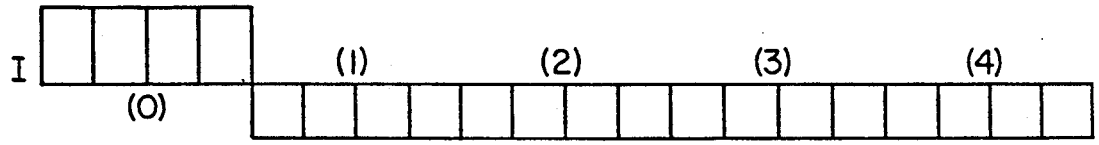
Figure 14:
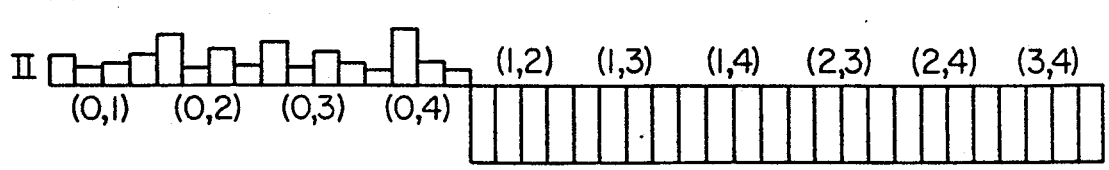
Figure 14:
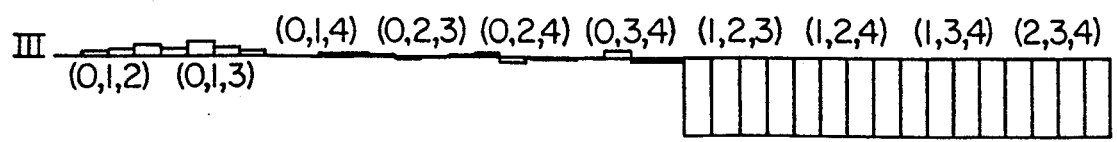
Figure 15:
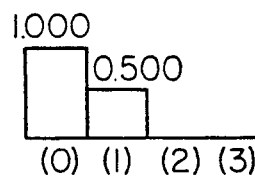
Figure 15:
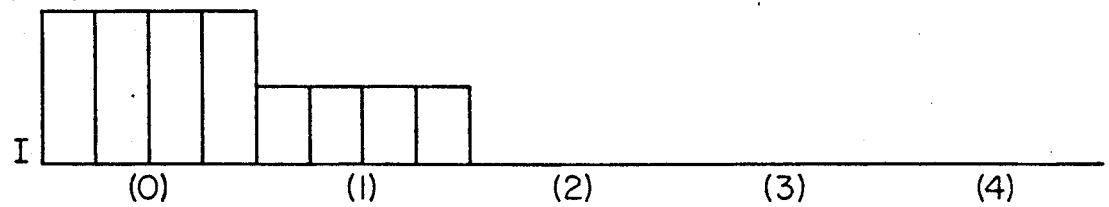
Figure 15:
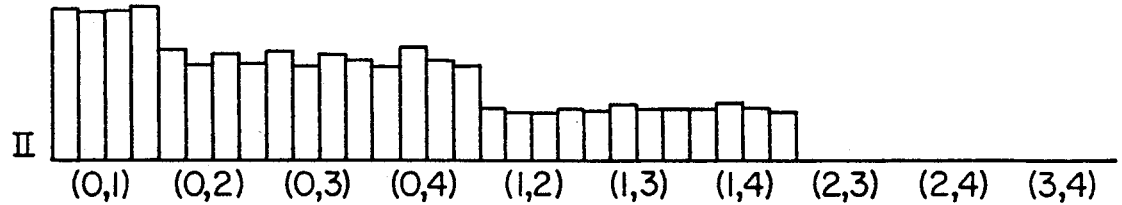
Figure 15:
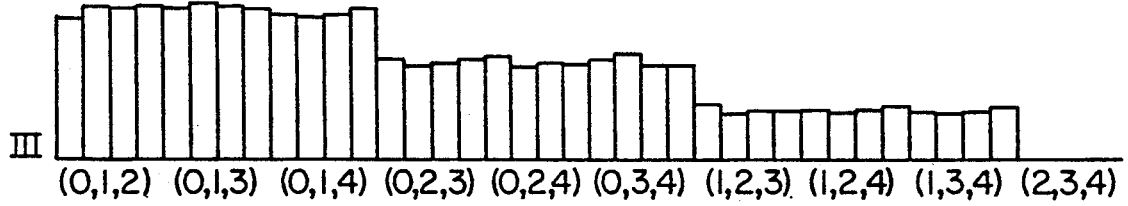
Figure 15:
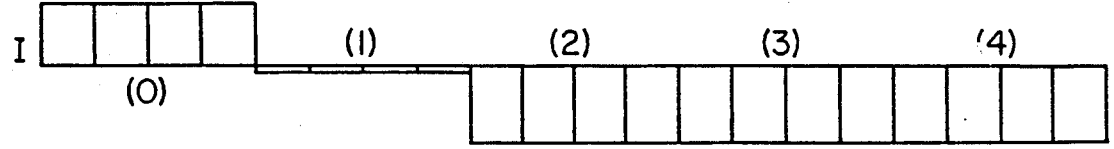
Figure 15:
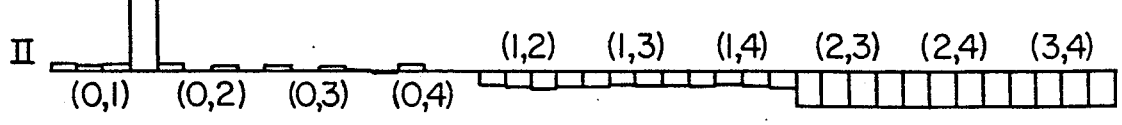
Figure 15:
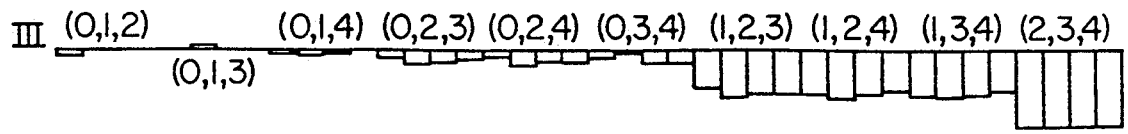
Figure 16:
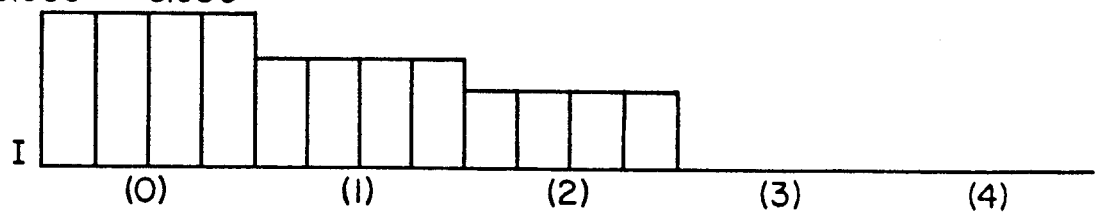
Figure 16:
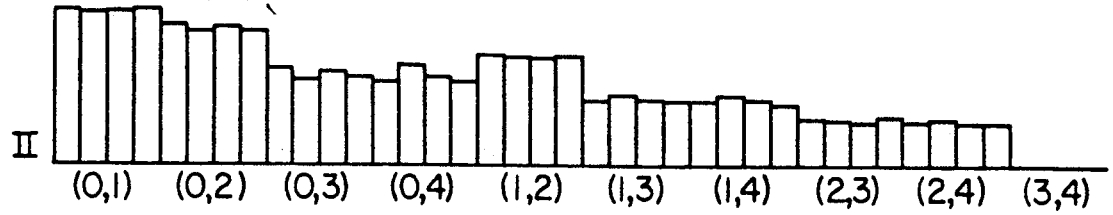
Figure 16:
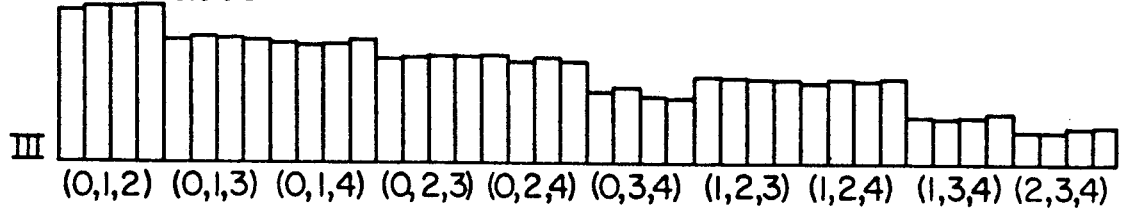
Figure 16:
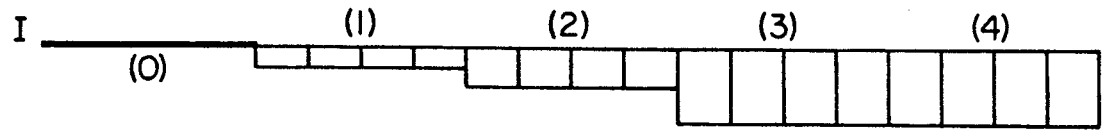
Figure 16:
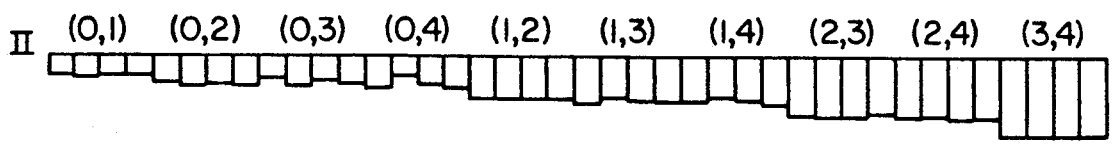
Figure 16:
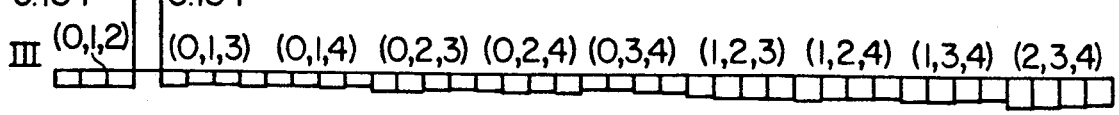

In FIGS. 14-16 the predictive multiple grouping properties of a masking field are illustrated. In the computer simulations depicted in these figures, a fixed but different set of parameters was used to illustrate how a masking field can generate STM representations which encode multiple groupings, including predictive groupings of activity patterns across $F_1$. In these STM representations, the masking field is maximally sensitive to the total STM pattern across $F_1$, but it also generates partial activations to salient subpatterns ("parts") and superpatterns ("predictions") of this pattern. Again, no learning was allowed to occur within the LTM traces in $F_1 \rightarrow F_2$ pathways.

Figure 6:
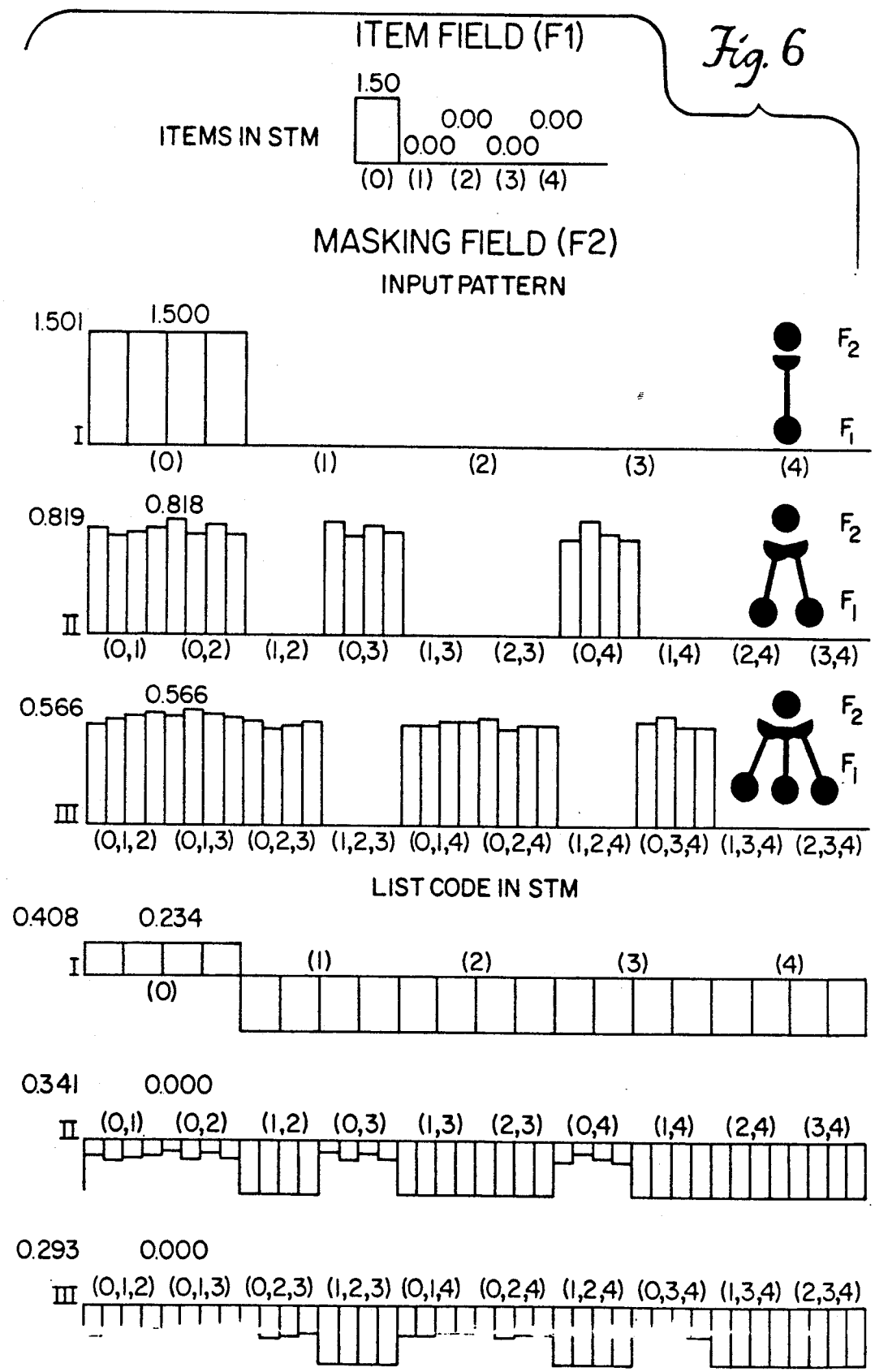

In FIG. 6, a single item in $F_1$ is active as shown on the graph line under the heading "Item Field". This item generates positive inputs to a large number of nodes in $F_2$. The input sizes are depicted by the heights of the bars in the three rows labelled "Input Pattern"Each row lists all $F_2$ nodes which receive the same number of pathways from $F_1$. The first row consists of $F_2$ nodes which receive one pathway, the second row consists of $F_2$ nodes which receive two pathways, and the third row consists of $F_2$ nodes which receive three pathways. In row 1, each $F_2$ node in the set labelled (i) receives a pathway from the $F_1$ item node labelled (i) where i=0, 1, 2, ... 4. Note that the four $F_2$ nodes receive inputs from the (0) $F_1$ node. In row 2, all $F_2$ nodes labelled (0, 1) receive pathways from the $F_1$ nodes (0) and (1). In row 3, all $F_2$ nodes labelled (0, 1, 2) receive pathways from the $F_1$ nodes (0), (1), and (2).

The inputs to all the $F_2$ nodes which receive pathways from the $F_1$ node (0) are positive. There are 44 such nodes in FIG. 6. Despite this fact, the only $F_2$ nodes capable of becoming persistently active in STM are the nodes which receive pathways only from the active item node (0). These are the $F_2$ nodes labelled (0). The STM activities of all other $F_2$ nodes are quickly inhibited by the competitive feedback interactions within $F_2$, despite the fact that many of these $F_2$ nodes also receive large excitatory inputs from $F_1$. The equilibrium STM activities of the $F_2$ nodes are listed in three rows under the heading "List Code in STM". These are the activities which $F_2$ can transform a widespread input pattern into a focal, and appropriate STM activation code. The height of each bar indicates the intensity of the activity represented by that bar. Positive activity is shown as a bar lying above the line of each row I, II, and III. Negative activity is shown as a bar below the row line. Note the only positive activity in response to the input pattern is the 0th node of the $F_2$ list code found in Row I of the list code. It is this part of the code that is stored in $F_2$ STM.

Figure 7:
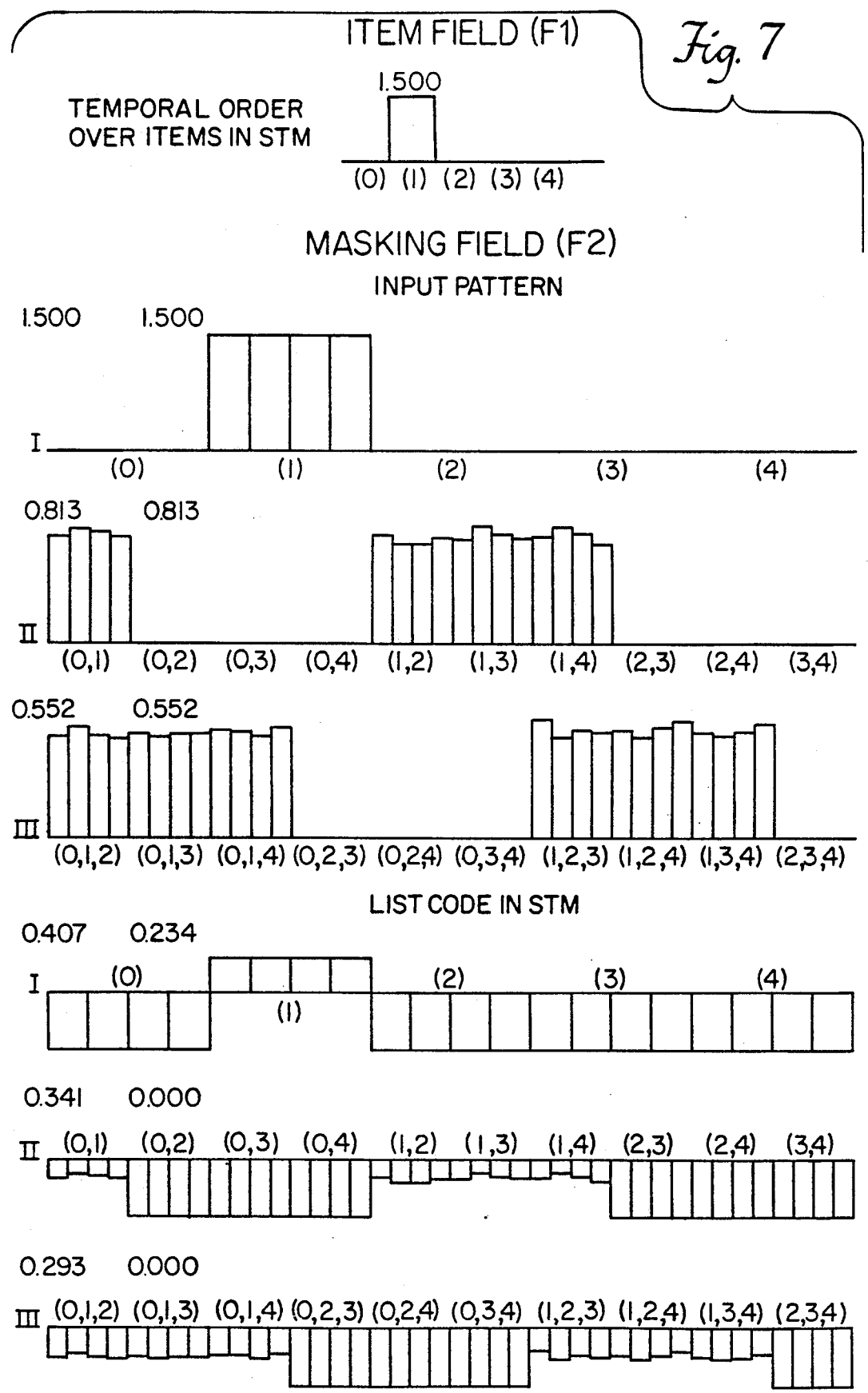
Figure 8:
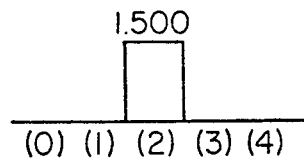
Figure 8:
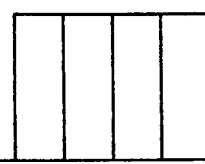
Figure 8:
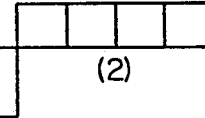
Figure 8:
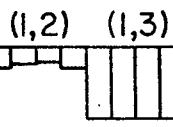
Figure 8:
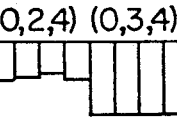

FIGS. 7-13 further illustrate the STM code formation properties of the masking field. Each of these figures represents the network response to a different input pattern. In FIGS. 7 and 8, a different item at $F_1$ is activated. Each item generates a widespread input pattern to $F_2$. Each input pattern is contrast-enhanced into a focal STM activation. This STM activation is restricted to the $F_2$ nodes which receive pathways from only the active item node.

Figure 9:
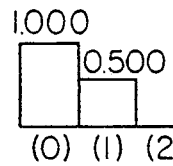
Figure 9:
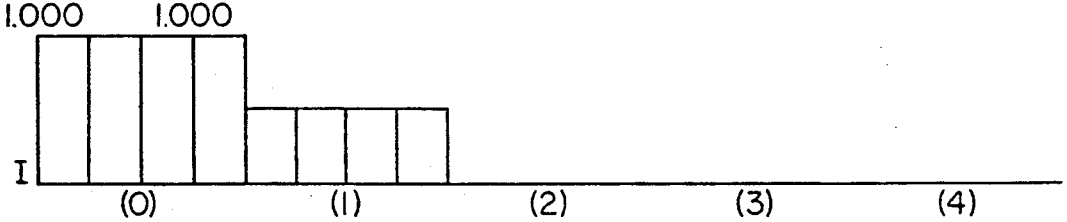
Figure 9:
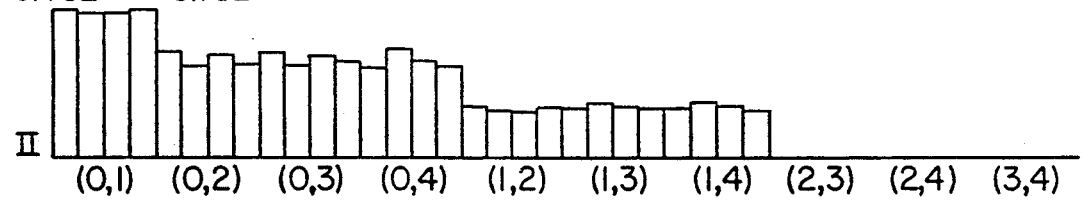
Figure 9:
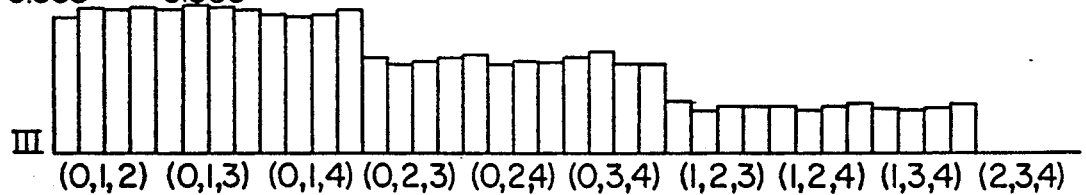
Figure 9:
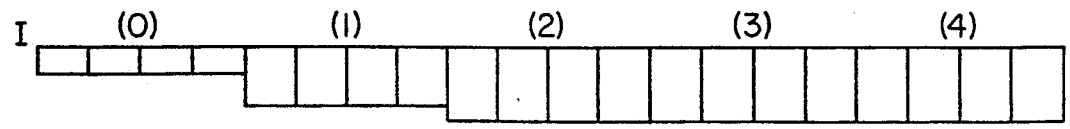
Figure 9:
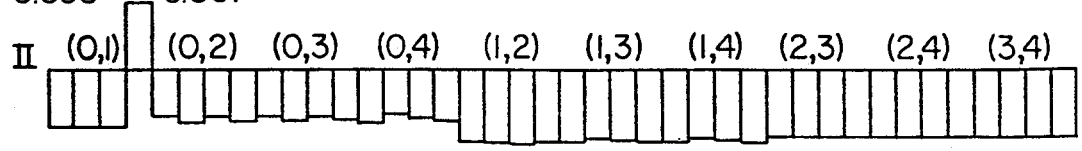
Figure 9:
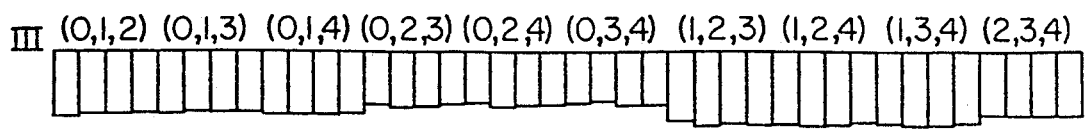

A comparison of FIGS. 6, 7, and 9 illustrates the self-scaling property of masking field dynamics. Suppose that the temporally ordered list of items (0), (1), is received by $F_1$. The list as a whole generates a different spatial pattern across $F_1$ in FIG. 9 than does the first item (0) in FIG. 6 or its second item (1) in FIG. 7 taken independently. The list as a whole also activates even more nodes than does either item taken separately. Despite this fact, only a single $F_2$ node's activity is stored in STM. This $F_2$ node is, moreover, an appropriate node because it is one of the (0,1) nodes that receive pathways only from the $F_1$ items (0) and (1). This comparison thus illustrates the ability of $F_2$ nodes which are activated by larger numbers of $F_1$ nodes to mask the activity of $F_2$ nodes which are activated by smaller subsets of $F_1$ nodes. This is a key property in $F_2$'s functioning as a content-addressable memory.

A comparison of FIGS. 9 and 10 illustrates the ability of $F_2$ to distinguish item patterns with different microstructure. In both of these figures the set of $F_1$ items, (0) and (1), is activated, but a different spatial pattern of activity exists across the items. The spatial pattern in FIG. 9 may represent the temporally ordered list of items (0, 1), whereas the spacial pattern in FIG. 10 may represent the temporally ordered list (1, 0). This denotes that the intensity of item (0) is greater than that of item (1) in FIG. 9 and vice versa in FIG. 10. The simulations show that $F_2$ is sensitive to the item pattern as a whole, because $F_2$ can generate different STM responses to these patterns even though they activate the same items or unordered set of $F_1$ nodes in the item field. In particular, in FIGS. 9 and 10 different $F_2$ nodes become active within the set of $F_2$ nodes which receives pathways only from items (0) and (1).

This comparison between FIGS. 9 and 10 clarifies what is meant by the assertions that the spatial pattern across $F_1$ is the computational unit of the network, and that the differential STM responses of $F_2$ to these computational units embodies a context-sensitive list chunking process.

Figure 11:
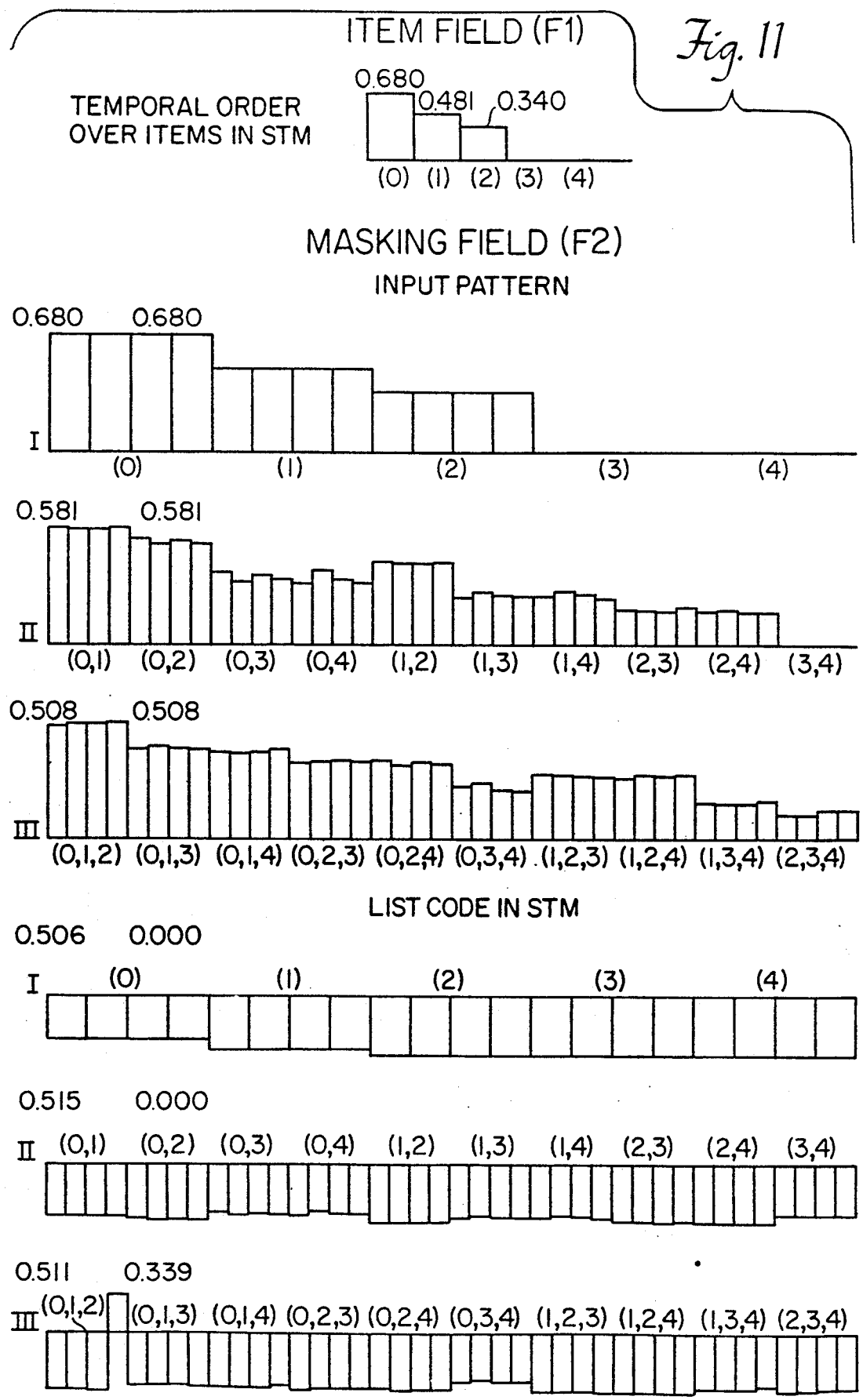

A comparison of FIGS. 6-11 illustrates a more demanding variant of these $F_2$ properties. As a temporally ordered list of items (0), (1), (2) is processed by $F_1$, all the items become individually active at $F_1$ as the spatial patterns in FIG. 6, 9, and 11 evolved through time. The stored STM, pattern in FIG. 11 is however restricted to a single F$_2$ node which is one of the nodes receiving pathways only from items (0), (1), and (2) or the set (0,1,2) as labelled on the graph. Thus, F$_2$ selects a compressed content-addressable representation of the whole pattern at F$_1$, rather than its constituent items.

A comparison of FIGS. 11-13 makes the same point as the comparison of FIGS. 9 and 10 but in a more demanding variation. In each of the FIGS. 11-13, the same unordered set of items (0), (1) and (2), is active across F$_1$. The spatial patterns across F$_1$ represent different temporal orderings of these items: (0,1,2), (1,2,0) and (2,1,0) respectively. In each figure, a different F$_2$ node is activated, shown in the third row of the list code. The active F$_2$ node is moreover one of the nodes that receives pathways only from the item nodes (0), (1) and (2), thus labelled on the graph as a (0,1,2) node. Thus, the content-addressable F$_2$ code is sensitive to the microstrucutre of the F$_1$ activity patterns.

FIGS. 14-16 describe the reactions of a masking field whose parameters are chosen to enable multiple groupings of F$_1$ patterns to be coded in STM at F$_2$. The same input patterns were used as in FIGS. 6, 9, and 11. Comparison of FIGS. 14-16 shows how the automatic scaling property enables F$_2$ to update its STM representations based upon all the groupings which it can detect as the F$_1$ activity pattern expands. In FIG. 14, item (0) most strongly activates the (0) nodes of F$_2$, but also weakly activates other F$_2$ nodes that represents groupings which include (0). The F$_2$ nodes which receive an item pathway only from (0) have a maximal activity level of about 0.130 shown in row I of the list code. The F$_2$ nodes which receive two item pathways, including a pathway from (0), have a maximal activity level of about 0.07 shown in row II of the List Code. The F$_2$ nodes which receive three item pathways, including a pathway from (0), have a maximal activity level of about 0.007 shown in Row III of the List Code. These activity levels or weights characterize the degree of "evidence" which the masking field F$_2$ possesses that each grouping is reflected in the input patterns.

In FIG. 15, the (0,1) spatial pattern across F$_1$ most strongly activates an F$_2$ node within the (0,1) subfield of F$_2$, but also weakly activates other nodes of F$_2$ which receive inputs from (0). The activity levels are about 0.19 for the (0,1) node on row II of the List Code and about 0.072 for the (0) nodes of Row I of the List Code.

In FIG. 16, the (0,1,2) spatial pattern across F$_1$ most strongly activates an F$_2$ node within the (0,1,2) subfield of F$_2$ having an activity of about 0.184. It also weakly activates the (0) subfield of F$_2$ with activity level of about 0.004. The STM activity pattern across F$_2$ becomes more focused from FIG. 14 to 15 to 16 as increasing contextual information reduces predictive uncertainty.

The foregoing has illustrated the STM properties of the masking field. The masking field also posesses an adaptive sharpening property in its long-term memory (LTM).

When an arbitrary unfamiliar input pattern to F$_1$ generates an STM representation across F$_2$, the LTM learns from this F$_1$→F$_2$ pairing in such a way that a subsequent input of the same pattern to F$_1$ generates a spacially sharpened, or contrast-enhanced STM pattern across F$_2$. In particular, when F$_2$ makes a choice in STM, as in FIGS. 6-13, then learning which satisfies an adaptive sharpening property acts to confirm this choice. More generally, adaptive sharpening prevents the learning in the pathways which adaptively filter signals between F$_1$ and F$_2$ from destroying the good pre-wired properties of the masking field. Learning accentuates the initial decisions due to interactions of the adaptive filter with the masking field, but does not upset this balance due merely to repeated presentations of the same F$_1$ pattern.

The adaptive sharpening property is not trivially satisfied by all associative learning laws of the art. This is because F$_2$ automatically reorganizes its STM reactions based on the global patterning, of the inputs received by all of its nodes. The LTM obeys a single LTM law which is used in all the F$_1$→F$_2$ pathways of the adaptive filter. The LTM law reacts to all possible combinations of activity patterns across F$_1$ and F$_2$ with adaptive sharpening, and not a destruction of the global balance between F$_1$→F$_2$ inputs and F$_2$→F$_2$ interactions.

The LTM law guarantees the adaptive sharpening property and enables the multiple groupings of F$_1$ patterns to be influenced by learning. Hence, if a prescribed pattern across F$_1$ is repeatedly presented, then this pattern becomes "familiar" by tuning the adaptive filter to preferentially code its most salient groupings in STM at F$_2$. If a novel superset pattern at F$_1$ is then presented that is, a pattern which includes the familiar pattern as a subpattern then the subset pattern groupings of the familiar pattern can coherently "break away" from the complementary superset groupings. The superset pattern can consequently be represented by an STM pattern of resonant "parts", or "structural groupings" across F$_2$. In other words, prior adaptive tuning enables a novel F$_1$ pattern to generate a directly accessed STM reaction across F$_2$ which segments the F$_1$ pattern into a distributed code of familiar groupings.

The adaptive sharpening property also enables the repeated presentation of a superset grouping to gradually mask otherwise possible subset groupings, unless the subset patterns are also frequently presented in their own right to F$_l$. In intuitive terminology, a coherent set of familiar parts may come to represent the whole, or a more global segmentation may come to represent the whole, depending upon the statistics of the input time series. Interactions between the adaptive filter and masking field can then dynamically organize incoming input patterns into structural relationships which are learned from the statistics of a unique input environment, rather than trying to outguess the environment using pre-wired segmentation rules that usually fail in most environments.

In the computer simulation of the present invention, applicant demanded a strict version of the adaptive sharpening property. Given all the STM groupings in FIG. 6-16, it was demanded that the adaptive sharpening chose the F$_2$ population which was maximally favored in STM before learning began. The LTM law which satisfies this has the form $$\frac{d}{dt} Z_{ji} = \epsilon f(x_i)[-Z_{ji} + LI_j] \quad (1)$$

where $Z_{ji}$ is the adaptive weight or LTM trace in the adaptive filter F$_1$→F$_2$ from the jth node V$_j$ in item field F$_1$ to the ith node V$_i$ in masking field F$_2$; I$_j$ is the input from V$_j$; x$_i$ is the STM activity level of V$_i$; f(x$_i$) is a nonlinear sampling signal that is activated by sufficiently large values of x$_i$; and $\epsilon$ and L are constants.

A law such as stated in (1) violates the Hebbian associative postulate that is the basis for many current learning models. From Hebb, D. O. "The Organization of Behavior", New York: Wiley, 1949 the *Hebb Postulate* states: "When the axon of cell A is near enough to excite a cell B and repeatedly or persistently takes part in firing it, some growth process takes place in one or both cells such that A's efficiency, as one of the cells firing B is increased".

Furthermore, the learning rule in (1) is called an "associative rule" whereby LTM efficiency changes as a function of a time average of correlated presynaptic and post-synaptic cell activities. Associative rules are often called "Hebbian" rules in honor of Hebb. It is believed that this convention has however caused confusion in the associative learning literature because different associative rules can support qualitatively different types of learning properties.

The Hebb Postulate seems plausible if one assumes that the unit of associative learning is a single node's activity whose correlation with another node's activity can increase the LTM strength of a pathway between the nodes. A different associative rule is needed, however, if one agrees that the unit of associative learning is a spatial pattern of acitvity across a network of nodes, as is required by FIGS. 6–16. Then the correlation between a spatial pattern across $F_1$ and a node's activity in $F_2$ enables the LTM traces in the set of pathways from $F_1$ to the active $F_2$ node to encode the entire spatial pattern of activity into LTM. In this situation, an associative rule is needed which can encode both increases and decreases of LTM strength as a function of the pairing of node activities, because an inactive node $V_j$ at $F_1$ should cause $Z_{ji}$ to approach zero when correlated with an active node $V_i$ at $F_2$. Thus a change in the functional unit of learning from a single node to a spatial pattern across a network of nodes necessitates an associative rule that violates the Hebb Postulate.

Figure 18A:
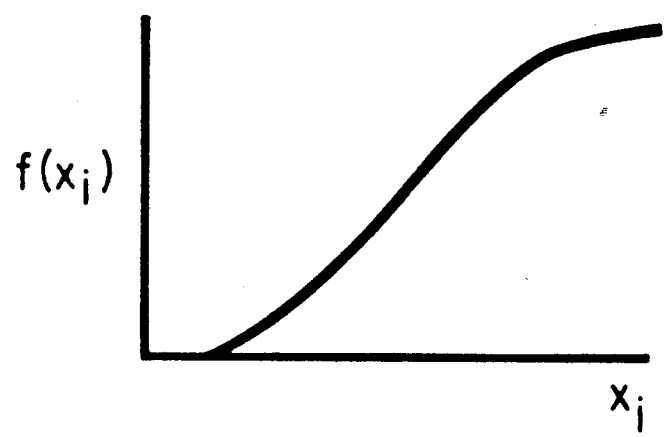
FIG. 18a is a graph of a faster-than-linear increase of the sampling signal $f(x_i)$ of STM activity $x_i$ over a large domain of $x_i$ activities.
Figure 18B:
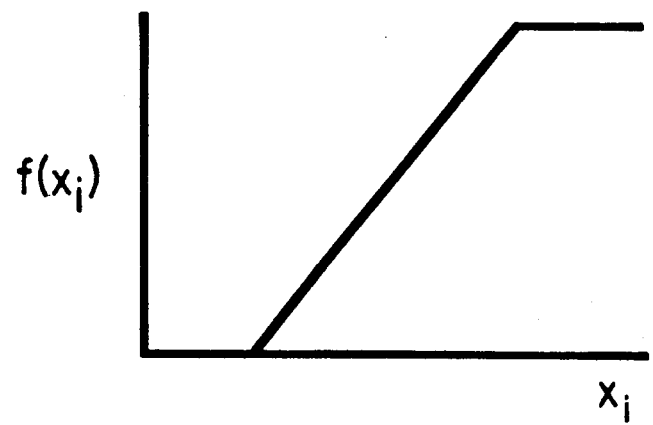
FIG. 18b is a graph of a threshold-linear increase of the sampling signal $f(x_i)$ of STM activity $x_i$ over a large domain of $x_i$ activities.

Another nonclassical property of the learning law (1) is that the sampling signal $f(x_i)$ is a nonnegative function which grows faster-than-linearly, such as, but not limited to, quadratically as shown in FIG. 18(*a*) or in a threshhold-linear fashion as $x_i$ increases above zero as shown in FIG. 18(*b*). In equation (1), the sampling signal $f(x_i)$, values of $x_i$ determine a much slower learning rate in $Z_{ji}$ than do large values of $x_i$. Consequently, $F_2$ nodes which acquire an initial STM advantage can greatly amplify that advantage by speeding up the learning of their contiguous LTM traces. In contrast, $F_2$ nodes whose activities remain below zero cannot trigger any learning in their contiguous LTM traces because $f(x_i)=0$ if $x_i$ 0. This property justifies calling $f(x_i)$ a sampling signal.

The state-dependent learning rate $f(x_i)$ in (1) says that learning can occur only at LTM traces $Z_{ji}$ whose target activities $x_i$ are chosen by the cooperative-competitive decision-making machinery of $F_2$. All LTM traces $Z_{ji}$ whose $F_1$ items receive positive inputs $I_j$ can influence $F_2$'s decision-making by multiplying these inputs on their way to $F_2$. In contrast, a much smaller number of LTM traces can learn from the decision-making process due to the property that $F_2$ chooses a compressed recognition code which is much less distributed than the input patterns which it receives. In this sense, LTM read-out through the adaptive $F_1 \rightarrow F_2$ filter and LTM read-in by the associative law (1) are at least partly dissociated due to intervention of the cooperative-competitive interactions within $F_2$.

Applicant has found that the learning law (1) confirms all the STM choices described in FIGS. 6–13. Also, the adaptive sharpening property is illustrated by the multiple groupings in FIGS. 14–16 being adaptively transformed into STM choices when the learning law (1) is used in the $F_1 \rightarrow F_2$ adaptive filter.

FIGS. 19 through 23 describe the equilibrium STM choice that is generated when the learning process approaches a limit in response to each input pattern. The fact that the system always approaches equilibrium STM and LTM values is a fundamental property since feedback interactions between STM (fast) and LTM (slow) processes can easily lead to sustained oscillations, in a poorly designed system.

In the full dynamical system, STM reacts to an input pattern more quickly than does the slower LTM learning process. In a singular approximation to the full dynamical system, it is assumed that LTM does not change at all until the STM activities have almost reached an equilibrium value. The LTM learning process is then switched on and both STM and LTM interact until they conjointly approach equilibrium. Using such a singular approximation, a much faster LTM learning rate (a larger $\epsilon$ in equation (1)) can be used without significantly changing the equilibrium STM and LTM patterns that are found using the full system. A comupter simulation of a singular system was thus done much more quickly then a simulation in which the full system was integrated with a small $\epsilon$ until it reached equilibrium. After confirming the adaptive sharpening property using a singular approximation, simulations with the full system were done using several different choices of the learning rate parameter $\epsilon$ in equation (1).

FIGS. 19 and 20 describe the equilibrium patterns in a singular system all of whose parameters, except the learning rate $\epsilon$, are the same as in the simulations of FIG. 14–16. For FIGS. 14–16 the learning rate $\epsilon=0$. In FIGS. 19 and 20, $\epsilon$ was set equal to zero until the STM traces across $F_2$ were close to equilibrium, then $\epsilon$ was switched to equal 1 to allow the full system to approach equilibrium.

Figure 19A:
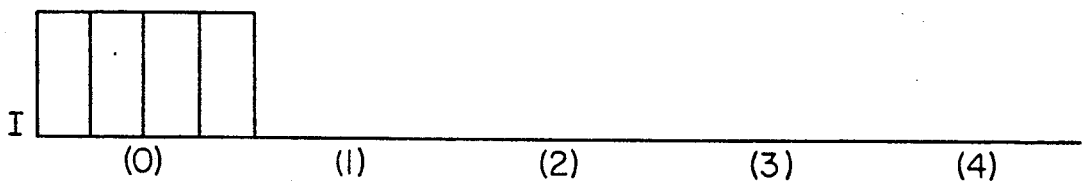
FIGS. 19a-19d are illustrations of a computer simulated masking field with adaptively sharpened list codings using the same input items as in FIG. 14 and 15 showing how learning biases an adaptive filter to choose the preferred list code at $F_2$.
Figure 19A:
Figure 19A:
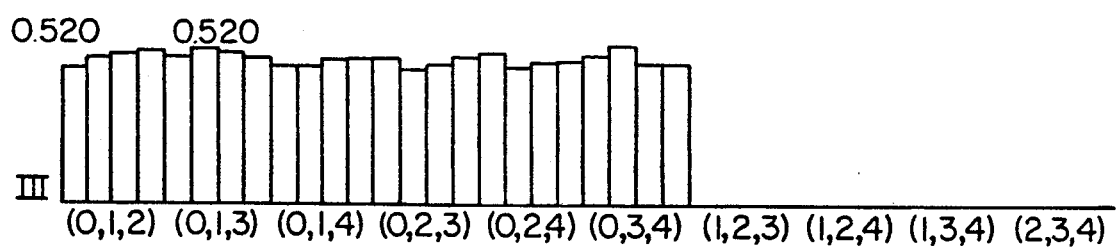
Figure 19A:
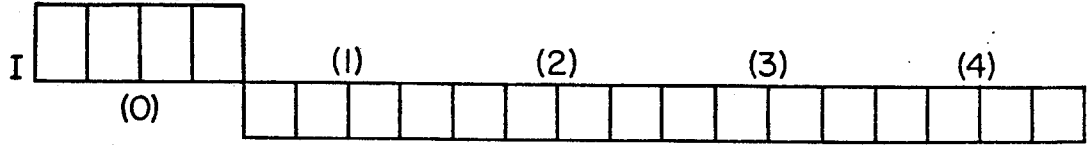
Figure 19A:
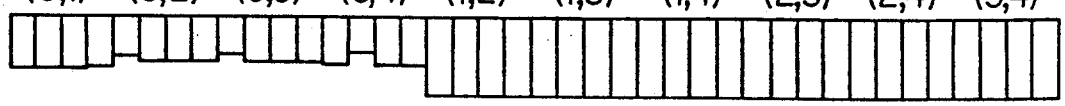
Figure 19A:
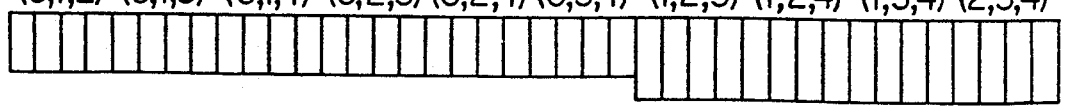
Figure 19B:
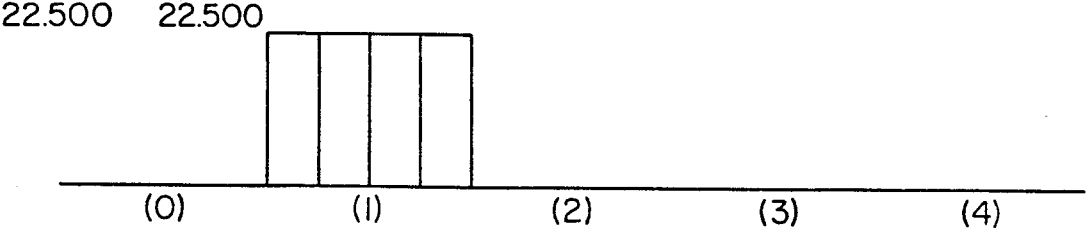
Figure 19B:
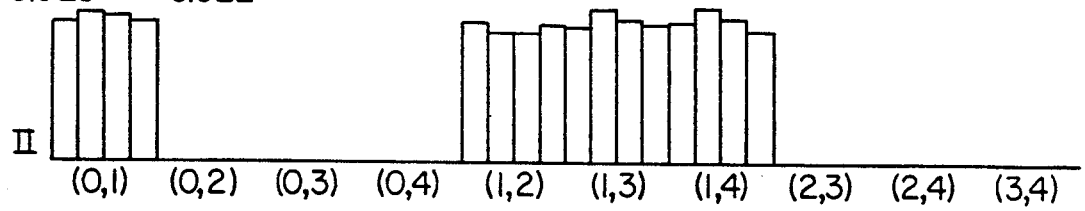
Figure 19B:
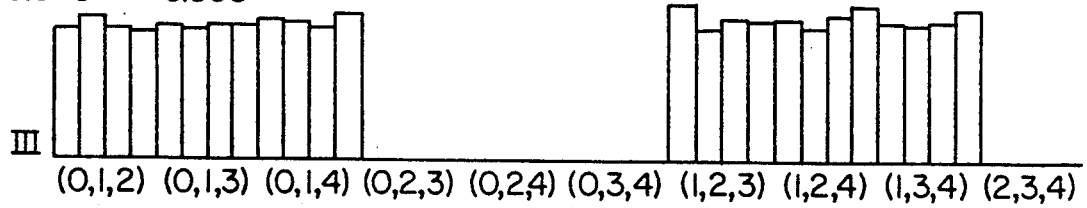
Figure 19B:
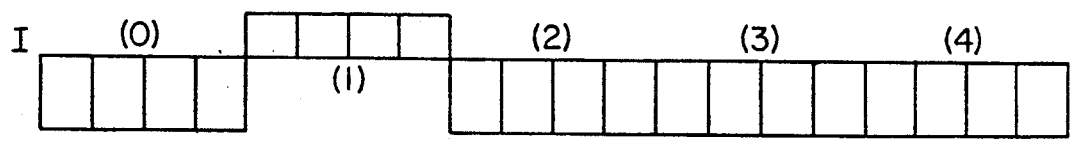
Figure 19B:
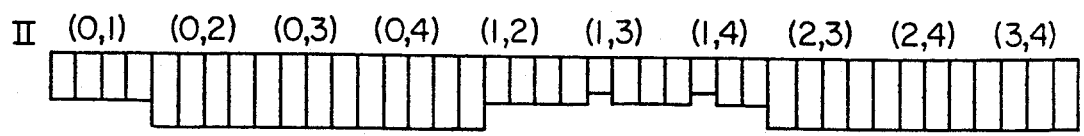
Figure 19B:
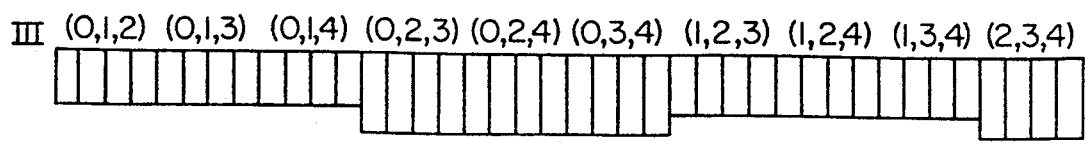
Figure 19C:
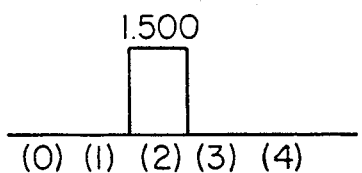
Figure 19D:
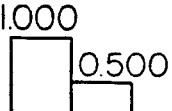
Figure 19D:
Figure 19D:
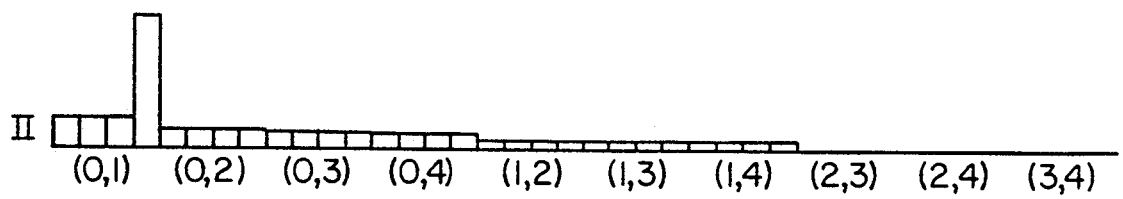
Figure 19D:
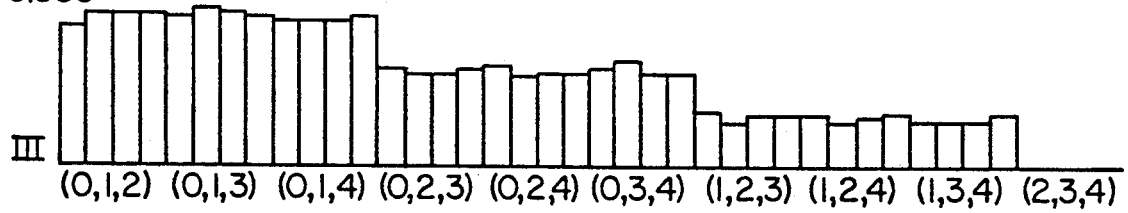
Figure 19D:
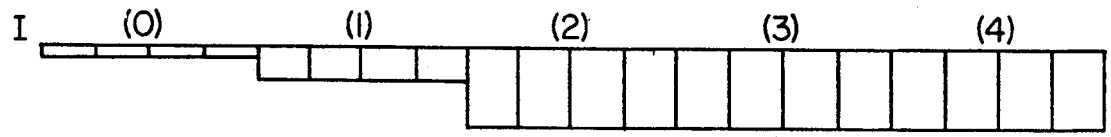
Figure 19D:
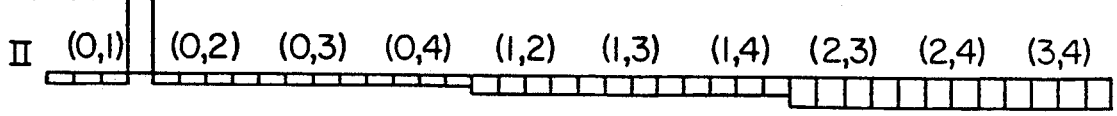
Figure 19D:
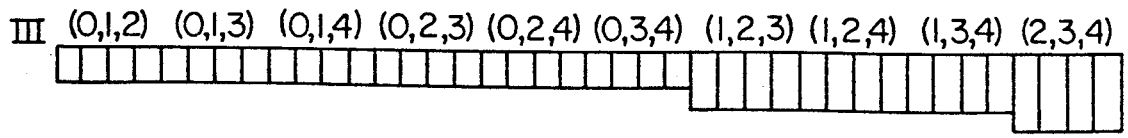

A comparison of FIGS. 19*a*, 19*d*, and 20 with FIGS. 14–16 respectively shows that the adaptive sharpening property is obtained. Comparison of the input patterns to $F_2$ nodes without learning in FIGS. 14–16 and after learning in FIG. 19*a*, 19*d*, and 20 shows how LTM changes in the $F_1 \rightarrow F_2$ pathways alters the total input to the $F_2$ nodes. More specifically after learning, there are no positive activities in row II and III of the list code in FIG. 19*a* where there was activity in those rows in FIG. 14 before learning. This is an accurate sharpening of the activity code to be stored in $F_2$ since the input to $F_1$ was merely a single (0) item which shou'd correspond only to the (0) nodes in row I of the list code leaving no positive activity in rows II and III. The same sharpening of the masking field input pattern and consequent list code occured in FIG. 19*d* with learning compared to FIG. 15 without learning. In FIG. 19*d*, one (0,1) node of the masking field input pattern is exaggerated above the other 2-item nodes. This is reflected in the increased activation of node (0,1) in the list code and the decreased activities of the other list code nodes relative to the activities obtained in the list code in FIG. 15. Moreover, row II with the exaggerated (0,1) $F_2$ input node of FIG. 19 shows that adaptive sharpening is obtained over row II of the input pattern to $F_2$ in FIG. 15. On the other hand, the input pattern to $F_2$ in FIG. 15 does not emphasize any one (0,1) node relative to the other $F_2$ input nodes and produces a more ambiguous list code for the $F_1$ input of (0,1). Similarly row III of the $F_2$ input pattern in FIG. 20 is a sharpening of row III of the F₂ input pattern in FIG. 16. Consequently, the list code of FIG. 20b is a single (0,1,2) node which is a sharpening of the lsit code in FIG. 16 having (0) nodes plus a relatively higher activated (0,1,2) node.

Figure 21:
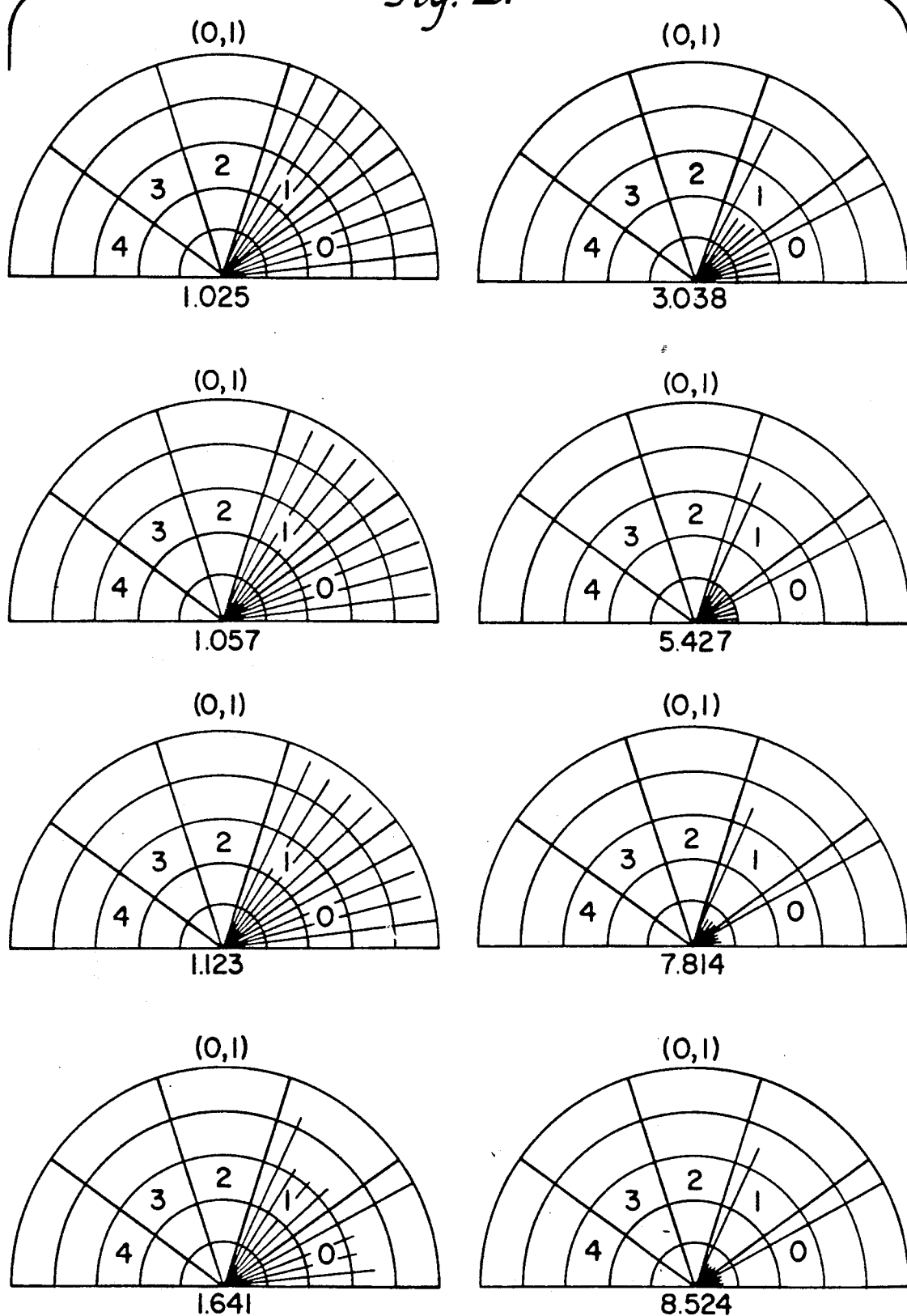
FIG. 21 is illustrations of the changes in $F_2$ LTM strength through time due to learning.
Figure 22A:
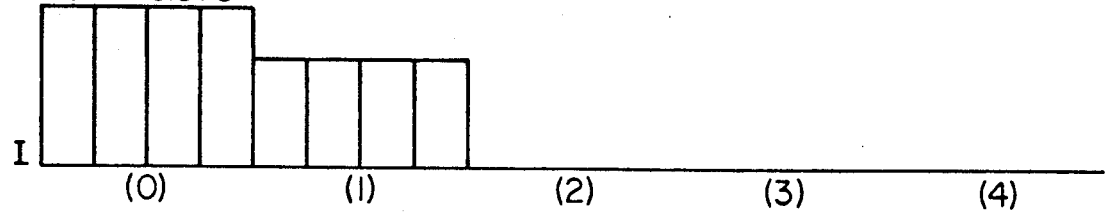
FIGS. 22a-22e are illustrations of computer simulations showing a transition from a widespread to a focal phase 2 activation across $F_2$.
Figure 22A:
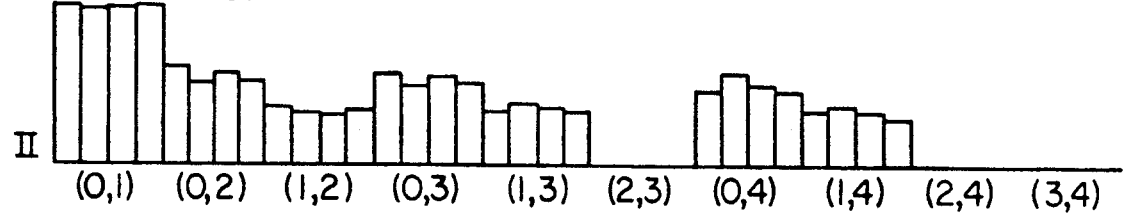
Figure 22A:
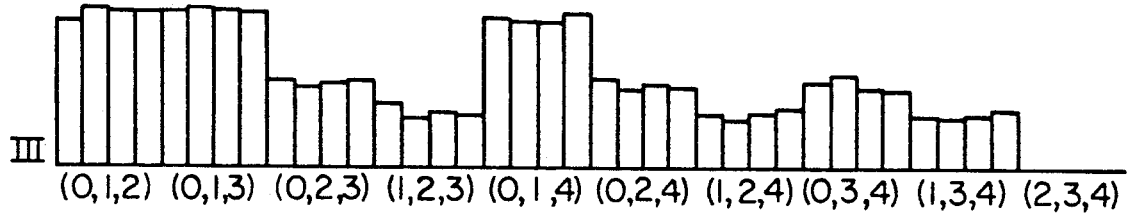
Figure 22A:
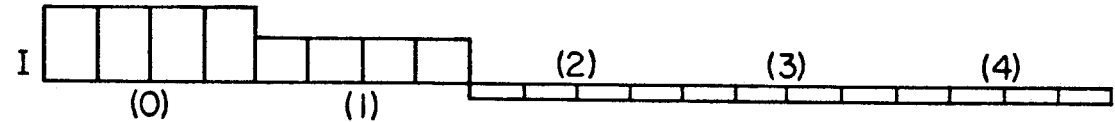
Figure 22A:
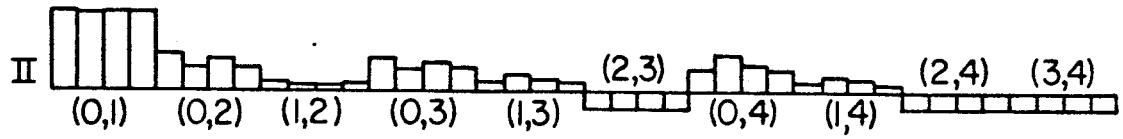
Figure 22A:
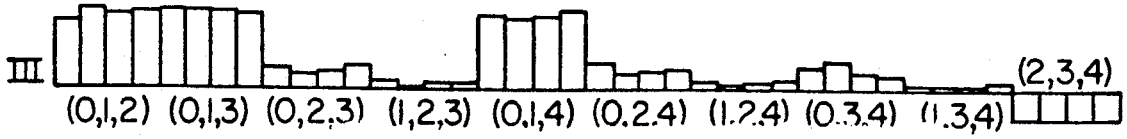
Figure 22B:
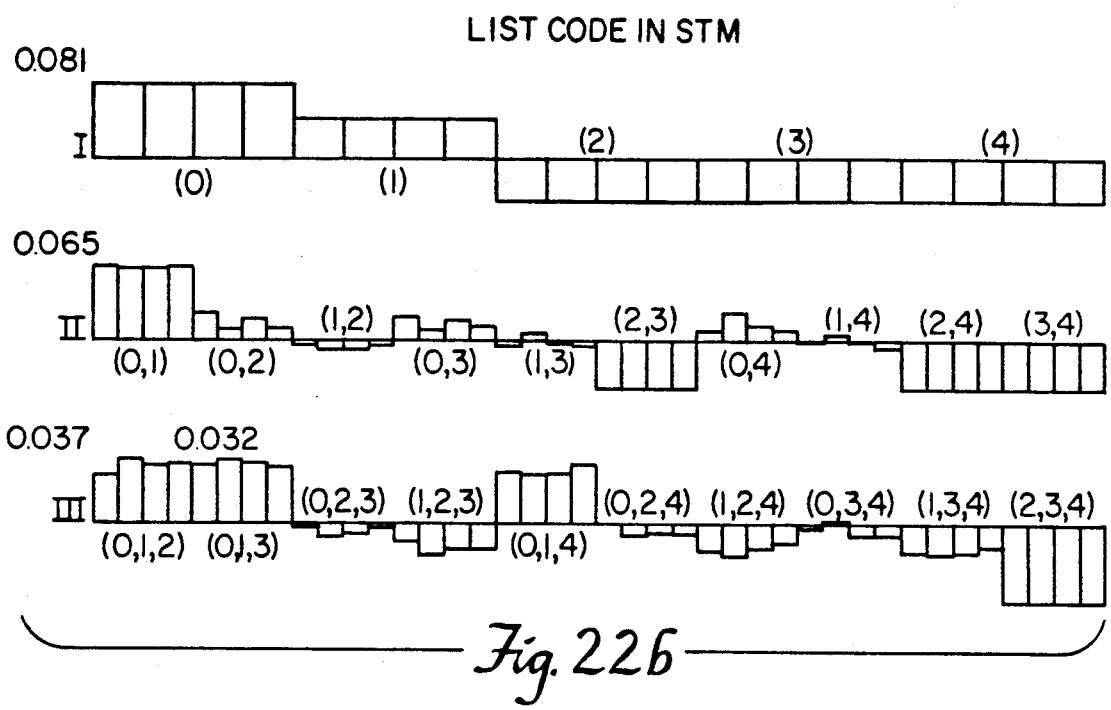
Figure 22C:
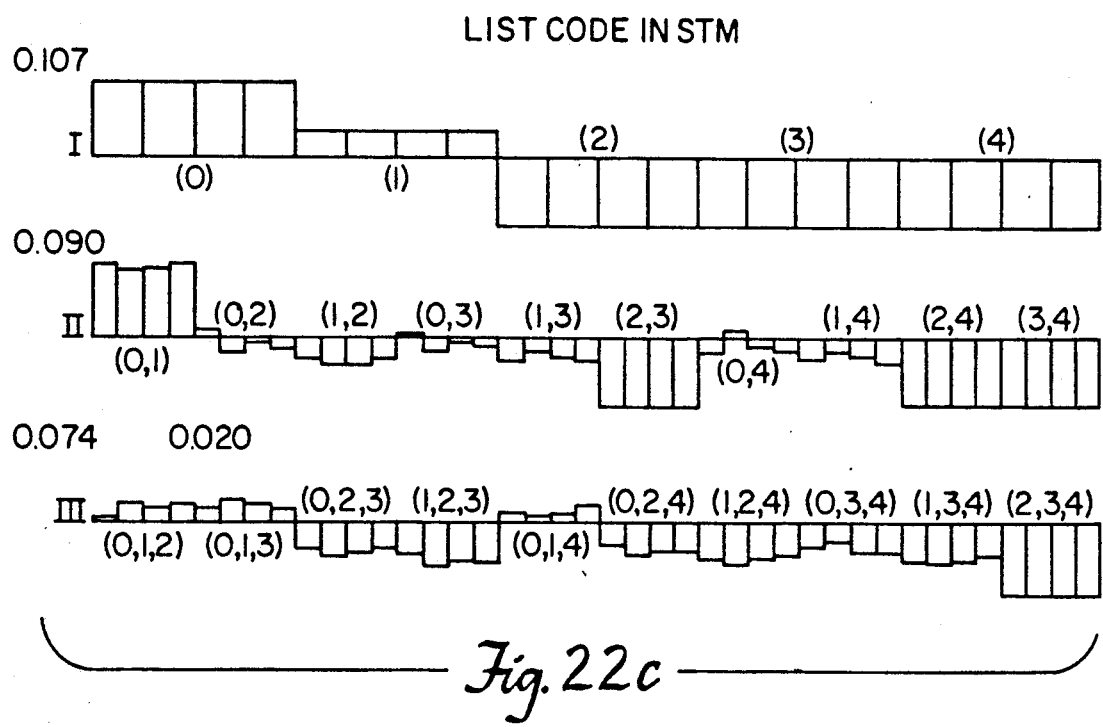
Figure 22D:
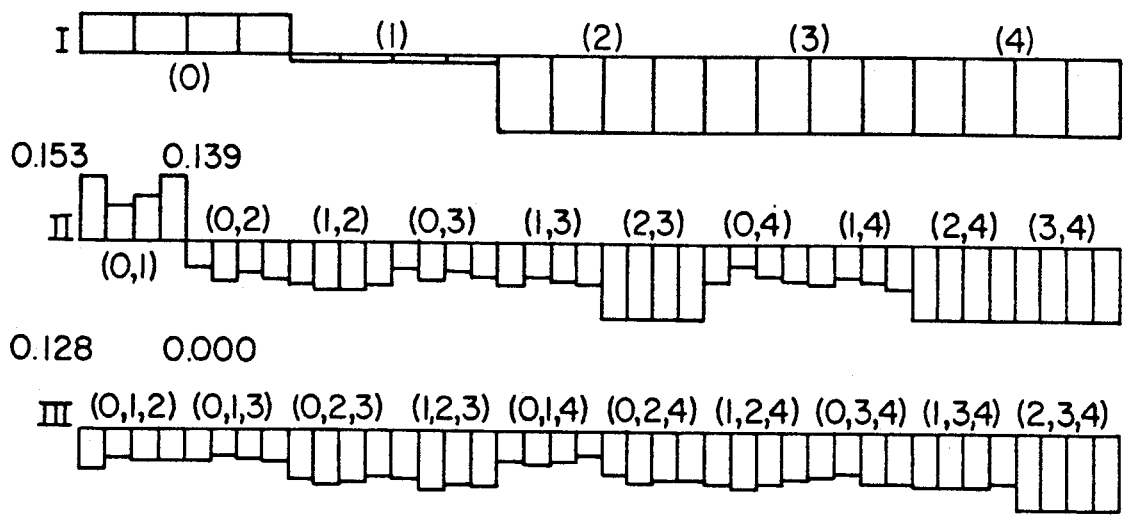
Figure 22E:
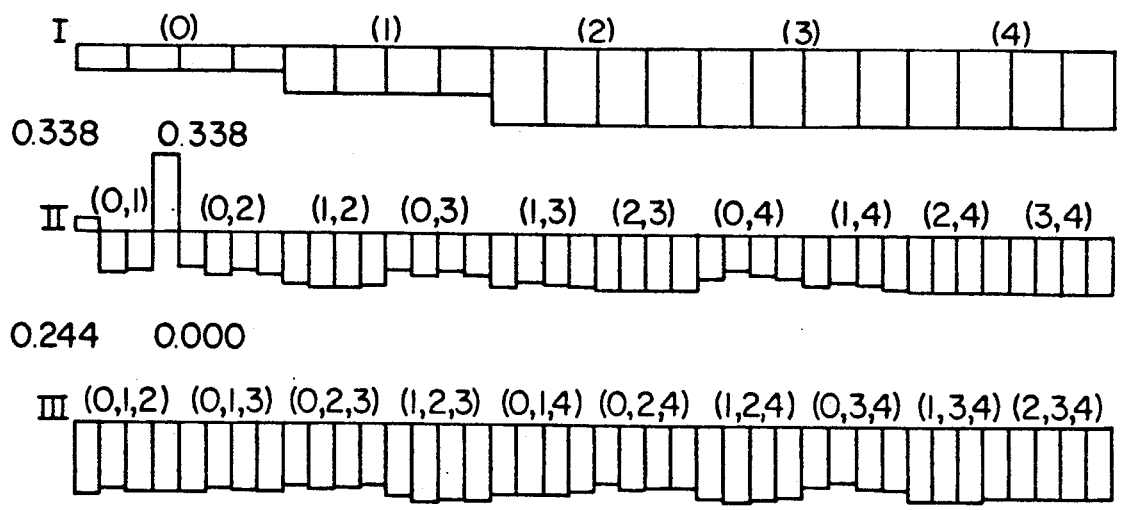

Having achieved the adaptive sharpening property in a singular system, the property is next demonstrated without a change in parameters other than $\epsilon$ in the full system as shown in FIG. 21. In these full system simulations $\epsilon$ was set at 0.1 and the decay rate of STM activities across F₂ in the absence of internal feedback signals was chosen to equal 1. The adaptive sharpening property was confirmed in the full system using plausible relative rates of STM and LTM change. FIG. 21 depicts a computer simulation of how the LTM values in a subset of $F_1 \rightarrow F_2$ pathways changed through time due to learning. The simulations show that the present masking field and associative learning laws are sufficient to generate the properties (a)-(D).

In FIG. 21, the item field has an input of a (0) item and a relatively smaller (1) item. The first picture is taken at a time 1.025. Each of the masking field nodes (0) through (4) are shown as a pie-shaped segment of the semicircle graph. Masking field nodes (0) and (1) have fully activated signals from the input set (0,1). That is, pathways from both items (0) and (1) of the item field show full activation of all the (0) and (1) nodes of the masking field. Full activation is shown by a complete radius in the graph and partial activation by a partial radius. At a later time of 1.057 and 1.123, the activation levels of some pathways have slightly decreased from full radial extension in (0) and (1) of the masking field to partial radial extension. This is due to the learning of the masking field. More LTM alterations in the pathways appear at times 3.038 and 5.427. Finally, at times 7.814 and 8.524 only one (0) node of the masking field is fully activated, one (1) node is 75 percent active, and the other (0) and (1) nodes are minimally active.

There are three major phases in F₂'s reaction to an input pattern at F₁. In phase 1, the input pattern starts to deliver signals to F₂ nodes via the $F_1 \rightarrow F_2$ pathways and many F₂ nodes thereby start to become activated. As these nodes become activated, they begin to generate feedback signals, notably competitive signals, to other F₂ nodes as previously shown in FIG. 17. The balance between excitatory and inhibitory signals to each node quickly contrast-enhances the input pattern from F₁ and generates the more focal STM reactions at F₂ which are depicted in FIGS. 6-16. In the absence of additional learning, reset, or habituative mechanisms, these focal STM reactions are stored by the balance of inputs and feedback signals within F₂.

Phase 2 consists of the contrast enhancement and storage of these STM patterns. In the language of the Hough transform, the positive and negative "votes" cast by the masking field cancel both "off-peaks" and "false peaks" caused by the adaptive filter. A computer simulation of the transition from Phase 1 to Phase 2 is summarized in FIG. 22. The parameters are the same as those in FIG. 9. Each successive picture (a) through (e) depicts the STM activities of F₂ nodes at a later time after the onset of the input pattern to F₁. The beginning STM activities of row I show positive (0) nodes and relatively less positive (1) nodes. Later in FIG. 22e, the (0) nodes are negative and the (1) nodes are even more negatively active due to the feedback interactions of F₂. In row II, all the original nodes have positive activity except for the (2,3), (2,4), and (3,4) nodes in FIG. 22a. By the later time the nodes of row II are all negative except for two (0,1) nodes, one of which is much more active than the other. In row III all of the nodes except for the (2,3,4) nodes change from positive activity to negative. Thus, FIG. 22 shows that after the input pattern activates F₁, there is a massive but transient activity burst across F₂ which is quickly sculpted by F₂'s feedback interactions.

If $\epsilon$ in equation (1) is chosen so large that significant learning can occur during Phase 1 (i.e. the learning rate is too fast) then many F₂ nodes $V_j$ can sample the $F_l$ activity pattern because their learning rates $\epsilon$ f($x_i$) are large during Phase 1. In contrast, if $\epsilon$ is small, then insignificant learning occurs during Phase 1 because the duration of Phase 1 is not long enough to integrate a large LTM change at rate $\epsilon$ f($X_i$) During Phase 2, only those F₂ nodes which are selected by the internal feedback interactions within F₂ can sample the input pattern, and thereby tune their LTM traces because f($X_i$)=0 at all other F₂ nodes. Thus, if the learning rate is fast relative to the duration of Phase 1, then learning is not controlled by the masking field's grouping process. Morever, such spurious learning can interfere with the masking field's ability to select a predictive grouping during Phase 2.

FIG. 23 describes computer simulations which illustrate how a change in the learning parameter can alter the equilibrium grouping that is finally learned. Choosing $\epsilon$ too large can also cause violations of the adaptive sharpening property. FIG. 23a repeats FIG. 9 to aid comparison of the no-learning case with several learned groupings. In FIGS. 23b-d, $\epsilon$ was chosen to equal 1, 0.1 and 0.01, respectively. When $\epsilon=1$, F₂ selected both (0) and (0,1) nodes as shown in FIG. 23c. When $\epsilon=0.01$, F₂ chose the correct (0,1) node shown in FIG. 23d. In all cases, the learned F₂ grouping exhibited a form of adaptive sharpening. In FIG. 23b however, the chosen F₂ nodes do not code information about item (1) at all. The reason for this bias towards (0) nodes at fast learning rates can be traced to properties of the Phase I surge. In FIG. 21, an initial advantage of (0) nodes above (0,1) nodes can be seen before the self-scaling feedback interactions within F₂ reverse this advantage.

These results illustrate that in the masking field heretofore described, there exists a trade-off between the rate of cooperative-competitive decision-making by F₂ and the rate of learning by the $F_1 \rightarrow F_2$ adaptive filter. Learning must be sufficiently slow relative to the decision-making process to avoid spurious learning of transient decisions. The results also show, however, that a proper scaling of rates, with LTM approximately 100 times slower than STM, can avoid this sampling problem.

The design problems of Phase 1 surge and fast learning that are raised by the simulation in FIGS. 22 and 23 are solved in one embodiment of the present invention by a modification of the masking field's internal connections. The modification substantially reduces the Phase I surge and enables the masking field to learn in a way that is insensitive to whatever residual surge may still occur.

Figure 24:
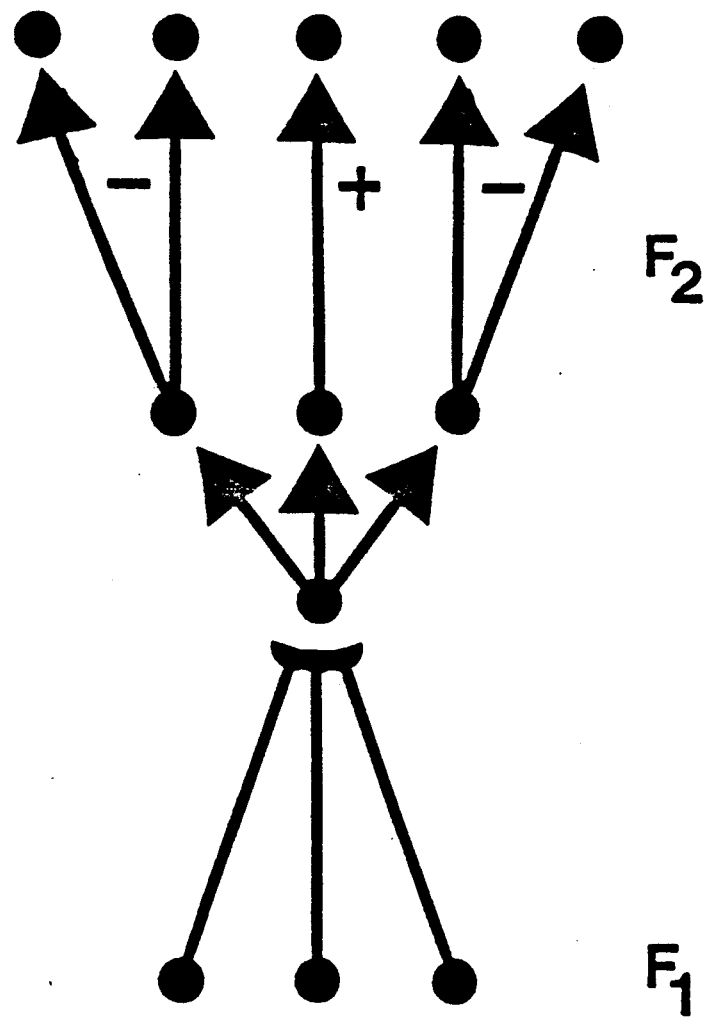
FIG. 24 is a schematic view illustrating excitatory and inhibitory pathways eliminating the Phase 1 burst problem.

The Phase I surge is due to the fact that all $F_1 \rightarrow F_2$ inputs are excitatory. Applicant proposes that, before these inputs can influence their target nodes in F₂, they activate internal feedback pathways within F₂ which balance the excitatory signals with inhibitory signals. This is illustrated in FIG. 24 where inhibitory signals 42 are registered at the same moment that excitatory signals 45 are registered in F₂ due to internal feedback pathways at 46. There are no time intervals during which excitatory inputs 45 can activate Phase I bursts that is not controlled by inhibitory signals 42.

Figure 25:
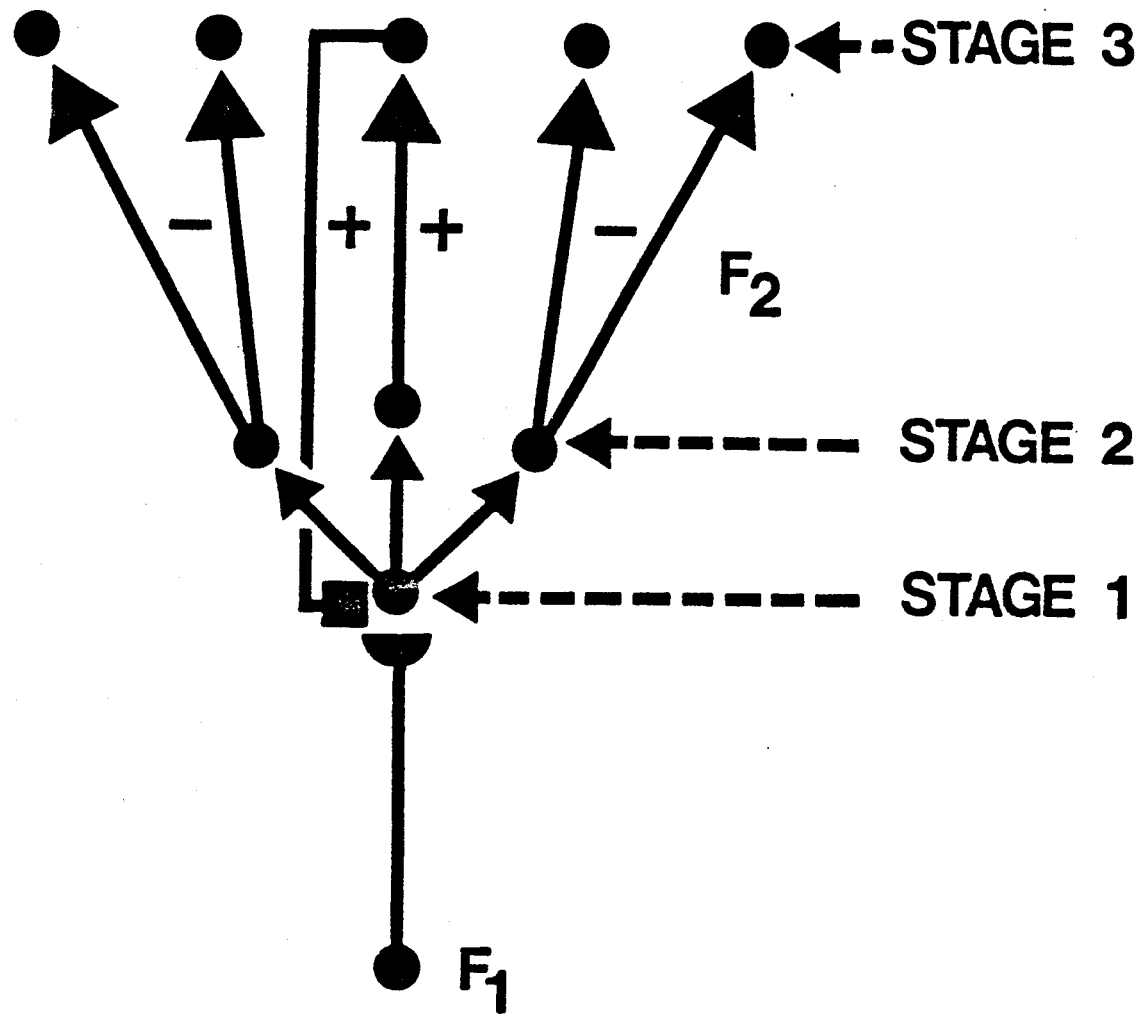
FIG. 25 is a schematic view showing the inhibitory and excitatory pathways of FIG. 24 as internal feedback pathways of $F_2$.

In the preferred embodiment, applicant chooses the feed forward inputs from the adaptive filter to use the same internal feedback nodes that are used to define the masking field, as shown in FIG. 25. The uncontrolled Phase 1 burst is then prevented by a structural mechanism which immediately begins the grouping process when it receives an input burst.

As FIG. 25 shows, the masking field is now broken into three internal stages. Stage 1 receives the excitatory inputs 52 from $F_1$. Stage 2 contains the internal pathways 54 which distribute excitatory and inhibitory signals across the masking field $F_2$. Stage 3 contains the target nodes of these internal pathways. These target nodes always receive a mixture of excitatory 57 and inhibitory 58 signals. They are never exposed to an uncontrolled Phase 1 burst. The Stage 3 nodes give rise to topographic, positive feedback pathways 25 to their Stage 1 source nodes 2. These positive feedback pathways 25 close the feedback loops within the masking field $F_2$. Using these stages, the internal feedback interactions of the masking field remain unchanged, yet the $F_1$ inputs engage these interactions before they ever influence Stage 3 nodes.

The architecture in FIG. 25 prevents a totally uncontrolled Phase 1 burst from occurring. On the other hand, the internal feedback within the masking field does not instantaneously select an equilibrium grouping. It remains to say how the LTM traces within the $F_1 \rightarrow F_2$ pathways can be buffered against learning activity patterns that are far from equilibrium.

The main problem to be overcome is clearly illustrated in FIG. 25. Although the Stage 3 cells receive a mixture of excitatory 57 and inhibitory signals 58, the Stage 1 cells receive only excitatory signals 52. Moreover, the $F_1 \rightarrow F_2$ pathways about the Stage 1 cells. What prevents the LTM traces within the endings of these pathways from being activated by sampling signals from the Stage 1 cells applicant hypothesizes is the sampling signal which activates an LTM trace and is not derived from a Stage 1 node. Rather, the sampling signal is activated by feedback from a Stage 3 node through pathway 25. Many Stage 3 nodes will be immediately inhibited by Stage 2 interneurons when an input pattern turns on. Use of Stage 3 nodes as a source of sampling signals enables masking field interactions to restrict learning from its very first moments of interaction, because many Stage 1 nodes which are initially activated by $F_1$ inputs correspond to Stage 3 nodes which are never activated during the ensuing grouping process. In order to instantiate this constraint, applicant simply replaces equation (1) by the following equation:

$$\frac{d}{dt} Z_{ji} = \epsilon f(X_i^{(3)})(-Z_{ji} + LI_j) \quad (2)$$

where $x_i^{(3)}$ is the activity of the ith node population in Stage 3 of the masking field. The concept that internal feedback signals generate LTM sampling signals was introduced in Grossberg, S., "A Neural Model of Attention, Reinforcement, and Discrimination Learning", *International Review of Neurobiology*, 1975. Applicant now believes that it may be a design principle which is widely used in the brain, whether the feedback signal is intercellularly generated, as in FIG. 25, or intracellularly generated by a network of biochemical feedback interactions. Some of the properties which can be used to experimentally test for this design are now summarized.

Dissociation of LTM Read-In and Read-Out: Feedback as a Neural Modulator

Read-out of LTM occurs when an LTM trace multiplicatively gates a signal on its way from $F_1$ to $F_2$. In the masking fields above, LTM is read-out in to the same $F_2$ nodes which enable the LTM traces to sample, or read-in, new LTM values (FIG. 17). The design in FIG. 25 dissociates the processes of LTM read-out and LTM read-in by enabling some Stage 1 nodes to become activated without triggering any learning, no matter how fast the learning rate is chosen.

The feedback signals from Stage 3 to stage 1 do not however, act only as sampling signals. They must also activate their target Stage 1 nodes 2 in order to close the internal feedback loops which enable the masking field to select its list code in STM. LTM traces which abut Stage 1 differentiate between the activation of Stage 1 cells by inputs from $F_1$ and activation of Stage 1 cells by feedback signals from Stage 3. If such a distinction were not made, then a functional dissociation of LTM read-out and LTM read-in would not be achieved.

There exist two type of dissociation schemes: a dynamical scheme and a structural scheme which can be instantiated either chemically or electrically. In the dynamical scheme, the LTM traces continue to use Stage 1 cells as sampling signals, but the threshold for activating the sampling signal $f(x_j)$ is chosen high. It is assumed that Stage 1 cells can only be activated enough to exceed the sampling threshold when their direct activation by inputs from $F_1$ is supplemented by large positive feedback signals from stage 3 cells. Although such a mechanism may be adequate to solve simple learning problems, it is inadequate in a complex learning system. For example, in a masking field, if the sampling threshold is chosen too small, then the Phase 1 surge can be learned. If the sampling threshold is chosen too large, then many groupings which should induce adaptive tuning will fail to do so. Such a design is not robust.

In contrast, a strucutral scheme to the problem is manifestly robust. In one such structural scheme, the feedback signal is delivered via a different chemical transmitter then the chemical transmitter which gates signals from $F_1$ to $F_2$ and regulates learned LTM changes in $F_1 \rightarrow F_2$ pathways. Term $f(X_j^{(3)})$ in equation (2) can then be realized by a modulatory action of the feedback transmitter upon the feedforward transmitter.

The use of two transmitters enables both transmitter systems to electrically activate Stage 1 cells, yet also enables LTM traces abutting Stage 1 cells to distinguish between feedback signals from Stage 3 and their aggregate effects upon Stage 1 cells. In one microscopic realization of such a dual transmitter system, either transmitter can cause macromolecular changes in the cell membranes of Stage 1 cells which enable electrical activation to occur, but only their conjoint action can cause those macromolecular changes which enable the learning process to unfold. Prior art data concerning associative learning in invertebrates implicates a $Ca++$ dependent membrane current which is activated only when pairs of critical events occur together. Further it is known that a catecholaminergic transmitter may, moreover, participate in the activation of this $Ca++$ current. The feedback signal from Stage 3 to Stage 1 plays an analogous formal role in the circuit depicted in FIG. 25. The suggestion that associative learning may depend upon a Ca++ current was made in Grossberg S., "Some Physiological and Biochemical Consequence of Psychological Postulates", *Preceedings of the National Academy of Sciences,* 1968; and "On the Production and Release of Chemical Transmitters and Related Topics in Cellular Control", *Journal of Theoretical Biology,* 1969, based upon the fragmentary biochemical evidence then available, to explain how a learning equation such as (1) could be physically realized.

Figure 26:
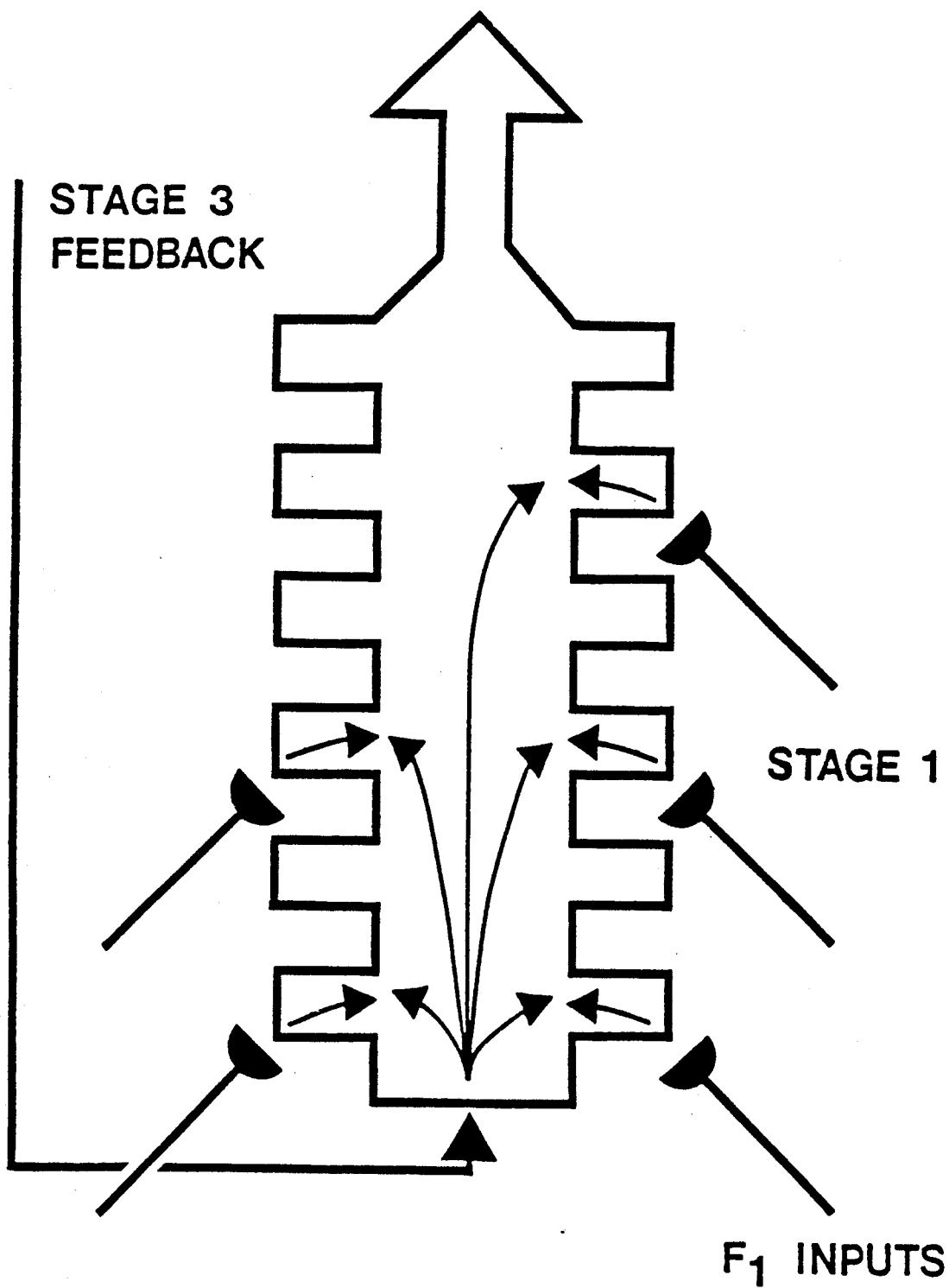
FIG. 26 as an schematic view of another structural solution to the Phase 1 burst problem

Another structural scheme to solve the dissociation problem can also be envisaged. In this scheme, each $F_1 \rightarrow F_2$ pathway causes a local change in its target node membranes 4 at Stage 1 as shown in FIG. 26. These local membrane channels 4 cause local changes in potential which are summated by the Stage 1 nodes 60 before these nodes activate Stage 2 nodes. Feedback signals from Stage 3 nodes cause global action potentials throughout the Stage 1 nodes 60. These global action potentials activate membrane channels 62 which cannot be activated merely by local signals from $F_1$. These membrane channels 62 enable learning to occur within the abutting LTM traces. This possibility was used in Grossberg, S. "A Neural Model of Attention, Reinforcement, and Discrimination Learning", *International Review of Neurobiology,* 1975 to discuss classical conditioning within the hippocampus and in Grossberg S., "A Theory of Human Memory: Self-Organization and Performance of Sensory Motor Codes, Maps, and Plans", *Progress in Theorectical Biology.* R. Rosen and F. Snell (Eds.), Volume 5 New York: Academic Press, 1978; and "Studies of Mind and Brain: Neural Principles of Learning, Perception, Development, Cognition, and Motor Control", Boston: Reidel Press, 1982 to discuss neocortical conditioning. It is a structural, rather than a dynamical scheme because all feedback signals are assumed to trigger the global change which enables learning to occur, not only feedback signals which can summate sufficiently with feedforward signals. Such a structural scheme could also be used to trigger a Ca++ dependent current when the node is globally activated.

The mathematical description of a masking field is as follows. The nodes $V_i$ of a masking field have STM activities or potentials $x_i(t)$ which obey the membrane equations of neurophysiology; namely $$C \frac{dV}{dt} = (V^+ - V) g^+ + (V^- - V) g^- + (V^P - V) g^P \quad (3)$$

V(t) is a variable voltage; C is a constant capacitance; the constants $V^+$, $V^-$, and $V^P$ are excitatory, inhibitory, and passive saturation points, respectively; and the terms $g^+$, $g^-$ and $g^P$ are conductances which can vary through time as a function of input signals. Hence, the term $(V^+ - V)g^+$ describes an excitatory channel, the term $(V^- - V)g^-$ describes an inhibitory channel; and $(V^P - V)g^P$ describes a passive channel. Due to the multiplicative relationship between conductances and voltages in equation (3), the membrane equation is also said to describe shunting interactions.

In a masking field, the nodes are linked together via recurrent, or feedback, on-center off-surround interactions (FIG. 17). The properties of a masking field are thus part of the general theory of shunting recurrent on-center off-sourround networks. A review of the general properties of this class of networks is found in Grossberg, S. (Ed), "Adaptive Resonance in Development, Perception, and Cognition", *Mathematical Psychology and Psychophysiology,* Providence, RI: American Mathematical Society, 1981 and Grossberg, S. "The quantized geometry of Visual Space: The Coherent Computation of Depth, Form, and Lightness", *Behavioral and Brain Sciences,* 1983.

Equation (3) can be rewritten for the potential $x_i(t)$ as $$\frac{d}{dt} X_i = -AX_i + (B - X_i) P_i - (X_i + C) Q_i \quad (4)$$

where subscript i refers to the ith node, $x_i$ is the activity level of the ith node; 0 is the passive equilibrium point, B (>0) is the excitatory saturation point, and $-C$ ($\leq 0$) is the inhibitory saturation point. Term $P_i$ is the total excitatory input and term $Q_i$ is the total inhibitory input to $V_i$. As the inputs $P_i$ and $Q_i$ fluctuate through time $-C \leq x_i \leq B$.

The excitation input $P_i$ is a sum of the total input from the item field and a positive feedback signal from $V_i$ to itself. Thus, $P_i$ can be written in the form $$P_i = \sum_{j \in J} I_j P_{ji} Z_{ji} + D f(X_i) \quad (5)$$

where $I_j$ is the output from the item node (j); $P_{ji}$ is the strength of the pathway from $V_j$ in $F_1$ to $V_i$ in $F_2$; and $Z_{ji}$ is the adaptive weight of the LTM trace within this pathway. Term $Df(x_i)$ is the positive feedback signal from $V_i$ to itself. This feedback signal enables $V_i$ to store activities in STM after $I_j$ terminates.

Inhibitory input $Q_i$ in equation (4) is a sum of feedback signals $g(x_m)$ from other nodes $V_m$ in the masking field. Thus, $Q_i$ can be written as $$Q_i = \sum_{m \in I} g(X_m) E_{mi} \quad (6)$$

where $E_{mi}$ is the inhibitory coefficient from node $V_m$ to node $V_i$ and $m \in I$ is the set of masking field nodes $V_m$ which receive inputs I from item nodes.

However, the nodes in different subfields of a masking field possess different parameters. Headscript (J) is then used in equation (4) to denote all unordered sets J of $F_1$ item nodes that selectively send pathways to nodes in $F_2$. Equation (4) is rewritten as $$\frac{d}{dt} X_i^{(J)} + -AX_i^{(J)} + (B - X_i^{(J)}) P_i^{(J)} - (X^{(J)} + C) Q_i^{(J)} \quad (7)$$

where $x_i^{(J)}$ denotes the STM activity of an $F_2$ population $V_i^{(J)}$ which receives input pathways only from the set J of $F_1$ item nodes. Any number of different population of nodes $V_i^{(J)}$ in $F_2$ may correspond to each fixed set J of $F_1$ items.

Equation (5) is rewritten as $$P_i^{(J)} = \sum_{j \in J} I_j P_{ji}^{(J)} Z_{ji}^{(J)} + D_{/J/} f(x_i^{(J)}) \quad (8)$$

Where $j \in J$ is the unordered set of $F_1$ item nodes which belong to the set J of items that talk to a population of $F_2$ nodes; and /J/ denotes the size of set J, thus $D/J/$ depends on the size of set J and not on the items in set J. $D_{/J/}$ the excitatory feedback coefficient is thus sensitive to the spatial scale of the population $V_i(J)$ and not to the microstructure or ordered items of set J.

Equation (6) is likewise refined by headscript (J). Function $Q_i^{(J)}$ obeys the relationship $$Q_i^{(J)} = \sum_{m,k} g(x_m^{(K)}) E_{KJ} \qquad (9)$$

where $E_{KJ}$ determines the strength of the inhibitory feedback pathway from $V_m^{(K)}$ to $V_i^{(J)}$, m denotes all activations within a set, and K denotes all unordered sets.

This path strength depends only upon the unordered sets K and J of items to which $V_m^{(K)}$ and $V_i(J)$ respond. $E_{KJ}$ expresses the randomness of the self-similar growth process between populations in $F_2$ as follows:

Mass Action Interactions $$E_{KJ} = F_{/J/} G_{/K/} H_{/K \cap J/} \qquad (10)$$

$F_{/J/}$, $G_{/K/}$ and $H_{/K \cap J/}$ depend only upon the size of an unordered set of items. Where J, K, and their intersection $K \cap J$ are unordered sets. Equation (10) expresses the assumption that the inhibitory interaction strength from $V_m^{(K)}$ to $V_i^J$ is the result of an interaction of three independent random factors. The net strength $E_{KJ}$ can thus arise from a statistically independent interaction between growth factors that depend on the sizes of K, J, and their overlap.

Placing equations (8), (9), and (10) into equation (7) gives the following:

Masking Field Equation $$\frac{d}{dt} x_i^{(J)} = -Ax_i^{(J)} + (B - x_i^{(J)}) \left[ \sum_{j \in J} I_j P_{ji}^{(J)} Z_{ji}^{(J)} + D_{/J/} f(x_i^{(J)}) \right] -$$

$$(x_i^{(J)} + C) \sum_{m,k} g(x_m^{(K)}) F_{/J/} G_{/K/} H_{/K \cap J/} \qquad (11)$$

$D_{/J/}$ determines how the positive feedback from a node to itself varies with the node's self-similar scale. It is assumed that $D_{/J/}$ increases with scale, thereby enabling nodes corresponding to longer sublists to gain a competitive advantage in STM, other things being equal. The simplest choice is made in Applicant's simulations, namely $$D_{/J/} = D_{/J/}, \qquad (12)$$

where D is a positive constant. This rule is consistent with the possibility that, as an $F_2$ node (population) grows in response to high levels of $F_1$ input, it also produces more excitatory synaptic sites for its own axon collaterals.

The total connection strength to each population $V_i^{(J)}$ from all nodes in $F_1$ and the total inhibitory connection strength to each population $V_i^{(J)}$ from all nodes in $F_2$ are both chosen to be independent of K and J. This property is compatible with the interpretation that the size of each node (population) is scaled to the total strength of its input pathways (as shown in FIG. 3). If more pathways input to such a node, then each input's effect is dilated more due to the larger size of the node shown in FIG. 4. The property of matching node (population) volume to the total number of input pathways is called "conservation of synaptic sites".

Conservation of synaptic sites enables the network to overcome the following problem. Due to the randomness of the growth rules, there may exist different numbers of nodes in each of $F_2$'s masking subfields. As these $F_2$ nodes compete for STM activity, the competitive balance could be biased by accidents of random growth. A mechanism is needed to control the proliferation of random connections. Conservation of synaptic sites is one effective mechanism. A masking field embodying such a growth rule employs the following relationships:

Synaptic Conservation Rule:

$$\sum_{j \in J} P_{ji} = \text{constant} = 1 \qquad (13)$$

where more pathways from $V_j$ in $F_1$ to $V_i$ in $F_2$ causes each pathway to carry less weights. And, $$m_{\Sigma, k} F_{/J/} G_{/J/} H_{/K \cap J/} = \text{constant} = F \qquad (14)$$

so that the sum of all inhibitory nodes of a node in $F_2$ is constant. From equation 14

$$F_{/J/} = \frac{F}{\sum_{m,K} G_{/K/} H_{/K \cap J/}} \qquad (15)$$

which denotes an $F_2$ node's capacity relative to the capacity of all the nodes which communicate to it.

Alternatively the coefficients $P_{ji}^{(J)}$ were replaced by $P_{ji}^{(J)}[1 + \alpha_k P_{jk}^{(J)-1}]$ which obeys the Weber Law Rule. Similar results were found within a reasonable parameter range.

The connections $P_{ji}^{(J)}$ from $F_1$ to $F_2$ are chosen to satisfy the synaptic conservation law of equation 13 as well as a random growth law.

Random Normalized Growth Rule:

$$P_{ji}^{(J)} = \frac{1}{/J/} (1 - P_{/J/}) + r_{ji}^{(J)} P_{/J/} \qquad (16)$$

where fluctuation coefficient $P_{/J/}$ determines how random the growth is from $F_1$ to $F_2$. If $P_{/J/} = 0$ then growth is deterministic (but spatially distributed) because $$P_{ji}^{(J)} = \frac{1}{/J/}.$$

In this limiting case all connection strengths from item nodes in $F_l$ to a fixed list node in $F_2$ are equal, and vary inversely with the number $/J/$ of item nodes that contact the list node. If $0 < P_{/J/} \leq 1$, then the coefficients $r_{ji}^{(J)}$ in equation 16 influence the connection strengths $P_{ji}^{(J)}$. The numbers $[r_{ji}^{(J)}:j \in J]$ are chosen pseudo-randomly; that is they are uniformaly distributed between 0 and 1 such that $$\sum_{j \in J} r_{ji}^{(J)} = 1 \qquad (17)$$

Thus, the randomness of growth from $F_1$ to $F_2$'s controlled by the number of paths out of an item node of $F_1$ and not by how many paths converge into an $F_2$ node.

Equations 16 and 17 together enable the conservation rule of equation 13.

The fluctuation coefficients $P_{/J/}$ were made to depend upon the set size $/J/$ by $P_{/J/}$ being chosen so that the standard deviation of $[P_{ji}^{(J)}:j\epsilon J]$ divided by the mean of $[P_{ji}^{(J)}:j\epsilon J]$ is independent of $/J/$. This is accomplished as follows:

To produce a pseudorandom sequence of numbers $[r_{ji}^{(J)}: j\epsilon J]$ distributed uniformly over the simplex $$S_n = \left[ (y_1, y_2, \ldots, y_{n+1}): Y_i \geq 0, \sum_{j=1}^{(n+1)} Y_j = 1 \right] \quad (18)$$

one proceeds as follows. By a standard algorithm (Knuth, D. E., "Seminumerical Algorithms: The Art of Computer Programming" Vol 2, Reading MA: Addison-Wesley, 1981), one obtains a vector of numbers $w=(w_1, w_2, \ldots, w_n)$ uniformly distributed over the n-cube $I_n = X_{j=1}^n [0,1]$. Rearrange the numbers in w in order of increasing size to produce a new vector $w' = (w'_1, w'_2, \ldots, w'_n)$ such that $w'_1 \leq w'_2 \leq \ldots \leq w'_n$. The map $w \rightarrow w'$ from $I_n$ into itself is determined by a permutation $\sigma$ of the indices $(1, 2, \ldots, n)$ such that $w'_i = w\sigma(i)$. Each permutation $\sigma$ can transform a different subset of $I_n$ into vectors with increasing entries. Thus, $I_n$ can be decomposed into sets $D_\sigma$ such that a single permutation $\sigma$ can map all $W \epsilon D_\sigma$ into $W' \epsilon I_n$. Hence the map $w \rightarrow w'$ transforms uniformly distributed vectors in $I_n$ onto uniformly distributed vectors in $I_n$ with elements in increasing order.

Next map vectors $w'$ in $I_n$ with elements in increasing order onto vectors y in $S_{n+1}$ via the one-to-one linear transformation $y_1 = w'_1$, $y_2 = w'_2 - w'_1$, ..., $y_n = w'_n - w'_{n-1}$, and $y_{n+1} = 1 - w_n$. Since this linear transformation maps equal volumes onto equal surface areas, the vectors y are uniformly distributed on the simplex $S_{n+1}$.

The coefficient of variation of $[P_{ji}^{(J)}: j\epsilon J]$ is made independent of $/J/$ ($>1$) as follows. By the above construction, the marginal distribution $r_{ji}^{(J)}$ in Eq. 16 is distributed with density function $(/J/-1)(1-x)^{/J/-2}$. The mean of this distribution is $$\frac{1}{/J/}.$$

and its standard deviation is $$\frac{1}{/J/} \sqrt{\frac{/J/-1}{/J/+1}}.$$

Thus, the mean of $P_{ji}^{(J)}$ is also $$\frac{1}{/J/}$$

and its standard deviation is $$P_{/J/} \frac{1}{/J/} \sqrt{\frac{/J/-1}{/J/+1}} \quad (19)$$

The coefficient of variation of $P_{ji}^{(J)}$ is its standard deviation divided by its means, which applicant set equal to a constant p independent of $/J/$. Thus applicant chose $$P_{/J/} = P \sqrt{\frac{/J/+1}{/J/-1}} \quad (20)$$

In the presented simulations, $$p = \frac{1}{10\sqrt{3}}.$$

Coefficient $F_{/J/}$ in Equation 11 describes the total number of inhibitory synaptic sites within a population $v_i^{(J)}$. By Equation 15, this quantity is chosen to keep the number of synaptic sites constant across all the nodes. Small random variations could also be allowed, but all of the effects of randomness have been absorbed into the coefficients $p_{ji}^{(J)}$ in Equation 16 for simplicity.

Coefficient $G_{/K/}$ in Equation 11 measures the total number of inhibitory connections, or axons, emitted by each population $v_m^{(K)}$ to all other $F_2$ populations. Due to self-similar growth, $G_{/K/}$ increases with $/K/$. In applicants simulations, the simplest choice was made.

Self-Similar Axon Generation:
$$G_{/K/} = /K/ \quad (21)$$

Where $G_{/K/} = 0$ if $/K/ = 0$, and by self-similarity, nodes contacted by more items ($/K/$) generate stronger self-excitatory feedback pathways ($G_{/K/}$).

Coefficient $H_{/K \cap J/}$ in Equation 11 describes how well growing axons from a population $v_m^{(K)}$ can compete for synaptic sites at a population $v_i^{(J)}$. In particular, coefficient $G_{/K/}$ describes the number of emitted axons, whereas coefficient $H_{/K \cap J/}$ measures the fraction of these axons that can reach $v_i^{(J)}$ and compete for synaptic space there. Due to self-similar growth, $H_{/K \cap J/}$ increases with $/K \cap J/$. Consequently, if either set K or J increases, then $H_{/K \cap J/}$ also increases, other things being equal. Given fixed sizes of K and J, then $H_{/K \cap J/}$ increases as the overlap, or intersection, of the sets increases. In other words, $F_2$ list nodes become list nodes due to random growth of connections from $F_1$ item nodes. Two list nodes therefore tend to be closer in $F_2$ if they receive more input pathways from the same item nodes in $F_1$. If a pair of list nodes in $F_2$ is closer, then their axons can more easily contact each other, other things being equal. In the simulations, applicant chose $H_{/K \cap J/}$ as follows. Let $$H_{/K \cap J/} = 1 + /K \cap J/. \quad (22)$$

Where $H_{/K \cap J/}$ increases linearly with $/K \cap J/$. Because $H_{/K \cap J/}$ is always positive, when $H_{/K \cap J/}$ multiplies $G_{/K/}$ in Equation 11, every population $v_m^{(K)}$ can send weak long-range inhibitory pathways across the whole of $F_2$, but these pathways tend to arborize with geater density at populations $v_i^{(J)}$ which receive inputs from the same $F_1$ nodes. Equation 15, (A19), and Equation 21 imply that the total number of paths that can be rejected by a node in $F_2$ is $$F_j = \frac{F}{\sum_{m,K} /K/(1 + /K \cap J/)} \quad (23)$$

The positive and negative feedback signals $f(x_i^{(J)})$ and $g(x_m^{(K)})$ respectively in Equation 11 enable the network to contrast enhance its input patterns before storing them in STM. To achieve this property, choose both f(w) and g(w) to be sigmoid, or S-shaped, functions of the activity level w as discussed in Grossberg, S. (Ed.), "Adaptive Resonance in Development, Perception, and Cognition", *Mathematical Psychology and Psychophysiology*, Providence, RI: American Mathematical Society, 1981 and "The Quantized Geometry of Visual Space: The Coherent Computation of Depth, Form, and Lightness", *Behavioral and Brain Sciences*, 1983. In particular, $$f(w) = \frac{([w]+)^2}{f_0 + ([w]+)^2} \quad (24)$$

and $$g(w) = \frac{([w]+)^2}{g_0 + ([w]+)^2} \quad (25)$$

The notation (w)+ stands for max (w,0). Thus f(w) and g(w) do not generate feedback signals if w is smaller than the signal threshold zero. As w increases above zero, both f(w) and g(w) grow quadratically with w until they begin to saturate at their maximum value 1.

The associative law that is used is the one described in equation (1).

Associative Learning Law $$\frac{d}{dt} z_{ji}^{(J)} = \epsilon f(x_i^{(J)})(-z_{ji}^{(J)} + LI_j). \quad (26)$$

Where $f(x_i^{(J)})$ is an activity dependent learning rate of the $x_i$th node of $F_2$ in unordered set J and $Z_{ji}^{(J)}$ is the input path to node $x_i$. In Equation 26, the sampling signal $f(x_i^{(J)})$ is assumed to equal the positive feedback signal in equation 1, and is thus a sigmoid function of activity $x_i^{(J)}$. The parameter $\epsilon$ determines the learning rate and the parameter L is a constant that multiplies the input $I_j$ from node $v_j$ in $F_1$.

The associative learning law contains term $I_j$, rather than tem $I_j P_{ji}^{(J)}$ as in Equation 11, due to the following interpretation. Term $Z_{ji}^{(J)}$ in Equation 11 is the LTM density, or LTM strength per unit cross-sectional area, in the pathways from $v_j$ in $F_1$ to $v_i$ in $F_2$. Term $p_{ji}^{(J)}$ describes the total cross-sectional area of these pathways. The input term $I_j$ is broadcast along all these pathways, where it influences the LTM densities as in equation 26. The total signal that is read out from these pathways into $v_i$ equals the read-out of all the LTM densities $Z_{ji}^{(J)}$ by $I_j$ summed across all the pathways. This sum equals $I_j P_{ji}^{(J)} Z_{ji}^{(J)}$, as in Equation 11.

Equation 11 can now be modified by Equations 12 through 23 into the following:

Adaptively filtered Masking Field $$\frac{d}{dt} x_i^{(J)} = -A x_i^{(J)} + (B - x_i^{(J)}) \left[ \sum_{j \in J} I_j \left[ \frac{1}{/J/} (1 - p / J/) + \right. \right.$$

$$\left. \left. r_{ji}^{(J)} P_{/J/} \right] z_{ji}^{(J)} + D /J/ f(x_i^{(J)}) \right] -$$

$$F(x_i^{(J)}) + C) \frac{\sum_{m,K} g(x_m^{(K)})/K/(1 + /K \cap J/)}{\sum_{m,K} /K/(1 + /K J/)}$$

and $$\frac{d}{dt} z_{ji}^{(J)} = \epsilon f(x_i^{(J)})(-z_{ji}^{(J)} + LI_j) \quad (26)$$

where f and g are sigmoid signal functions. All of the "intelligence" of a masking field is embodied in th emergent properties which arise from the paralled interactions defined by these equations.

Parameters

The following parameter choices were made: A=1, B=1, D=4, L=10, $f_0$=16, $g_0$=1. In all runs CF=1088. Additional parameters are listed by figure. Unless otherwise noted, the system has run to near equilibrium value.

FIG. 6: $\epsilon$=0, C=1, F=1088m, $I_0$=1.5

FIG. 7: same as FIG. 6 except $I_1$=1.5; FIG. 8: $I_2$=1.5; FIG. 9: $I_0$=1, $I_1$=0.5; FIG. 10: $I_0$=0.5, $I_1$=1.

FIG. 11: $I_0$=0.68, $I_1$=0.48, $I_2$=0.34; FIG. 12: $I_0$=0.34, $I_1$=0.68, $I_2$=0.48; FIG. 13: $I_0$=0.34, $I_1$=0.48, $I_2$=0.68.

FIGS. 14 and 15: $\epsilon$=0, C=0.125, F=8704.

FIG. 14: $I_0$=1.5; FIG. 15: $I_0$=1.0, $I_1$=0.5.

FIG. 19: Simulation is run at $\epsilon$=0 until no single step nor the size of any component of the derivative is greater than $1.0 \times 10^{-4}$. $\epsilon$ is then set equal to 1 and simulation proceeds to equilibrium parameters; C=0.125, F=8704.

FIG. 19a: $I_0$=1.5; FIG. 19b: $I_1$=1.5; FIG. 19c: $I_2$=1.5; FIG. 19d: $I_0$=1.0, $I_1$=0.5.

FIG. 20: Same parameters and conditions as in FIG. 19 except where noted.

FIG. 20a: $I_0$=0.5, $I_1$=1.0; FIG. 20b: $I_0$=0.68, $I_1$=0.48, $I_2$=0.34; FIG. 20c: $I_0$=0.34, $I_1$=0.68, $I_2$=0.48; FIG. 20d: $I_0$=0.34, $I_1$=0.48, $I_2$=0.68.

FIG. 21: $\epsilon$=0.1, C=0.125, F=8074. Figures are output of (0,1) long term memory traces at times 1, 2, 4, 8, 16, 32, 64, 96.

FIG. 22: $\epsilon$=0, C=1, F=1088, t=0.1, t=0.2, t=0.4, t=0.8, t=1.6.

Figure 23A:
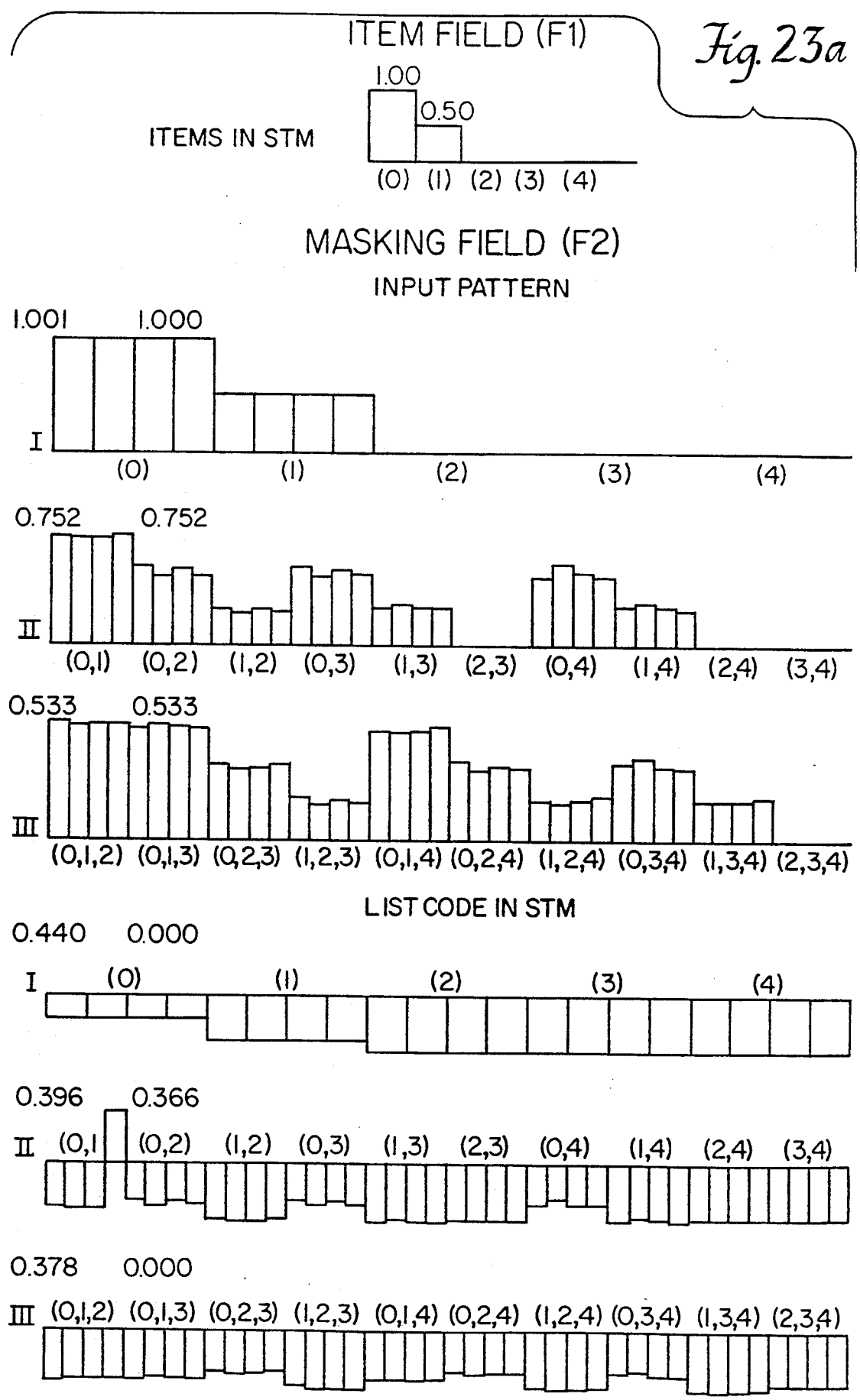
Figure 23D:
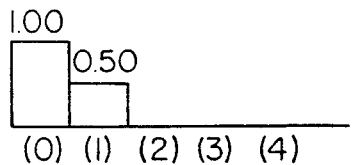
Figure 23D:
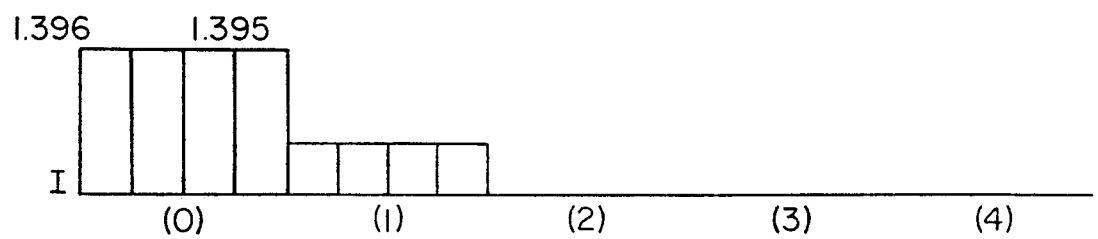
Figure 23D:
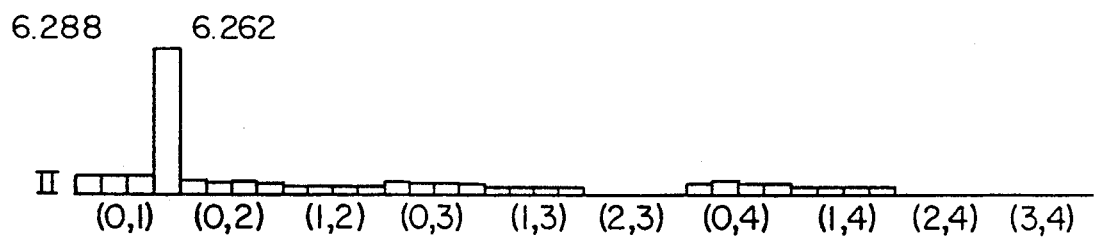
Figure 23D:
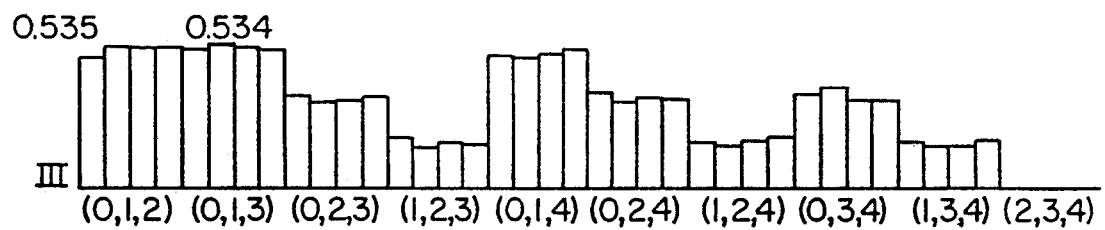
Figure 23D:
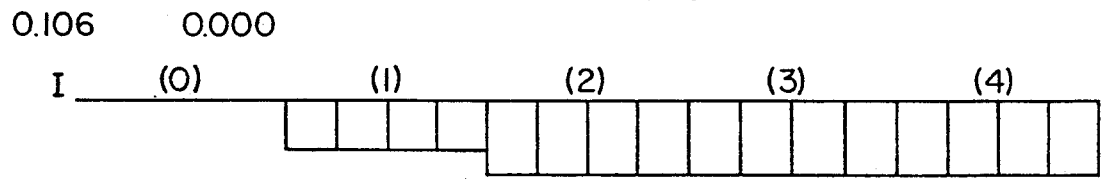
Figure 23D:
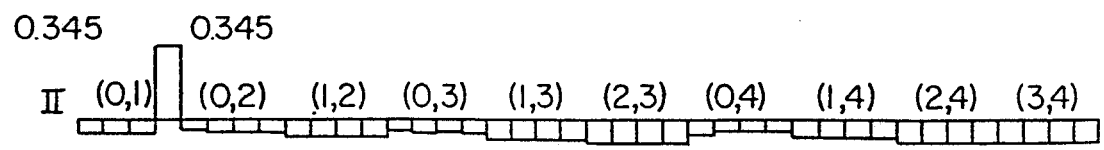
Figure 23D:
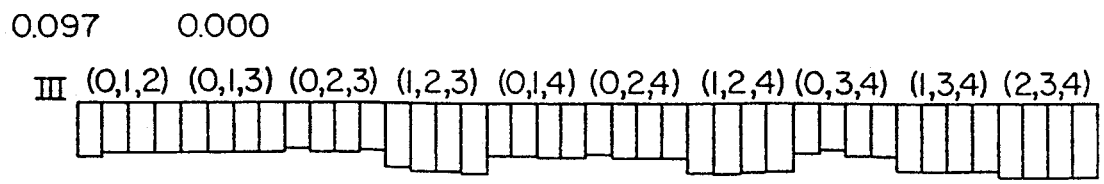

FIG. 23a: $\epsilon$=0, C=0.125, F=8704, $I_0$=1, $I_1$=0.5; FIG. 23b: $\epsilon$=1; FIG. 23c: =1; FIG. 23d: $\epsilon$=0.1.

While this invention has been particularly shown and described with references to preferred embodiments thereof, it will be understood by these skilled in the art that various changes in form and details may be made without departing from the spirit scope of the invention as defined by the appended claims.

We claim:

1. Pattern recognition apparatus in a computer system, the apparatus comprising a feedback, self compensating network, the network receiving an input pattern provided to the computer system for recognizing and determining subpatterns thereof, the network simultaneously coding, through direct access of a content-addressable memory area, both the whole input pattern and various groupings of subpatterns in the input pattern, each said coding including a respective activity weight, the weight of a code indicating the probability of the input pattern being the grouping of subpatterns of that code, the subpatterns being independently recognizable patterns having exiting nodes in the memory area, the probability based upon spatial likeness between the grouping of subpatterns and the input pattern, with respect to previous and succeeding input patterns and past probabilities used for recognizing other input patterns, such that the code with a weight of highest probability indicates recognition of the input pattern as the grouping of subpatterns of the code.

2. Apparatus as claimed in claim 1 wherein the input patterns are a time ordered series of speech elements and the network coding includes context-sensitive language representations of the series of speech elements; and the network further comprising computer means responsive to said representations of the series of speech elements, the computer means grouping the speech elements in a manner which reorganizes past groupings of the speech elements for coding through the content-addressable memory area, the computer means grouping the speech elements as a function of the context-sensitive language representations of the series of speech elements, such that the speech elements themselves and temporal order thereof are used together in the coding through the content-addressable memory area.

3. Apparatus as claimed in claim 1 wherein the network exhibits simple rules of neuronal development including (i) random increase of memory area access for input patterns and subpatterns, (ii) expansion of the memory area as a function of said increase of memory area access, and (iii) competition for access of particular nodes of the memory area, the development rules generating a network architecture whose simultaneous coding can directly activate correct subpattern groupings without the need for prior search through the memory area.

4. Apparatus as claimed in claim 1 wherein the network accomplishes direct access by performing multiple spatial scale analysis of temporally evolving input patterns which enhances correct encoding and competitively masks inappropriate encodings.

5. Apparatus as claimed in claim 1 wherein memory access provides a code which represents the current input pattern, and wherein this code indicates a probability of subsequent changes to the current input pattern by assigning activity weights indicative of activities to groupings which have not yet fully occurred, based on coding of previous input patterns and context including similarities between the previous input patterns and the current input pattern, without serial processing within the network.

6. A computerized pattern recognition and learning system comprising:
an adaptive filter that is activated by a source pattern and provides an input pattern indicative of the source pattern;
a self-similar, automatically gain controlled cooperative-competitive nonlinear feedback masking field network having a content addressable memory responsive to the adaptive filter input pattern, the content addressable memory holding a plurality of list codes, and based on the input pattern, the network activating list codes that are predictive of the source pattern and competitively inhibiting list codes which are unpredictive of the source patterns based on different groupings of subpatterns in the input pattern, such that the masking field network provides the list code in the content addressable memory which is most predictive of the source pattern to indicate recognition of the source pattern and stores the source pattern with the list code in the content addressable memory to provide learning in the system.

7. A pattern recognition and learning system as claimed in claim 6 wherein the masking field network further simultaneously detects multiple groupings of subpatterns within the input pattern and assigns activation weights to the list codes for these groupings, said weights based on contextual information embedded within the input pattern and on list codes activated for recognizing other previous input patterns, the subpatterns each having a respective list code in the content addressable memory, and the masking field network determining said contextual information from relative positions of the subpatterns in the input pattern.

8. A pattern recognition and learning system as claimed in claim 6 wherein the content addressable memory activates predictive list codes and inhibits unpredictive list codes through a multiple scale analysis.

9. A pattern recognition and learning system as claimed in claim 8 wherein recognition by the system of other previous input patterns biases the adaptive filter to signal the masking field network to activate preferred list codes.

10. A pattern encoding system as claimed in claim 9 wherein the prior learning of the system biases the adaptive filter through feedback means.

11. A pattern recognition and learning system as claimed in claim 7 wherein the masking field network has sensitivity to the input pattern and automatically rescales said sensitivity as the overall size of the input pattern changes but remains sensitive to salient subpatterns of the input pattern, such that the masking field network activates the list code at a different level for the whole input pattern than the list codes for salient subpatterns of the input pattern, and said masking field network activates the list code for a subpattern at a different level when the subpattern becomes a pattern whole in a new source context.

12. A pattern recognition and learning system as claimed in claim 7 wherein the masking field network is primed by inputs directly from the source pattern such that the masking field network activates list codes which represent predictions of how the source pattern may evolve in a subsequent time interval.

13. A pattern recognition and learning system as claimed in claim 7 wherein the masking field network exhibits adaptive sharpening in which repetition of a familiar source pattern tunes the adaptive filter to elicit from the content addressable memory a more focal spatial activation of list codes than does an unfamiliar source pattern.

14. A pattern recognition and learning system as claimed in claim 7 wherein the adaptive filter is tuned to elicit activation of preferred list codes which are held in a short term memory of the system.

15. A pattern recognition and learning system as claimed in claim 7 wherein the list codes activated become less distributed when the input pattern contains more contextual information on which to base an unambiguous prediction of the source pattern being processed.

16. A pattern recognition and learning system as claimed in claim 7 further comprising a multiplicity of source nodes for holding the source pattern the adaptive filter being responsive to the source nodes to provide an input pattern indicative of the source pattern.

17. A pattern recognition and learning system as claimed in claim 16 wherein the adaptive filter is differently responsive to different source nodes.

18. A pattern recognition and learning system as claimed in claim 7 wherein the content addressable memory includes a plurality of masking field nodes and holds the list codes in respective masking field nodes, the nodes being activity-dependent and self-similarly established to hold a source pattern with a corresponding list code.

19. A pattern recognition and learning system as claimed in claim 18 wherein a relative value of an activity dependent self-similarly established node is constrained by number of times the network activates the node for an adaptive filter input pattern.

20. A computerized recognition and learning system comprising:
   a plurality of source nodes which embody a source pattern;
   a multiple scale, cooperative-competitive feedback masking field network of list nodes, the list nodes holding respective recognition codes of patterns;
   a plurality of adaptive filter paths which map the source nodes to list nodes in a manner which provides an input pattern to the network;
   the network receiving the input pattern from the adaptive filter paths and having content-addressable memory means responsive to the input pattern, the content-addressable memory means determining (i) list nodes which provide compressed recognition codes that are predictive of the source pattern, said list nodes being activated list nodes, and (ii) list nodes which provide compressed recognition codes that are unpredictive of the source pattern, said list nodes being masked list nodes, where at least one adaptive filter path is mapped from each source node to at least one activated list node, such that the masking field network provides the recognition code which is most predictive of the source pattern, based on different groupings of subpatterns in the input pattern, to indicate recognition of the source pattern, and stores the recognition code of the source pattern in a list node to provide learning in the system.

21. A recognition and learning system as claimed in claim 20 wherein the adaptive filter paths are mapped in a profuse random manner.

22. A pattern recognition and learning system as claimed in claim 21 wherein the randomness of mapping from a source node is controlled by the number of adaptive filter paths associated with that source node.

23. A recognition and learning system as claimed in claim 20 wherein the number of adaptive filter paths mapped to a list node determines the size of the list node, and the content-addressable memory means determines an activated list node through a subset of certain mapped paths depending at least on the number of paths mapped to the list node.

24. A recognition and learning system as claimed in claim 23 further comprising means for preventing a threshold number of adaptive filter paths from being mapped to an activated list node.

25. A recognition and learning system as claimed in claim 23 wherein the paths mapped to one activated list node experience a change in strength relative to each other as the one node changes in size.

26. A recognition and learning system as claimed in claim 20 wherein a list node exhibits activity dependent self-similar growth constrained by conservation of points of connection between the list node and filter paths.

27. A recognition and learning system as claimed in claim 20 wherein the list nodes are of different memory sizes, larger list nodes being able to hold recognition codes of longer patterns than smaller list nodes, and more adaptive filter paths able to be mapped to larger list nodes than smaller list nodes.

28. A recognition and learning system as claimed in claim 27 wherein different subsets of the adaptive filter paths provide different subsets of the input pattern which enables selective determination of activated list nodes of a certain interaction ability.

29. A recognition and learning system as claimed in claim 20 wherein the masking field network simultaneously detects multiple groupings of subpatterns in the input pattern and assigns activation weights to the recognition codes for these groupings, the weights being based on relative positions of the subpatterns in the input pattern and recognition codes used to predict prior source patterns of the system, the subpatterns having recognition codes provided by certain list nodes.

30. A recognition and learning system as claimed in claim 20 wherein the masking field network automatically rescales its response to the input pattern as the overall size of the input pattern changes but remains responsive to relative positions of subpatterns in the input pattern such that the content-addressable memory means differently determines an activated list node for producing the code for the whole input pattern than a list node for producing the code for salient subpatterns of the input pattern, and differently determines an activated list node for producing the code for a source pattern part when that part is a pattern whole in a new context.

31. A method of learning and recognizing patterns comprising the steps of:
   providing an input pattern;
   simultaneously detecting multiple groupings of subpatterns within the input pattern, each grouping being associated with a predefined code accessible through a content-addressable memory;
   assigning respective weights to the codes for the detected multiple groupings;
   activating the codes associated with the detected groupings such that the codes of the groupings with their respective weights each provide a probability that the input pattern is the grouping associated with that code according to relative positions of subpatterns in the input pattern and codes used to recognize prior input patterns; and
   selecting the code with the weight of highest probability to indicate recognition of the input pattern as the grouping of subpatterns of the selected code.

32. A method as claimed in claim 31 further comprising the step of competitively inhibiting codes which are unpredictive of the input pattern.

33. A method as claimed in claim 32 wherein the step of activating codes and the step of competitively inhibiting codes include activating predictive codes and inhibiting unpredictive codes through a multiple scale analysis.

34. A method as claimed in claim 31 further comprising the step of automatically detecting new groupings of subpatterns as the overall size of the input pattern changes but remaining responsive to salient subpatterns of the input pattern, such that the codes are activated at a different level for the whole input pattern than the codes of the salient subpatterns of the input pattern, the code for a subpattern of the input pattern being activated at a different level when the subpattern becomes a pattern whole in a new input context.

35. A method as claimed in claim 31 further comprising the step of providing priming inputs directly from the input pattern such that codes which represent predictions of how the input pattern may evolve in a subsequent time interval are activated.

36. A method as claimed in claim 31 wherein the step of activating codes includes adaptively sharpening such that repetition of a familiar input pattern elicits a more focal spatial activation of codes than does an unfamiliar input pattern.

37. A method as claimed in claim 31 wherein the step of activating codes includes activating codes which are less distributed when the input pattern is similar to a recognized prior input pattern on which to base an unambiguous prediction of the input pattern being processed.

* * * * *

UNITED STATES PATENT AND TRADEMARK OFFICE
CERTIFICATE OF CORRECTION

PATENT NO. : 5,040,214

DATED : August 13, 1991

INVENTOR(S) : Stephen Grossberg and Michael Cohen

It is certified that error appears in the above-identified patent and that said Letters Patent is hereby corrected as shown below:

```
Col. 34, line 23, after "Claim" delete "7" and insert instead ---6---.
Col. 34, line 35, after "Claim" delete "7" and insert instead ---6---.
Col. 34, line 41, after "Claim" delete "7" and insert instead ---6---.
Col. 34, line 48, after "Claim" delete "7" and insert instead ---6---.
Col. 34, line 52, after "Claim" delete "7" and insert instead ---6---.
Col. 34, line 58, after "Claim" delete "7" and insert instead ---6---.
Col. 34, line 66, after "Claim" delete "7" and insert instead ---6---.
```

Signed and Sealed this

Thirteenth Day of October, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,040,214
DATED : August 13, 1991
INVENTOR(S) : Stephen Grossberg and Michael Cohen It is certified that error appears in the above-indentified patent and that said Letters Patent is hereby corrected as shown below:

Column 1, line 9;
Insert the following as the first paragraph under the heading "Government Support."

--This invention was made with Government support under Contract N00014-83-K-0337 awarded by the Department of the Navy. The Government has certain rights in the invention.--

Signed and Sealed this

Thirty-first Day of May, 1994

Attest:

BRUCE LEHMAN

*Attesting Officer*  *Commissioner of Patents and Trademarks*